US012574884B2

(12) United States Patent
Zhu et al.

(10) Patent No.: US 12,574,884 B2
(45) Date of Patent: Mar. 10, 2026

(54) COMMUNICATION METHOD AND RELATED DEVICE

(71) Applicant: HUAWEI TECHNOLOGIES CO., LTD., Guangdong (CN)

(72) Inventors: Haoren Zhu, Shanghai (CN); Weisheng Jin, Shanghai (CN); Huan Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 446 days.

(21) Appl. No.: 18/064,597

(22) Filed: Dec. 12, 2022

(65) Prior Publication Data

US 2023/0112588 A1     Apr. 13, 2023

Related U.S. Application Data

(63) Continuation of application No. PCT/CN2021/099127, filed on Jun. 9, 2021.

(30) Foreign Application Priority Data

Jun. 12, 2020    (CN) .......................... 202010535846.0

(51) Int. Cl.
*H04W 60/04*        (2009.01)
*H04W 8/20*         (2009.01)
*H04W 76/20*        (2018.01)

(52) U.S. Cl.
CPC ............. *H04W 60/04* (2013.01); *H04W 8/20* (2013.01); *H04W 76/20* (2018.02)

(58) Field of Classification Search
CPC ... H04W 60/04; H04W 60/00; H04W 60/005; H04W 76/20; H04W 76/16; H04W 76/27; H04W 76/15; H04W 76/25
See application file for complete search history.

(56) References Cited

U.S. PATENT DOCUMENTS 10,045,359 B1 *  8/2018  Sitaram ................. H04L 5/0098
2018/0020418 A1   1/2018  Chandramouli et al.
(Continued)

FOREIGN PATENT DOCUMENTS

CN        108377575 A    8/2018
CN        109548136 A    3/2019
(Continued)

OTHER PUBLICATIONS

Extended European Search Report in European Appln No. 21822031.7, dated Oct. 24, 2023, 9 pages.
(Continued)

*Primary Examiner* — Jamal Javaid
(74) *Attorney, Agent, or Firm* — Fish & Richardson P.C.

(57) ABSTRACT

Communication methods and related devices are described to manage an air interface resource through a common radio resource control (RRC) connection of different cards in a multi-SIM multi-standby terminal and implement service concurrency of the multi-SIM multi-standby terminal. In an example method, after setting up an RRC connection for communication between a first network and a terminal device, an access network device receives, from the terminal device through the RRC connection, a registration request message that requests to register with a second network, and sends the registration request message to a core network device in the corresponding second network. Then, after the access network device receives a registration response message from the core network device, the access network device sends the registration response message to the terminal device, to complete a process in which the terminal device registers with the second network.

20 Claims, 19 Drawing Sheets

(56)                    References Cited

U.S. PATENT DOCUMENTS

| 2018/0359284 A1 | 12/2018 | Kotreka et al. |
| 2020/0236603 A1 | 7/2020 | Cuevas Ramirez et al. |

FOREIGN PATENT DOCUMENTS

| CN | 110049578 | A | 7/2019 | | |
| CN | 110351804 | A | 10/2019 | | |
| CN | 110557827 | A | 12/2019 | | |
| JP | 2015537461 | A | 12/2015 | | |
| KR | 20150042686 | A | 4/2015 | | |
| WO | 2017096790 | A1 | 6/2017 | | |
| WO | 2018141081 | A1 | 8/2018 | | |
| WO | WO-2018172002 | A1 * | 9/2018 | .............. | H04W 8/12 |
| WO | 2019098388 | A1 | 5/2019 | | |

OTHER PUBLICATIONS

Office Action in Indian Appln. No. 202237073812, mailed on Aug. 22, 2023, 7 pages (with English translation).

Huawei et al., "Procedures for Service Gap Control," 3GPP TSG-SA WG2 Meeting #131, S2-1902425, Santa Cruz—Tenerife, Spain, Feb. 25-Mar. 1, 2019, 46 pages.

3GPP TS 23.501 V16.4.0, "3rd Generation Partnership Project; Technical Specification Group Services and System Aspects; System architecture for the 5G System (5GS); Stage 2 (Release 16)," Mar. 2020, 430 pages.

3GPP TS 33.501 V16.2.0, "3rd Generation Partnership Project; Technical Specification Group Services and System Aspects; Security architecture and procedures for 5G system (Release 16)," Mar. 2020, 227 pages.

3GPP TS 22.261 V17.2.0, "3rd Generation Partnership Project; Technical Specification Group Services and System Aspects; Service requirements for the 5G system; Stage 1 (Release 17)," Mar. 2020, 83 pages.

3GPP TR 23.700-07 V0.3.0, "3rd Generation Partnership Project; Technical Specification Group Services and System Aspects; Study on enhanced support of non-public networks (Release 17)," Jan. 2020, 42 pages.

Office Action in Chinese Appln. No. 202010535846.0, dated Mar. 30, 2022, 23 pages (with English translation).

International Search Report and Written Opinion in International Appln. No. PCT/CN2021/099127, mailed on Sep. 8, 2021, 20 pages (with English translation).

Office Action in Korean Appln. No. 2023-7000566, mailed on May 9, 2025, 14 pages (with English translation).

* cited by examiner

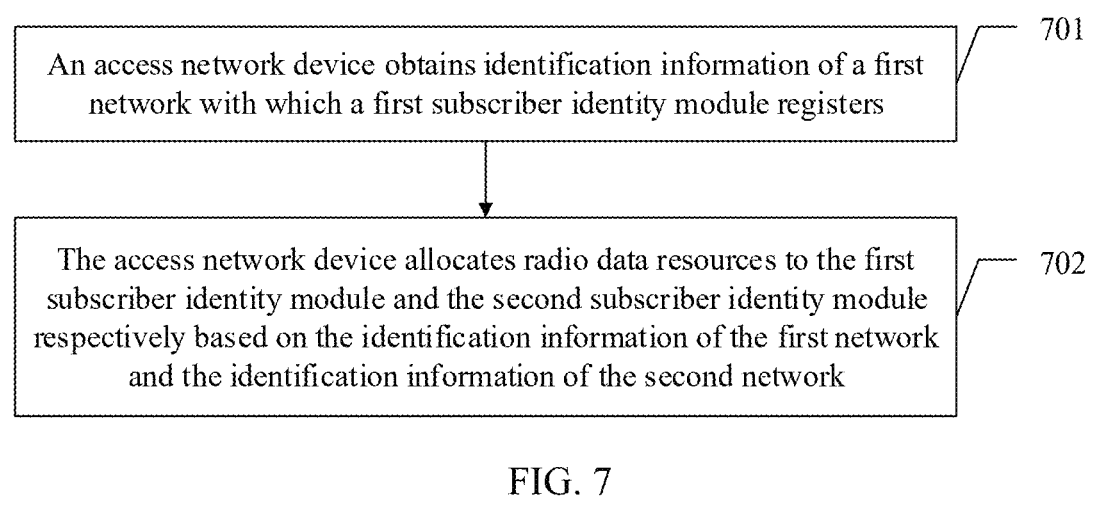

An access network device obtains identification information of a first network with which a first subscriber identity module registers — 701

The access network device allocates radio data resources to the first subscriber identity module and the second subscriber identity module respectively based on the identification information of the first network and the identification information of the second network — 702

FIG. 7

COMMUNICATION METHOD AND RELATED DEVICE

CROSS-REFERENCE TO RELATED APPLICATIONS

This application is a continuation of International Application No. PCT/CN2021/099127, filed on Jun. 9, 2021, which claims priority to Chinese Patent Application No. 202010535846.0, filed on Jun. 12, 2020. The disclosures of the aforementioned applications are hereby incorporated by reference in their entireties.

TECHNICAL FIELD

This application relates to the wireless communications field, and in particular, to a communication method and a related device.

BACKGROUND

With development of a network, a mobile terminal develops from a single-SIM single-standby implementation mode to a multi-SIM multi-standby implementation mode. A dual-SIM dual-standby (dual simcard dual standby, DSDS) implementation mode is used as an example. There are two subscriber identity module (subscriber identity module, SIM) cards or two software SIM cards (virtual SIMs, corresponding to SIM information in a software form) inside a DSDS mobile terminal, or there are two copies of SIM information inside one SIM card. A user can conveniently and quickly operate two SIM cards in one DSDS mobile terminal by using only the DSDS mobile terminal.

In a conventional technology, different SIM cards in a multi-SIM multi-standby terminal may separately support networks of a same type or different types, for example, a public land mobile network (public land mobile network, PLMN) and a non-public network (Non-Public Network, NPN). NPNs may be classified into two types: a standalone NPN (standalone NPN, SNPN) and a public network integrated NPN (public network integrated NPN, PNI-NPN). The SNPN represents a network that does not rely on a network function of a public network, namely, the PLMN, and there may be an independent access network and core network. The PNI-NPN (Public Network Integrated-NPN) represents a network that may partially rely on the network function provided by the public network, namely, the PLMN.

There is a concurrency requirement for data of a plurality of SIM cards in the existing multi-SIM multi-standby terminal. This means that concurrency of data services in a plurality of different networks needs to be supported. Generally, radio frequency channels of the DSDS terminal may be classified into a primary channel and a secondary channel. The primary channel includes a receiver (RX) and a transmitter (TX). The secondary channel includes only an RX for listening. However, in the DSDS terminal, if TX preemption occurs on a SIM card, that is, when the SIM card occupies the primary channel, the other SIM card releases a resource, performs network searching and camping, and enters an idle (IDLE) state. Consequently, efficient service concurrency cannot be implemented.

SUMMARY

Embodiments of this application provide a communication method and a related device, to manage an air interface resource through a common RRC connection of different cards in a multi-SIM multi-standby terminal, implement service concurrency of the multi-SIM multi-standby terminal, and improve communication efficiency.

A first aspect of embodiments of this application provides a communication method, applied to an access network device. In the method, the access network device pre-establishes an RRC connection for communication between a first network and a terminal device. Then, the access network device receives, from the terminal device through the RRC connection for the communication between the first network and the terminal device, a registration request message that requests to register with a second network. Then, the access network device sends the registration request message to a core network device in the second network. Then, the access network device receives a registration response message from the core network device. Further, the access network device sends the registration response message to the terminal device through the RRC connection. After the access network device sets up the RRC connection for the communication between the first network and the terminal device, the access network device receives, from the terminal device through the RRC connection for the communication between the first network and the terminal device, the registration request message that requests to register with the second network, and sends the registration request message to the core network device in the corresponding second network. Then, after the access network device receives the registration response message from the core network device, the access network device sends the registration response message to the terminal device, to complete a process in which the terminal device registers with the second network. That is, the access network device manages an air interface resource of the terminal device through the established RRC connection to the terminal device, to implement service concurrency of the terminal device by reusing the RRC connection, and improve communication efficiency.

It should be noted that the first network and the second network may be a same communication network or different communication networks. The communication network may include a public land mobile network PLMN, a non-public network NPN, or any other type of network. This is not limited herein.

In a possible implementation of the first aspect of embodiments of this application, before the access network device sends the registration request message to the core network device in the second network, the method may further include: The access network device receives identification information of a first subscriber identity module and identification information of a second subscriber identity module from the terminal device through the RRC connection, where the terminal device includes the first subscriber identity module and the second subscriber identity module, the first subscriber identity module corresponds to the first network, and the second subscriber identity module corresponds to the second network. After the access network device receives the registration response message from the core network device, the access network device associates a context corresponding to the identification information of the first subscriber identity module with a context corresponding to the identification information of the second subscriber identity module.

In this embodiment, the terminal device may be a multi-SIM multi-standby terminal. The terminal device includes at least the first subscriber identity module and the second subscriber identity module. In addition, the first subscriber identity module corresponds to the first network, and the second subscriber identity module corresponds to the second network. After the access network device receives the identification information of the first subscriber identity module and the identification information of the second subscriber identity module from the terminal device through the RRC connection, the access network device may determine that the terminal device includes the first subscriber identity module and the second subscriber identity module. In this way, after the access network device receives the registration response message from the core network device, that is, after the access network device determines that the terminal device registers with the second network, the access network device associates the context corresponding to the identification information of the first subscriber identity module with the context corresponding to the identification information of the second subscriber identity module. That is, the access network device associates the RRC connection, the context corresponding to the identification information of the first subscriber identity module, and the context corresponding to the identification information of the second subscriber identity module, so that both the first subscriber identity module and the second subscriber identity module in the terminal device implement communication through the RRC connection, and service concurrency of the multi-SIM and multi-standby terminal device is implemented.

In a possible implementation of the first aspect of embodiments of this application, a process in which the access network device receives, from the terminal device through the RRC connection for the communication between the first network and the terminal device, the registration request message that requests to register with the second network may specifically include: The access network device receives, from the second subscriber identity module through the RRC connection for the communication between the first network and the first subscriber identity module, the registration request message that requests to register with the second network.

In this embodiment, the terminal device may be the multi-SIM multi-standby terminal. The terminal device includes at least the first subscriber identity module and the second subscriber identity module. In addition, when the first subscriber identity module corresponds to the first network, and the second subscriber identity module corresponds to the second network, the registration request message that is from the terminal device and that requests to register with the second network may specifically indicate the registration request message that is from the second subscriber identity module in the terminal device and that requests to register with the second network. This provides a specific implementation process in which the second subscriber identity module in the terminal device registers with the second network, improves feasibility of the solution, and improves implementation flexibility of the solution.

In a possible implementation of the first aspect of embodiments of this application, after the access network device receives the registration response message sent by the core network device in the second network, the method may further include: The access network device establishes an access stratum AS security configuration that is between the access network device and the terminal device and that is shared by the first subscriber identity module and the second subscriber identity module.

In this embodiment, after the access network device receives the registration response message sent by the core network device in the second network, that is, after the access network device determines that the terminal device registers with the second network, the access network device establishes the access stratum AS security configuration that is between the access network device and the terminal device and that is shared by the first subscriber identity module and the second subscriber identity module. That is, the AS security configuration is a shared AS security configuration. This avoids a disclosure risk of the AS security configuration, and improves communication security of the terminal device.

In a possible implementation of the first aspect of embodiments of this application, the method may further include: The access network device sets up the RRC connection for the communication between the first network and the terminal device. The access network device establishes an access stratum AS security configuration between the access network device and the first subscriber identity module in the terminal device. After the access network device receives the registration response message from the core network device, the access network device re-establishes the access stratum AS security configuration that is between the access network device and the terminal device and that is shared by the first subscriber identity module and the second subscriber identity module.

In this embodiment, after the access network device receives the registration response message from the core network device, that is, after the access network device determines that the terminal device registers with the second network, the access network device may re-establish the AS security configuration between the access network device and the terminal device. This avoids the disclosure risk of the AS security configuration, and improves the communication security of the terminal device.

In a possible implementation of the first aspect of embodiments of this application, before the access network device receives, from the terminal device through the RRC connection for the communication between the first network and the terminal device, the registration request message that requests to register with the second network, the method may further include: The access network device receives a first indication from the terminal device through the RRC connection, where the first indication indicates that the RRC connection is for communication between a plurality of networks and the terminal device. The access network device modifies, based on the first indication, a type of the RRC connection as an RRC connection shared by the plurality of networks. The access network device sends a first downlink RRC message to the terminal device, where the first downlink RRC message indicates that the type of the RRC connection is the RRC connection shared by the plurality of networks.

In this embodiment, before the access network device receives, from the terminal device through the RRC connection, the registration request message that requests to register with the second network, the access network device may modify, based on the first indication sent by the terminal device, the type of the RRC connection as the RRC connection shared by the plurality of networks. The first indication indicates that the RRC connection is for the communication between the plurality of networks and the terminal device. Further, the access network device may further send, to the terminal device, the first downlink RRC message indicating that the type of the RRC connection is the RRC connection shared by the plurality of networks. That is, the access network device may modify, based on the first indication, the type of the RRC connection as the RRC connection shared by the plurality of networks, so that the access network device receives, from the terminal device through the RRC connection whose type is the RRC connection shared by the plurality of networks, the registration request message that requests to register with the second network. This provides a specific implementation process of receiving, from the terminal device, the registration request message that requests to register with the second network, improves feasibility of the solution, and improves implementation flexibility of the solution.

In a possible implementation of the first aspect of embodiments of this application, after the access network device receives the registration response message from the core network device, the method further includes: The access network device establishes a second non-access stratum NAS data link that is between the access network device and the core network device and that is related to the second subscriber identity module. When the access network device receives a downlink NAS message from the core network device through the second NAS data link, the access network device sends the downlink NAS message to the second subscriber identity module through the RRC connection; and/or when the access network device receives an uplink NAS message from the terminal device through the RRC connection, the access network device sends the uplink NAS message to the core network device through the second NAS data link.

In this embodiment, after the access network device receives the registration response message from the core network device, that is, after the access network device determines that the terminal device registers with the second network, the access network device establishes the second NAS data link that is between the access network device and the core network device and that is related to the second subscriber identity module. Then, the access network device may forward the downlink NAS message from the core network device to the terminal device through the RRC connection; and/or the access network device may forward the uplink NAS message from the terminal device to the core network device through the second NAS link. This provides a specific implementation process of communication between the second subscriber identity module and the core network device in the second network, improves feasibility of the solution, and improves implementation flexibility of the solution.

In a possible implementation of the first aspect of embodiments of this application, after the access network device receives the registration response message from the core network device, the method may further include: The access network device allocates data radio bearers DRBs to the first subscriber identity module and the second subscriber identity module; and/or the access network device allocates carrier components CCs to the first subscriber identity module and the second subscriber identity module.

In this embodiment, after the access network device receives the registration response message from the core network device, that is, after the access network device determines that the terminal device registers with the second network, because both the first subscriber identity module and the second subscriber identity module in the terminal device communicate with the access network device through the RRC connection, the access network device may allocate the data radio bearers DRBs and/or the carrier components CCs to the first subscriber identity module and the second subscriber identity module, so that the access network device can provide differentiated services for the different subscriber identity modules in the terminal device.

In a possible implementation of the first aspect of embodiments of this application, the method may further include: The access network device sends a second indication to the terminal device through the RRC connection, where the second indication indicates that the registration response message is associated with the second subscriber identity module.

In this embodiment, the access network device may send, to the terminal device through the RRC connection, the second indication indicating that the registration response message is associated with the second subscriber identity module, so that the terminal device determines, based on the second indication, that the second subscriber identity module has registered with the second network. Subsequently, the second subscriber identity module in the terminal device may communicate with the core network device in the second network through the RRC connection, to implement service concurrency of the terminal device.

A second aspect of embodiments of this application provides a communication method, applied to a terminal device. In the method, the terminal device pre-registers with a first network by using an access network device. Then the terminal device sends, to the access network device through an RRC connection for communication between the first network and the terminal device, a registration request message that requests to register with a second network. Then, the terminal device receives a registration response message from the access network device through the RRC connection. The terminal device sends, to the access network device through the RRC connection for the communication between the first network and the terminal device, the registration request message that requests to register with the second network. That is, the terminal device manages an air interface resource of the terminal device through the RRC connection that the access network device has set up, to implement service concurrency of the terminal device by reusing the RRC connection, and improve communication efficiency.

It should be noted that the first network and the second network may be a same communication network or different communication networks. The communication network may include a public land mobile network PLMN, a non-public network NPN, or any other type of network. This is not limited herein.

In a possible implementation of the second aspect of embodiments of this application, the terminal device includes a first subscriber identity module and a second subscriber identity module, the first subscriber identity module corresponds to the first network, and the second subscriber identity module corresponds to the second network; and before the terminal device receives the registration response message from the access network device through the RRC connection, the method may further include: The terminal device sends identification information of the first subscriber identity module and identification information of the second subscriber identity module to the access network device through the RRC connection.

In this embodiment, the terminal device may be a multi-SIM multi-standby terminal. The terminal device includes at least the first subscriber identity module and the second subscriber identity module. In addition, the first subscriber identity module corresponds to the first network, and the second subscriber identity module corresponds to the second network. The terminal device may send the identification information of the first subscriber identity module and the identification information of the second subscriber identity module to the access network device through the RRC connection, so that the access network device can determine that the terminal device includes the first subscriber identity module and the second subscriber identity module. Subsequently, after the access network device determines that the terminal device registers with the second network, the access network device associates a context corresponding to the identification information of the first subscriber identity module with a context corresponding to the identification information of the second subscriber identity module, so that both the first subscriber identity module and the second subscriber identity module in the terminal device implement communication through the RRC connection, and service concurrency of the multi-SIM multi-standby terminal device is implemented.

In a possible implementation of the second aspect of embodiments of this application, a process in which the terminal device sends, to the access network device through the RRC connection for the communication between the first network and the terminal device, the registration request message that requests to register with the second network may specifically include: The terminal device sends, to the access network device through the RRC connection for the communication between the first subscriber identity module and the terminal device, the registration request message that is from the second subscriber identity module and that requests to register with the second network.

In this embodiment, the terminal device may be the multi-SIM multi-standby terminal. The terminal device includes at least the first subscriber identity module and the second subscriber identity module. In addition, when the first subscriber identity module corresponds to the first network, and the second subscriber identity module corresponds to the second network, the registration request message that is from the terminal device and that requests to register with the second network may specifically indicate the registration request message that is from the second subscriber identity module in the terminal device and that requests to register with the second network. This provides a specific implementation process in which the second subscriber identity module in the terminal device registers with the second network, improves feasibility of the solution, and improves implementation flexibility of the solution.

In a possible implementation of the second aspect of embodiments of this application, the first subscriber identity module camps on a target cell, and a service area of the access network device includes the target cell; and when the second subscriber identity module camps on the target cell, the terminal device triggers execution of sending, to the access network device through the RRC connection for the communication between the first network and the terminal device, the registration request message that requests to register with the second network.

In this embodiment, the service area of the access network device includes the target cell. When the terminal device determines that a cell on which the second subscriber identity module camps and a cell on which the first subscriber identity module camps are the target cell, the terminal device determines that the second subscriber identity module may perform communication through the RRC connection between the first subscriber identity module and the access network device. In this case, the terminal device triggers execution of sending, to the access network device through the RRC connection for the communication between the first network and the terminal device, the registration request message that requests to register with the second network, so that a success rate of registration performed by the second subscriber identity module in the terminal device by using the access network device is improved, and communication efficiency is further improved.

In a possible implementation of the second aspect of embodiments of this application, after the terminal device sends, to the access network device through the RRC connection for the communication between the first network and the terminal device, the registration request message that requests to register with the second network, the method may further include: The terminal device establishes an access stratum AS security configuration that is between the terminal device and the access network device and that is shared by the first subscriber identity module and the second subscriber identity module.

In this embodiment, after the terminal device sends, to the access network device through the RRC connection for the communication between the first network and the terminal device, the registration request message that requests to register with the second network, the terminal device establishes the access stratum AS security configuration that is between the terminal device and the access network device and that is shared by the first subscriber identity module and the second subscriber identity module. That is, the AS security configuration is a shared AS security configuration. This avoids a disclosure risk of the AS security configuration, and improves communication security of the terminal device.

In a possible implementation of the second aspect of embodiments of this application, the method may further include: The terminal device pre-registers with the first network by using the access network device. After the access network device sets up the RRC connection for the communication between the first network and the terminal device, the first subscriber identity module in the terminal device establishes an access stratum AS security configuration between the first subscriber identity module and the access network device. After the terminal device sends, to the access network device through the RRC connection for the communication between the first network and the terminal device, the registration request message that requests to register with the second network, the terminal device re-establishes the access stratum AS security configuration that is between the terminal device and the access network device and that is shared by the first subscriber identity module and the second subscriber identity module.

In this embodiment, after the terminal device sends, to the access network device through the RRC connection for the communication between the first network and the terminal device, the registration request message that requests to register with the second network, the terminal device may re-establish the AS security configuration between the terminal device and the access network device. This avoids the disclosure risk of the AS security configuration, and improves the communication security of the terminal device.

In a possible implementation of the second aspect of embodiments of this application, before the terminal device sends, to the access network device through the RRC connection for the communication between the first network and the terminal device, the registration request message that requests to register with the second network, the method may further include: The terminal device sends a first indication to the access network device through the RRC connection, where the first indication indicates that the RRC connection is for communication between a plurality of networks and the terminal device. The terminal device receives a first downlink RRC message from the access network device through the RRC connection, where the first downlink RRC message indicates that a type of the RRC connection is an RRC connection shared by the plurality of networks.

In this embodiment, before the terminal device sends, to the access network device through the RRC connection for the communication between the first network and the terminal device, the registration request message that requests to register with the second network, the terminal device may send, to the access network device, the first indication indicating that the RRC connection is for the communication between the plurality of networks and the terminal device. Further, the terminal device may receive, from the access network device, the first downlink RRC message indicating that the type of the RRC connection is the RRC connection shared by the plurality of networks. In this way, the terminal device sends, to the access network device through the RRC connection whose type is the RRC connection shared by the plurality of networks, the registration request message that requests to register with the second network. This provides a specific implementation process of sending the registration request message that requests to register with the second network, improves feasibility of the solution, and improves implementation flexibility of the solution.

In a possible implementation of the second aspect of embodiments of this application, the method may further include: The terminal device receives a second indication from the access network device through the RRC connection, where the second indication indicates that the registration response message is associated with the second subscriber identity module.

In this embodiment, the terminal device may receive, from the access network device through the RRC connection, the second indication indicating that the registration response message is associated with the second subscriber identity module, so that the terminal device determines, based on the second indication, that the second subscriber identity module has registered with the second network. Subsequently, the second subscriber identity module in the terminal device may communicate with a core network device in the second network through the RRC connection, to implement service concurrency of the terminal device.

A third aspect of embodiments of this application provides a communication method, applied to an access network device. In the method, the access network device sets up a shared radio resource control RRC connection for communication between a plurality of networks and a terminal device. Then, the access network device receives, from the terminal device through the RRC connection, a first registration request message that requests to register with a first network and a second registration request message that requests to register with a second network. Further, the access network device sends the first request message to a core network device in the first network, and sends the second request message to a core network device in the second network. After the access network device receives a first registration response message from the core network device in the first network, and receives a second registration response message from the core network device in the second network, the access network device sends the first registration response message and the second registration response message to the terminal device through the RRC connection. The access network device sets up the shared radio resource control RRC connection for the communication between the plurality of networks and the terminal device, and receives, from the terminal device through the RRC connection, the first registration request message that requests to register with the first network and the second registration request message that requests to register with the second network. After receiving the first registration response message from the core network device in the first network and receiving the second registration response message from the core network device in the second network, the access network device sends the first registration response message and the second registration response message to the terminal device through the RRC connection, to complete a process in which the terminal device registers with the first network and the second network. That is, the access network device manages an air interface resource of the terminal device through the shared RRC connection for the communication between the plurality of networks and the terminal device, to implement service concurrency of the terminal device by reusing the RRC connection, and improve communication efficiency.

It should be noted that the first network and the second network may be a same communication network or different communication networks. The communication network may include a public land mobile network PLMN, a non-public network NPN, or any other type of network. This is not limited herein.

In a possible implementation of the third aspect of embodiments of this application, that the access network device sets up the shared radio resource control RRC connections shared between the plurality of networks and the terminal device may specifically include: The access network device receives identification information of a first subscriber identity module and identification information of a second subscriber identity module from the terminal device, where the terminal device includes the first subscriber identity module and the second subscriber identity module. The access network device sets up the RRC connection shared with the first subscriber identity module and the second subscriber identity module in the terminal device.

In this embodiment, the terminal device may be a multi-SIM multi-standby terminal. The terminal device includes at least the first subscriber identity module and the second subscriber identity module. In addition, the first subscriber identity module corresponds to the first network, and the second subscriber identity module corresponds to the second network. A process in which the access network device sets up the RRC connection may specifically include: The access network device sets up the RRC connection shared with the first subscriber identity module and the second subscriber identity module in the terminal device, so that both the first subscriber identity module and the second subscriber identity module in the terminal device implement communication through the RRC connection, and service concurrency of the multi-SIM multi-standby terminal device is implemented.

In a possible implementation of the third aspect of embodiments of this application, after the access network device receives the first registration response message from the core network device in the first network, and receives the second registration response message from the core network device in the second network, the method may further include: The access network device establishes an access stratum AS security configuration that is between the access network device and the terminal device and that is shared by the first subscriber identity module and the second subscriber identity module.

In this embodiment, after the first registration response message from the core network device in the first network is received, and the second registration response message from the core network device in the second network is received, that is, after the access network device determines that the terminal device separately registers with the first network and the second network, the access network device establishes the access stratum AS security configuration that is between the access network device and the terminal device and that is shared by the first subscriber identity module and the second subscriber identity module. That is, the AS security configuration is a shared AS security configuration. This avoids a disclosure risk of the AS security configuration, and improves communication security of the terminal device.

In a possible implementation of the third aspect of embodiments of this application, after the access network device receives the first registration response message from the core network device in the first network, the method further includes: The access network device establishes a first non-access stratum NAS data link that is between the access network device and the core network device in the first network and that is related to the first subscriber identity module. When the access network device receives a first downlink NAS message from the core network device in the first network through the first NAS data link, the access network device sends the first downlink NAS message to the terminal device through the RRC connection, where the first downlink NAS message carries the identification information of the first subscriber identity module; and/or when the access network device receives a second NAS message from the terminal device through the RRC connection, the access network device sends the first uplink NAS message to the core network device in the first network through the first NAS data link, where the first uplink NAS message carries the identification information of the first subscriber identity module.

In this embodiment, after the access network device receives the first registration response message from the core network device in the first network, that is, after the access network device determines that the terminal device registers with the first network, the access network device establishes the first NAS data link that is between the access network device and the core network device and that is related to the first subscriber identity module. Then, the access network device may forward the first downlink NAS message from the core network device to the terminal device through the RRC connection; and/or the access network device may forward the first uplink NAS message from the terminal device to the core network device through the first NAS link. This provides a specific implementation process in which the first subscriber identity module communicates with the core network device in the first network, improves feasibility of the solution, and improves implementation flexibility of the solution.

In a possible implementation of the third aspect of embodiments of this application, after the access network device receives the second registration response message from the core network device in the second network, the method further includes: The access network device establishes a second NAS data link that is between the access network device and the core network device in the second network and that is related to the second subscriber identity module. When the access network device receives a second downlink NAS message from the core network device in the second network through the second NAS data link, the access network device sends the second downlink NAS message to the terminal device through the RRC connection, where the second downlink NAS message carries the identification information of the second subscriber identity module; and/or when the access network device receives a second uplink NAS message from the terminal device through the RRC connection, the access network device sends the second uplink NAS message to the core network device in the second network through the second NAS data link, where the second uplink NAS message carries the identification information of the second subscriber identity module.

In this embodiment, after the access network device receives the second registration response message from the core network device in the second network, that is, after the access network device determines that the terminal device registers with the second network, the access network device establishes the second NAS data link that is between the access network device and the core network device and that is related to the second subscriber identity module. Then, the access network device may forward the second downlink NAS message from the core network device to the terminal device through the RRC connection; and/or the access network device may forward the second uplink NAS message from the terminal device to the core network device through the second NAS link. This provides a specific implementation process of communication between the second subscriber identity module and the core network device in the second network, improves feasibility of the solution, and improves implementation flexibility of the solution.

In a possible implementation of the third aspect of embodiments of this application, after the access network device receives the first registration response message from the core network device in the first network, and receives the second registration response message from the core network device in the second network, the method may further include: The access network device allocates data radio bearers DRBs to the first subscriber identity module and the second subscriber identity module; and/or the access network device allocates carrier components CCs to the first subscriber identity module and the second subscriber identity module.

In this embodiment, after the access network device receives the first registration response message from the core network device in the first network, and receives the second registration response message from the core network device in the second network, that is, after the access network device determines that the terminal device separately registers with the first network and the second network, because both the first subscriber identity module and the second subscriber identity module in the terminal device communicate with the access network device through the RRC connection, the access network device may allocate the data radio bearers DRBs and/or the carrier components CCs to the first subscriber identity module and the second subscriber identity module, so that the access network device can provide differentiated services for the different subscriber identity modules in the terminal device.

A fourth aspect of embodiments of this application provides a communication method, applied to a terminal device. In the method, the terminal device sends, to an access network device through a shared radio resource control RRC connection for communication between a plurality of networks and the terminal device, a first registration request message that requests to register with a first network and a second registration request message that requests to register with a second network. Then, the terminal device receives a first registration response message and a second registration response message from the access network device through the RRC connection. The terminal device sends, to the access network device through the shared radio resource control RRC connection for the communication between the plurality of networks and the terminal device, the first registration request message that requests to register with the first network and the second registration request message that requests to register with the second network. That is, the terminal device sends the first registration request message and the second registration request message to the access network device by reusing the RRC connection, so that the access network device manages an air interface resource of the terminal device through the shared RRC connection for the communication between the plurality of networks and the terminal device. In this way, service concurrency of the terminal device is implemented by reusing the RRC connection, and communication efficiency is improved.

It should be noted that the first network and the second network may be a same communication network or different communication networks. The communication network may include a public land mobile network PLMN, a non-public network NPN, or any other type of network. This is not limited herein.

In a possible implementation of the fourth aspect of embodiments of this application, before the terminal device receives the first registration response message and the second registration response message from the access network device through the RRC connection, the method may further include: The terminal device sends identification information of a first subscriber identity module and identification information of a second subscriber identity module to the access network device.

In this embodiment, the terminal device may be a multi-SIM multi-standby terminal. The terminal device includes at least the first subscriber identity module and the second subscriber identity module. In addition, the first subscriber identity module corresponds to the first network, and the second subscriber identity module corresponds to the second network. The terminal device may send the identification information of the first subscriber identity module and the identification information of the second subscriber identity module to the access network device through the RRC connection, so that the access network device can determine that the terminal device includes the first subscriber identity module and the second subscriber identity module. Further, both the first subscriber identity module and the second subscriber identity module in the terminal device implement communication through the RRC connection, and service concurrency of the multi-SIM multi-standby terminal device is implemented.

In a possible implementation of the fourth aspect of embodiments of this application, the first subscriber identity module camps on a target cell, and a service area of the access network device includes the target cell; and when the second subscriber identity module camps on the target cell, the terminal device triggers execution of sending, to the access network device through the RRC connection, the first registration request message that requests to register with the first network and the second registration request message that requests to register with the second network.

In this embodiment, the service area of the access network device includes the target cell. When the terminal device determines that a cell on which the second subscriber identity module camps and a cell on which the first subscriber identity module camps are the target cell, the terminal device determines that the second subscriber identity module may perform communication through the RRC connection between the first subscriber identity module and the access network device. In this case, the terminal device triggers execution of sending, to the access network device through the RRC connection, the first registration request message that requests to register with the first network and the second registration request message that requests to register with the second network, so that a success rate of registration performed by the first subscriber identity module and the second subscriber identity module in the terminal device by using the access network device is improved, and communication efficiency is further improved.

In a possible implementation of the fourth aspect of embodiments of this application, after the terminal device sends, to the access network device through the shared radio resource control RRC connection for the communication between the plurality of networks and the terminal device, the first registration request message that requests to register with the first network and the second registration request message that requests to register with the second network, the method may further include: The terminal device establishes an access stratum AS security configuration that is between the terminal device and the access network device and that is shared by the first subscriber identity module and the second subscriber identity module.

In this embodiment, after the terminal device sends, to the access network device through the shared radio resource control RRC connection for the communication between the plurality of networks and the terminal device, the first registration request message that requests to register with the first network and the second registration request message that requests to register with the second network, that is, after the terminal device determines that the terminal device has registered with the first network and the second network, the terminal device establishes the access stratum AS security configuration that is between the terminal device and the access network device and that is shared by the first subscriber identity module and the second subscriber identity module. That is, the AS security configuration is a shared AS security configuration. This avoids a disclosure risk of the AS security configuration, and improves communication security of the terminal device.

A fifth aspect of embodiments of this application provides a communication method, applied to an access network device. In the method, the access network device obtains identification information of a first network with which a first subscriber identity module registers and identification information of a second network with which a second subscriber identity module registers, where the first subscriber identity module and the second subscriber identity module are included in a same terminal device. The access network device allocates radio data resources to the first subscriber identity module and the second subscriber identity module respectively based on the identification information of the first network and the identification information of the second network, where the radio data resources include data radio bearers DRBs and/or carrier components CCs. When the access network device determines that both the first subscriber identity module and the second subscriber identity module in the terminal device perform communication by using the access network device, the access network device obtains the identification information of the first network with which the first subscriber identity module registers and the identification information of the second network with which the second subscriber identity module registers. The access network device may allocate the data radio bearers DRBs and/or the carrier components CCs to the first subscriber identity module and the second subscriber identity module, so that the access network device can provide differentiated services for the different subscriber identity modules in the terminal device, and an allocation process of the radio data resources in the access network device is optimized.

It should be noted that the first network and the second network may be a same communication network or different communication networks. The communication network may include a public land mobile network PLMN, a non-public network NPN, or any other type of network. This is not limited herein.

In a possible implementation of the fifth aspect of embodiments of this application, that the access network device allocates the radio data resources to the first subscriber identity module and the second subscriber identity module respectively based on an identifier of the first network and an identifier of the second network may specifically include: The access network device determines type information of the first network based on the identification information of the first network, and determines type information of the second network based on the identification information of the second network. Further, the access network device allocates the radio data resources to the first subscriber identity module and the second subscriber identity module respectively based on the type information of the first network and the type information of the second network.

In this embodiment, the access network device may specifically distinguish, based on the type information of the first network and the type information of the second network, a type of the first network with which the first subscriber identity module registers and a type of the second network with which the second subscriber identity module registers, and further allocate the radio data resources to the first subscriber identity module and the second subscriber identity module respectively based on the type information. This provides a specific implementation process of allocation of the radio data resources in the access network device, improves feasibility of the solution, and improves implementation flexibility of the solution.

A sixth aspect of embodiments of this application provides a communication apparatus, including a receiving unit and a sending unit. The receiving unit is configured to receive, from a terminal device through an RRC connection for communication between a first network and the terminal device, a registration request message that requests to register with a second network. The sending unit is configured to send the registration request message to a core network device in the second network. The receiving unit is further configured to receive a registration response message from the core network device. The sending unit is further configured to send the registration response message to the terminal device through the RRC connection.

In the sixth aspect of embodiments of this application, composition modules of the communication apparatus may be further configured to perform the steps performed in the possible implementations of the first aspect. For details, refer to the related descriptions of the first aspect. Details are not described herein again.

A seventh aspect of embodiments of this application provides a communication apparatus, including a receiving unit and a sending unit. The sending unit is configured to send, to an access network device through an RRC connection for communication between a first network and a terminal device, a registration request message that requests to register with a second network. The receiving unit is configured to receive a registration response message from the access network device through the RRC connection.

In the seventh aspect of embodiments of this application, composition modules of the communication apparatus may be further configured to perform the steps performed in the possible implementations of the second aspect. For details, refer to the related descriptions of the second aspect. Details are not described herein again.

An eighth aspect of embodiments of this application provides a communication apparatus, including a processing unit, a receiving unit, and a sending unit. The processing unit is configured to set up a shared radio resource control RRC connection for communication between a plurality of networks and a terminal device. The receiving unit is configured to receive, from the terminal device through the RRC connection, a first registration request message that requests to register with a first network and a second registration request message that requests to register with a second network. The sending unit is configured to send the first request message to a core network device in the first network, and send the second request message to a core network device in the second network. The receiving unit is further configured to receive a first registration response message from the core network device in the first network, and receive a second registration response message from the core network device in the second network. The sending unit is further configured to send the first registration response message and the second registration response message to the terminal device through the RRC connection.

In the eighth aspect of embodiments of this application, composition modules of the communication apparatus may be further configured to perform the steps performed in the possible implementations of the third aspect. For details, refer to the related descriptions of the third aspect. Details are not described herein again.

A ninth aspect of embodiments of this application provides a communication apparatus, including a receiving unit and a sending unit. The sending unit is configured to send, to an access network device through a shared radio resource control RRC connection for communication between a plurality of networks and a terminal device, a first registration request message that requests to register with a first network and a second registration request message that requests to register with a second network. The receiving unit is configured to receive a first registration response message and a second registration response message from the access network device through the RRC connection.

In the ninth aspect of embodiments of this application, composition modules of the communication apparatus may be further configured to perform the steps performed in the possible implementations of the fourth aspect. For details, refer to the related descriptions of the fourth aspect. Details are not described herein again.

A tenth aspect of embodiments of this application provides a communication apparatus, including a processing unit. The processing unit is configured to obtain identification information of a first network with which a first subscriber identity module registers and identification information of a second network with which a second subscriber identity module registers, where the first subscriber identity module and the second subscriber identity module are included in a same terminal device. The processing unit is further configured to allocate radio data resources to the first subscriber identity module and the second subscriber identity module respectively based on the identification information of the first network and the identification information of the second network, where the radio data resources include data radio bearers DRBs and/or carrier components CCs.

In the tenth aspect of embodiments of this application, composition modules of the communication apparatus may be further configured to perform the steps performed in the possible implementations of the fifth aspect. For details, refer to the related descriptions of the fifth aspect. Details are not described herein again.

An eleventh aspect of embodiments of this application provides a communication apparatus. The communication apparatus includes a processor. The processor is coupled to a memory. The memory is configured to store a computer program or instructions. The processor is configured to execute the computer program or the instructions in the memory, so that the method according to any one of the first aspect or the possible implementations of the first aspect, the method according to any one of the third aspect or the possible implementations of the third aspect, or the method according to any one of the fifth aspect or the possible implementations of the fifth aspect is performed.

A twelfth aspect of embodiments of this application provides a communication apparatus. The communication apparatus includes a processor. The processor is coupled to a memory. The memory is configured to store a computer program or instructions. The processor is configured to execute the computer program or the instructions in the memory, so that the method according to any one of the second aspect or the possible implementations of the second aspect or the method according to any one of the fourth aspect or the possible implementations of the fourth aspect is performed.

A thirteenth aspect of embodiments of this application provides a communication apparatus. The communication apparatus includes a processor and a communication interface. The communication interface is coupled to the processor. The processor is configured to run a computer program or instructions, so that the method according to any one of the first aspect or the possible implementations of the first aspect, the method according to any one of the third aspect or the possible implementations of the third aspect, or the method according to any one of the fifth aspect or the possible implementations of the fifth aspect is performed.

A fourteenth aspect of embodiments of this application provides a communication apparatus. The communication apparatus includes a processor and a communication interface. The communication interface is coupled to the processor. The processor is configured to run a computer program or instructions, so that the method according to any one of the second aspect or the possible implementations of the second aspect or the method according to any one of the fourth aspect or the possible implementations of the fourth aspect is performed.

A fifteenth aspect of embodiments of this application provides a computer-readable storage medium storing one or more computer-executable instructions. When the computer-executable instructions are executed by a processor, the processor performs the method according to any one of the first aspect or the possible implementations of the first aspect, any one of the third aspect or the possible implementations of the third aspect, or any one of the fifth aspect or the possible implementations of the fifth aspect.

A sixteenth aspect of embodiments of this application provides a computer-readable storage medium storing one or more computer-executable instructions. When the computer-executable instructions are executed by a processor, the processor performs the method according to any one of the second aspect or the possible implementations of the second aspect, or the processor performs the method according to any one of the fourth aspect or the possible implementations of the fourth aspect.

A seventeenth aspect of embodiments of this application provides a computer program product (or referred to as a computer program) storing one or more computers. When the computer program product is executed by a processor, the processor performs the method according to any one of the first aspect or the possible implementations of the first aspect, any one of the third aspect or the possible implementations of the third aspect, or any one of the fifth aspect or the possible implementations of the fifth aspect.

An eighteenth aspect of embodiments of this application provides a computer program product storing one or more computers. When the computer program product is executed by a processor, the processor performs the method according to any one of the second aspect or the possible implementations of the second aspect, or the processor performs the method according to any one of the fourth aspect or the possible implementations of the fourth aspect.

A nineteenth aspect of embodiments of this application provides a chip system. The chip system includes a processor, configured to support an access network device in implementing the function in any one of the first aspect or the possible implementations of the first aspect, any one of the third aspect or the possible implementations of the third aspect, or any one of the fifth aspect or the possible implementations of the fifth aspect. In a possible design, the chip system may further include a memory. The memory is configured to store program instructions and data that are necessary for the access network device. The chip system may include a chip, or may include the chip and another discrete device.

A twentieth aspect of embodiments of this application provides a chip system. The chip system includes a processor, configured to support a terminal device in implementing the function in any one of the second aspect or the possible implementations of the second aspect or any one of the fourth aspect or the possible implementations of the fourth aspect. In a possible design, the chip system may further include a memory. The memory is configured to store program instructions and data that are necessary for the terminal device. The chip system may include a chip, or may include the chip and another discrete device.

A twenty-first aspect of embodiments of this application provides a communication system. The communication system includes the communication apparatus in the sixth aspect and the communication apparatus in the seventh aspect, the communication system includes the communication apparatus in the eighth aspect and the communication apparatus in the ninth aspect, the communication system includes the communication apparatus in the tenth aspect, the communication system includes the communication apparatus in the eleventh aspect and the communication apparatus in the twelfth aspect, or the communication system includes the communication apparatus in the thirteenth aspect and the communication apparatus in the fourteenth aspect.

For technical effects brought by any one of the sixth aspect, the eighth aspect, the tenth aspect, the eleventh aspect, the thirteenth aspect, the fifteenth aspect, the seventeenth aspect, the nineteenth aspect, the twenty-first aspect, or the possible implementations of the aspects, refer to the technical effects brought by the first aspect or the different possible implementations of the first aspect, the technical effects brought by the third aspect or the different possible implementations of the third aspect, or the technical effects brought by the fifth aspect or the different possible implementations of the fifth aspect.

For technical effects brought by any one of the seventh aspect, the ninth aspect, the eleventh aspect, the thirteenth aspect, the fifteenth aspect, the seventeenth aspect, the nineteenth aspect, the twenty-first aspect, or the possible implementations of the aspects, refer to the technical effects brought by the second aspect or the different possible implementations of the second aspect or the technical effects brought by the fourth aspect or the different possible implementations of the fourth aspect.

It can be learned from the foregoing technical solutions that embodiments of this application have the following advantages: After the access network device sets up the RRC connection for the communication between the first network and the terminal device, the access network device receives, from the terminal device through the RRC connection for the communication between the first network and the terminal device, the registration request message that requests to register with the second network, and sends the registration request message to the core network device in the corresponding second network. Then, after the access network device receives the registration response message from the core network device, the access network device sends the registration response message to the terminal device, to complete the process in which the terminal device registers with the second network. That is, the access network device manages the air interface resource of the terminal device through the established RRC connection to the terminal device, to implement service concurrency of the terminal device by reusing the RRC connection, and improve communication efficiency.

BRIEF DESCRIPTION OF DRAWINGS

To describe technical solutions in embodiments of this application or in the prior art more clearly, the following briefly describes the accompanying drawings used in describing embodiments or the prior art. It is clear that the accompanying drawings in the following descriptions show merely some embodiments of the present invention, and a person of ordinary skill in the art may still derive other drawings from these accompanying drawings without creative efforts.

FIG. 4-1 is a schematic diagram of a network architecture according to an embodiment of this application;

FIG. 4-2 is a schematic diagram of a network architecture according to an embodiment of this application;

FIG. 7 is another schematic diagram of an embodiment of a communication method according to embodiments of this application;

DESCRIPTION OF EMBODIMENTS

Figure 1:
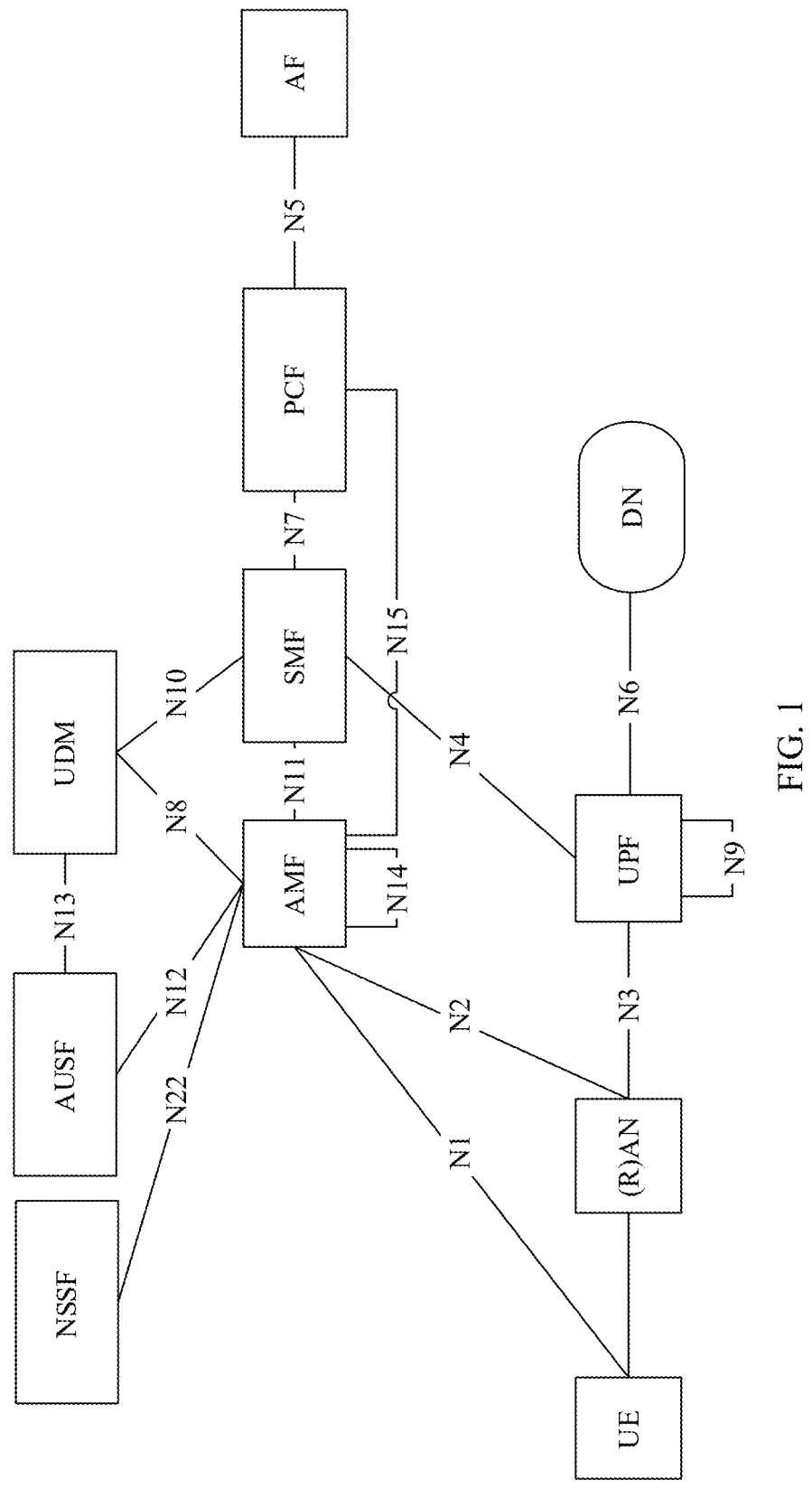
FIG. 1 is a schematic diagram of a network architecture according to an embodiment of this application.

The following describes embodiments of the present invention with reference to the accompanying drawings in embodiments of the present invention. In the specification, claims, and accompanying drawings of this application, the terms "first", "second", "third", "fourth", and the like are intended to distinguish different objects but not describe a particular sequence. In addition, the terms "include", "have", and any variant thereof are intended to cover a non-exclusive inclusion. For example, a process, a method, a system, a product, or a device that includes a series of steps or units is not limited to the listed steps or units, but optionally further includes unlisted steps or units, or optionally further includes other steps or units that are inherent to the process, the method, the product, or the device. An "embodiment" mentioned in this specification means that a particular feature, structure, or characteristic described with reference to this embodiment may be included in at least one embodiment of this application. The phrase shown in various locations in the specification neither necessarily mean a same embodiment nor mean an independent or alternate embodiment exclusive of another embodiment. A person skilled in the art explicitly and implicitly understands that embodiments described in this specification may be combined with other embodiments.

Network elements in embodiments of this application are first described.

Terminal device: The terminal device may be user equipment (user equipment, UE), a handheld terminal, a notebook computer, a subscriber unit (subscriber unit), a cellular phone (cellular phone), a smartphone (smartphone), a wireless data card, a personal digital assistant (personal digital assistant, PDA) computer, a tablet computer, a wireless modem (modem), a handheld (handheld) device, a laptop computer (laptop computer), a cordless phone (cordless phone), a wireless local loop (wireless local loop, WLL) station, a machine type communication (machine type communication, MTC) terminal, or another device that may access a network. The terminal device and an access network device communicate with each other by using an air interface technology.

Access network (radio access network, RAN) device: The RAN device is mainly responsible for functions such as radio resource management, quality of service (quality of service, QoS) management, and data compression and encryption on an air interface side. The access network device may include base stations in various forms, such as a macro base station, a micro base station (also referred to as a small cell), a relay station, and an access point. In systems for which different radio access technologies are used, names of a device that has a base station function may be different. For example, in a 5th generation (5th generation, 5G) system, the device is referred to as a gNB; in an LTE system, the device is referred to as an evolved NodeB (evolved NodeB, eNB or eNodeB); in a 3rd generation (3rd generation, 3G) system, the device is referred to as a NodeB (NodeB); and so on.

Access and mobility management function (access and mobility management function, AMF) network element: The AMF network element belongs to a core network element, and is mainly responsible for signaling processing, for example, functions such as access control, mobility management, attachment and detachment, and gateway selection. When serving a session in a terminal device, the AMF network element provides a control-plane storage resource for the session, and stores a session identifier, an SMF network element identifier associated with the session identifier, and the like.

Untrusted non-3GPP access network (Untrusted non-3GPP Access Network) device: The network element allows interconnection and interworking performed between a terminal device and a 3GPP core network by using a non-3GPP technology. The non-3GPP technology is, for example, wireless fidelity (wireless fidelity, Wi-Fi), worldwide interoperability for microwave access (worldwide interoperability for microwave access, WiMAX), and a code division multiple access (code division multiple access, CDMA) network. Different from a trusted non-3GPP access network device that may directly access the 3GPP core network, the network element needs a security tunnel established by a security gateway to interconnect and interwork with the 3GPP core network. The security gateway is, for example, an evolved packet data gateway (evolved packet data gateway, ePDG) or a non-3GPP interworking function (Non-3GPP interworking function, N3IWF) network element.

Session management function (session management function, SMF) network element: The SMF network element is responsible for user plane network element selection, user plane network element redirection, internet protocol (internet protocol, IP) address assignment, bearer establishment, modification, and release, and QoS control.

User plane function (user plane function, UPF) network element: The UPF network element is responsible for forwarding and receiving user data in a terminal device. The UPF network element may receive user data from a data network, and transmit the user data to the terminal device via an access network device. The UPF network element may further receive user data from the terminal device via the access network device, and forward the user data to the data network. A transmission resource and a scheduling function that are used by the UPF network element to serve the terminal device are managed and controlled by an SMF network element.

Policy control function (policy control function, PCF) network element: The PCF network element mainly supports providing of a unified policy framework to control network behavior and providing of a policy rule for a control layer network function, and is responsible for obtaining policy-related user subscription information.

Authentication server function (authentication server function, AUSF) network element: The AUSF network element mainly provides an authentication function, and supports authentication of 3GPP access and non-3GPP access. For details, refer to 3GPP TS 33.501.

Network exposure function (network exposure function, NEF) network element: The NEF network element mainly supports secure interaction between a 3GPP network and a third-party application. The NEF can securely expose a network capability and an event to a third party, to enhance or improve application service quality. The 3GPP network can also securely obtain related data from the third party, to enhance intelligent decision-making of the network. In addition, the network element supports restoration of structured data from a unified data repository or storage of the structured data in the unified data repository.

Unified data repository (unified data repository, UDR) network element: The UDR network element is mainly responsible for storing structured data. Stored content includes subscription data, policy data, externally exposed structured data, and application-related data.

Application function (application function, AF) network element: The AF network element mainly supports interacting with a 3GPP core network to provide a service, for example, to affect a data routing decision and a policy control function, or provide some third-party services for a network side.

Figure 2:
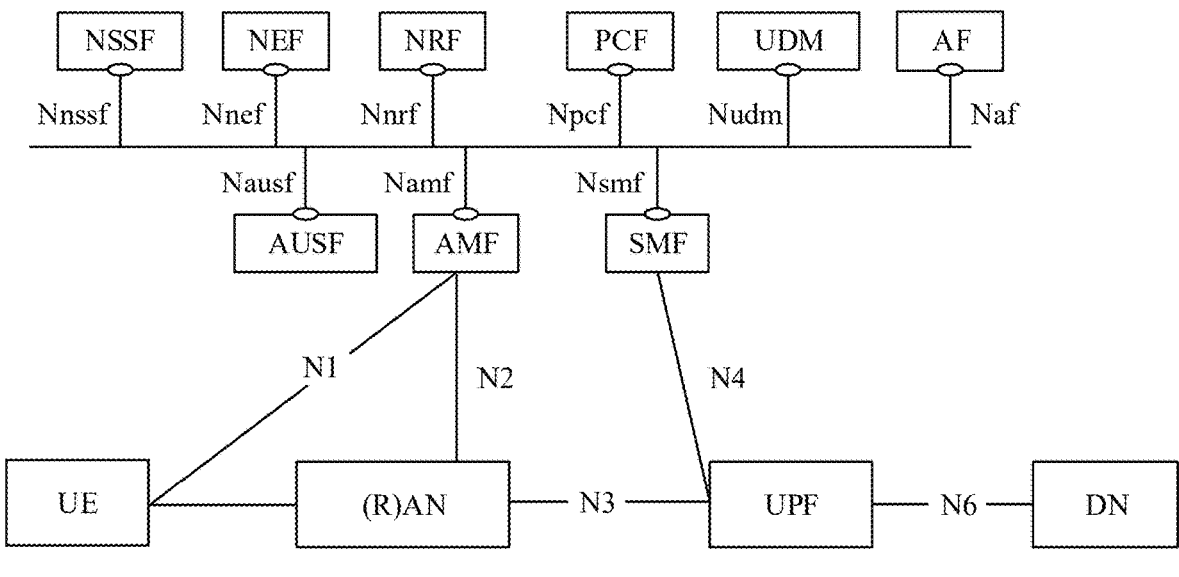
FIG. 2 is a schematic diagram of a network architecture according to an embodiment of this application.

Subsequent embodiments of this application may be applied to an LTE system, a 5G system, or a higher-level network system. The following uses an example in which this application is applied to a 5G scenario for description. Currently, FIG. 1 shows a third generation partnership project (third generation partnership project, 3GPP) system architecture in 5G. Network functions and entities included the 3GPP system architecture mainly include UE, an (R)AN, a UPF, a data network (data network, DN), an AMF, an SMF, a PCF, an AF, an NSSF, an AUSF, and a UDM. For full names of the network functions and the entities, refer to the foregoing descriptions of the network elements. In addition, the figure shows an interaction relationship between the network function entities and corresponding interfaces. For example, the UE and the AMF may interact with each other through an interface N1, and the (R) AN and the AMF may interact with each other through an interface N2. Interaction interfaces (interfaces N3/N4/N5/N6, . . . , and N22) between other network function entities are similar thereto. Details are not described herein again. In the 5G system, a part of interfaces in FIG. 1 may be implemented by using a service-oriented interface (Nnssf/Nnef/Nnrf . . . ). Details are shown in FIG. 2. In addition, a network data analytics function (network data analytics function, NWDAF) entity in a big data analytics network element may interact with another network function through a service-oriented interface Nnwdaf.

Figure 3:
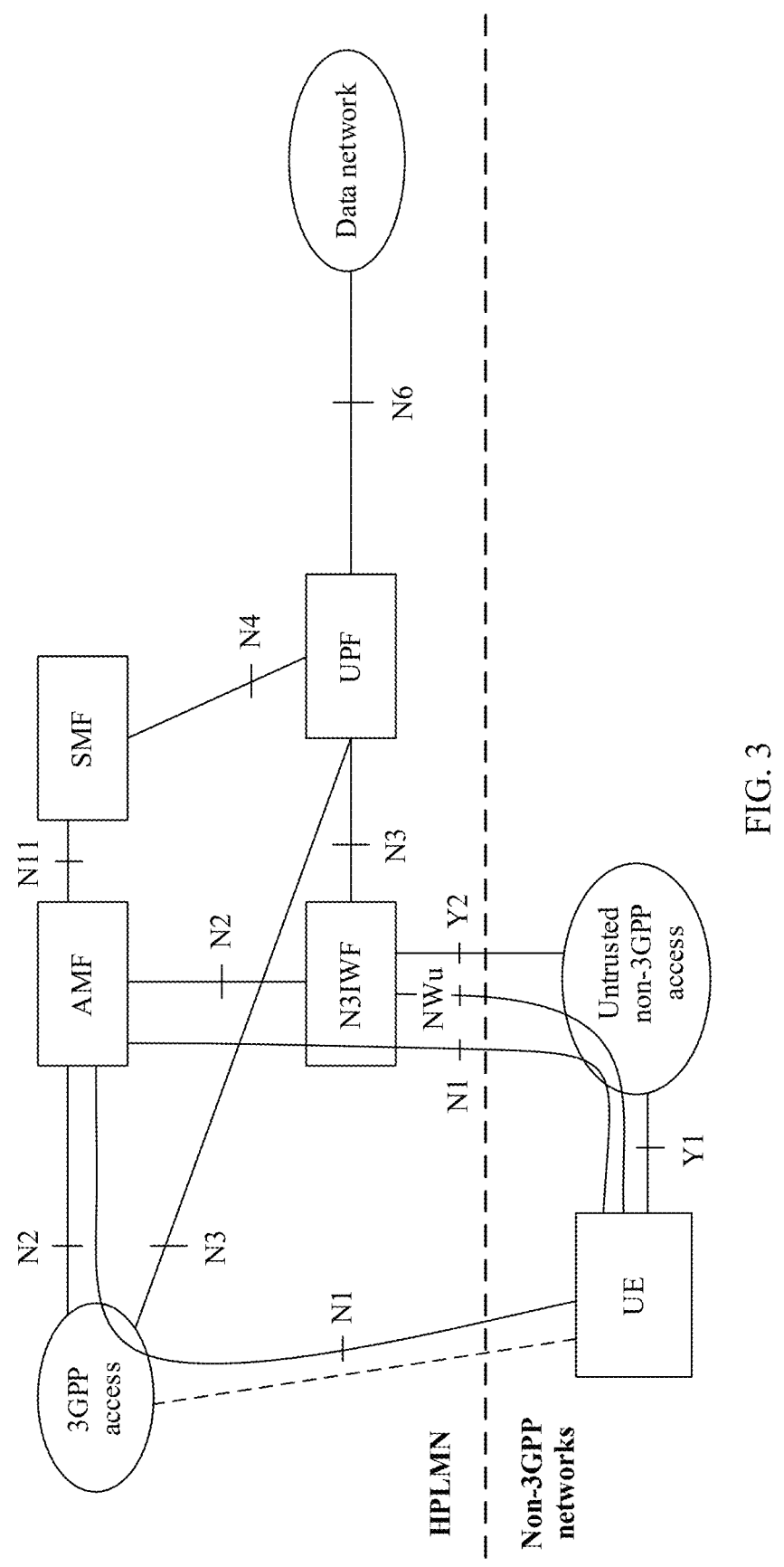
FIG. 3 is a schematic diagram of a network architecture according to an embodiment of this application.

In the network architectures shown in FIG. 1 and FIG. 2, the UE, the (R) AN, the UPF, the DN, and the like are usually referred to as user-layer network function entities. Data traffic of a user may be transmitted by using a protocol data unit (protocol data unit, PDU) session (session) established between the UE and the DN, and the data traffic is transmitted through two network functions (entities): the (R) AN and the UPF. Another part is referred to as control-layer network functions and entities, and is mainly responsible for functions such as authentication and authorization, registration management, session management, mobility management, and policy control, to implement reliable and stable transmission of user-layer traffic. In addition, when the subsequent embodiments of this application are applied to the 5G scenario, a non-3GPP (non-3GPP) system in 5G may be further referenced for implementation. FIG. 3 shows a specific non-3GPP system architecture. A network element, namely, a non-3GPP interworking function (non-3GPP interworking function, N3IWF) entity, is newly added to the non-3GPP system architecture compared with the 3GPP system architecture.

With development of a network, a mobile terminal develops from a single-SIM single-standby implementation mode to a multi-SIM multi-standby implementation mode. A dual-SIM dual-standby implementation mode is used as an example. There are two SIM cards or two software SIM cards (virtual SIMs, corresponding to SIM information in a software form) inside a DSDS mobile terminal, or there are two copies of SIM information inside one SIM card. A user can conveniently and quickly operate two SIM cards in one DSDS mobile terminal by using only the DSDS mobile terminal. The SIM card may be specifically a universal subscriber identity module (Universal Subscriber Identity Module, USIM), an IP multimedia services identity module (IP Multi Media Service Identity Module, ISIM), an embedded SIM (embedded SIM, eSIM) card, or another type of SIM card. This is not limited in this embodiment of this application and subsequent embodiments.

In a conventional technology, different SIM cards in a multi-SIM multi-standby terminal may separately support networks of a same type or different types, for example, a public land mobile network PLMN and a non-public network NPN. Currently, two private network types are defined in 5G R16: an SNPN and a PNI-NPN. The SNPN represents a network that does not rely on a network function of a public network, namely, the PLMN, and there may be an independent access network (RAN) and core network (core network, CN). The PNI-NPN represents a network that may partially rely on the network function provided by the public network, namely, the PLMN. In addition, PNI-NPNs may be further classified into two types currently: (1) Closed access group (closed access group, CAG), which is one of the PNI-NPNs. This type of private network is a part of the public network, namely, the PLMN, and provides a service only for a specific service/user. (2) Slicing (Slicing). This type of private network is also one of the PNI-NPNs, and a service is provided for a specific service/user through dedicated slicing by using a slice characteristic defined in 5G.

There is a concurrency requirement for data of a plurality of SIM cards in the existing multi-SIM multi-standby terminal. This means that concurrency of data services in a plurality of different networks needs to be supported. For example, in an industrial manufacturing scenario, a sensor, a machine apparatus, and a controller in a production line not only need to perform local communication in a factory, but also need to transmit some data to cloud/a data center outside the factory. If private network deployment is used for factory communication, factory devices (the sensor, the machine apparatus, and the controller) need to support concurrency of data services in both a private network and a public network. In addition to an actual requirement in an industrial manufacturing scenario, 3GPP SAI clearly defines a basic requirement for simultaneous access of public and private network services in the industry, and related laws and regulations require that a device in the private network need to support an emergency call (where "support an emergency call" is one of public network services).

The foregoing concurrency requirement for the public and private network services means that the multi-SIM multi-standby terminal needs to support concurrency of data services in at least two different networks. In addition to the related technology introduced in the 3GPP R16 private network subject, a voice technology related to services in a plurality of networks is further included. The following describes technologies related to the services in the plurality of networks.

Overlay (Overlay): A basic configuration is one radio frequency module. In R16, accessing a public network service through an NPN tunnel (where an NPN is used as an N3GPP access network as a whole) is supported. An application scope includes dual-SIM dual-standby dual-active. A protocol is complex. UE processing resource consumption is high. An air interface resource in a private network is occupied.

Roaming (Roaming): A basic configuration is one radio frequency module. As discussed in R17, an NPN and a PLMN are implemented in a manner similar to roaming. An application scope includes dual-SIM/single-SIM single-standby single-active. An interworking interface between a control plane and a user plane in a core network is needed. Deployment difficulty is high. A resource in a private network is occupied.

Simultaneous GSM and LTE (Simultaneous GSM and LTE, SGLTE): A basic configuration is two radio frequency modules (3Rx/2Tx). LTE and GSM concurrency is supported. Voice and data services can be performed simultaneously. A terminal has two baseband radio frequency resources. A multi-mode chip that supports LTE is used for one baseband radio frequency resource, and a GSM chip is used for the other baseband radio frequency resource. An application scope includes single-SIM dual-standby. Costs are high. Power consumption is high.

Simultaneous voice and LTE (Simultaneous Voice and LTE, SVLTE): A basic configuration is two radio frequency modules (3Rx/2Tx). Simultaneous data and voice services are supported. Different from a voice service in SGLTE, the voice service herein may support a 2G/3G network such as GSM, CDMA, and UMST, rather than only GSM. A terminal also needs two baseband radio frequency resources. An application scope includes single-SIM dual-standby. Costs are high. Power consumption is high.

Circuit switched fallback (circuit switched fallback, CSFB): A basic configuration is one radio frequency module. The CSFB supports a data service in a 4G network, and a voice service falls back to 2G/3G for implementation. An application scope includes single-SIM single-standby. In China Mobile and China Unicom scenarios, concurrency of the data service and the voice service in the 4G network is not supported.

Single radio LTE (single radio LTE, SRLTE): A basic configuration is one radio frequency module (2Rx/1Tx). The SRLTE supports a data service in a 4G network, and a voice service is performed in a CDMA network. Different from a solution of CSFB, this solution enables simultaneous standby in an LTE network and a CDMMA 1× network. An application scope is similar to single-SIM dual-standby. In a telecom scenario, concurrency of the data service and the voice service in the 4G network is not supported.

Dual-SIM dual-active (dual SIM dual active, DSDA): A basic configuration is two radio frequency modules/external basebands. The dual-SIM dual-active supports concurrency of data and voice services in a 4G network. An application scope includes dual-SIM dual-standby dual-active. Costs are high. Power consumption is high.

DSDS: A basic configuration is one radio frequency module (2Rx/Tx). The DSDS is dual-SIM dual-standby single-active. Voice services cannot be performed simultaneously for different cards in a terminal. RF resources are dynamically scheduled for dual cards. Paging is periodically parsed. An application scope includes dual-SIM dual-standby single-active. Power consumption and costs are low.

The technology with two radio frequency modules has low availability due to high costs and power consumption. The overlay and roaming solutions each with one radio frequency module are new solutions proposed in a 3GPP private network subject, but disadvantages are obvious. In the overlay solution, the protocol is complex, the UE processing resource consumption is high, and the air interface resource in the private network is occupied. In the roaming solution, the interworking interface between the control plane and the user plane in the core network is needed, the deployment difficulty is high, and the resource in the private network is also occupied.

For example, when a problem of concurrency of the services in the plurality of networks is resolved, in a related conventional technology, a DSDS terminal is used as an example. Radio frequency channels of the DSDS terminal are classified into a primary channel and a secondary channel. The primary channel in the DSDS terminal includes a receiver (RX) and a transmitter (TX), and the secondary channel in the DSDS terminal includes only an RX for listening. However, in the DSDS terminal, if TX preemption occurs on a SIM card, that is, when the SIM card occupies the primary channel, the other SIM card releases a resource, performs network searching and camping, and enters an idle (IDLE) state. Consequently, efficient service concurrency cannot be implemented.

Further, if n-SIM m-active exists in a terminal, that is, when the terminal includes n SIM cards and m radio frequency devices, where n is greater than m, and m is an integer greater than 0 (for example, terminals such as three-SIM three-standby dual-active and four-SIM four-standby three-active), to implement a communication requirement for service concurrency of the terminal, a radio frequency channel in the terminal needs to satisfy communication of at least two SIM cards. Because the radio frequency channel can receive and send related data of only one of the SIM cards at a same moment, when a radio frequency channel preemption occurs on a SIM card, another SIM card that uses the radio frequency resource releases a resource, and performs network searching and camping. Consequently, service interruption occurs, and concurrency of interrupted services of n-SIM m-active cannot be implemented.

Further, n-SIM n-active exists in a terminal, where n is an integer greater than 1, that is, when a quantity of SIM cards and a quantity of radio frequency channels are the same in the terminal (for example, a dual-SIM dual-standby dual-active terminal, a three-SIM three-standby three-active terminal, and a four-SIM four-standby four-active terminal), an operator or a user may set different priorities for different SIM cards. For example, a SIM card with a high priority may use at least two of n radio frequency channel cards, a SIM card with a low priority may use only specified one of the n radio frequency channels. In this case, the SIM card with the high priority may preempt the radio frequency channel of the SIM card with the low priority. As a result, the SIM card with the low priority releases a resource, and performs network searching and camping. Consequently, service interruption occurs on the SIM card with the low priority. In this case, if the SIM card with the low priority needs to execute an emergency call service or another service with a low latency requirement, because the radio frequency channel that is allowed to be used by the SIM card with the low priority is preempted, that is, because the n-SIM n-active terminal cannot implement service concurrency, the terminal cannot meet a user requirement, and user experience is greatly reduced.

In conclusion, an existing related implementation process of resolving the problem of concurrency of the services in the plurality of networks is limited by a hardware capability, and efficient service concurrency cannot be implemented.

Therefore, this application mainly provides an air interface resource management method that is based on a UE granularity (instead of based on a SIM card) for this problem, to implement efficient concurrency of public and private network services.

Figures 1, 4:
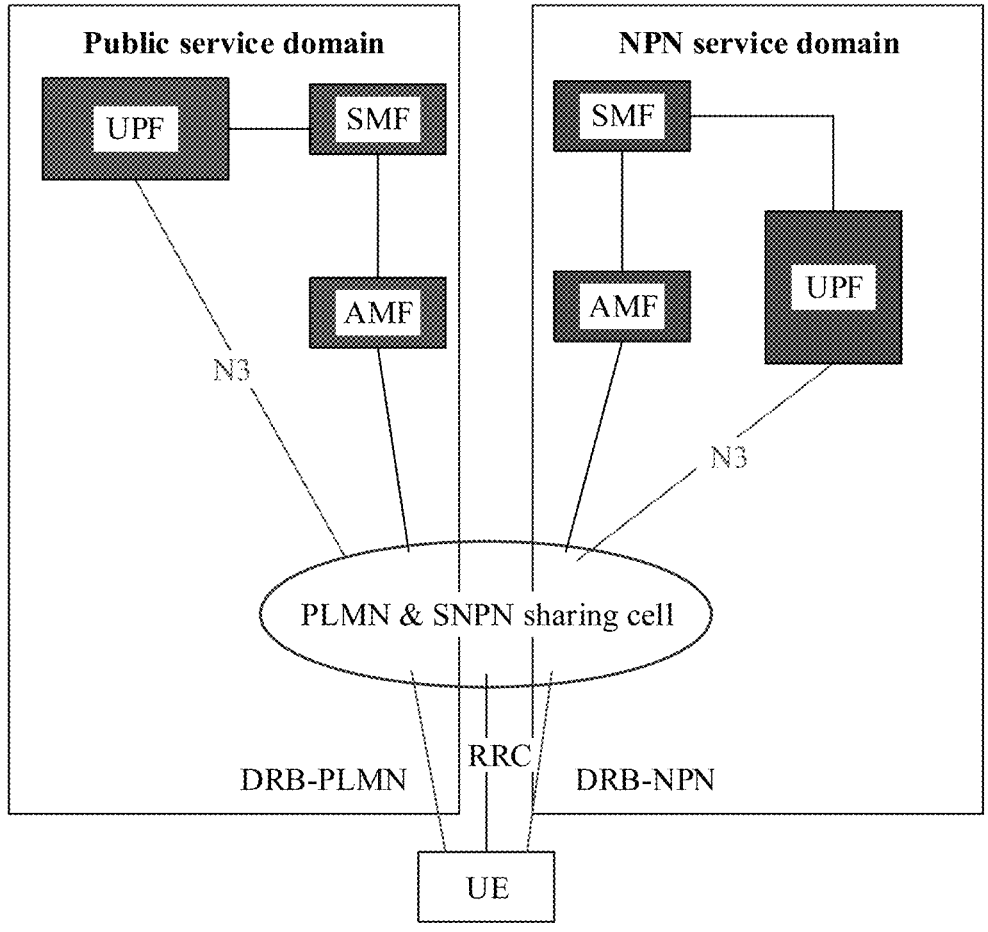
Figures 2, 4:
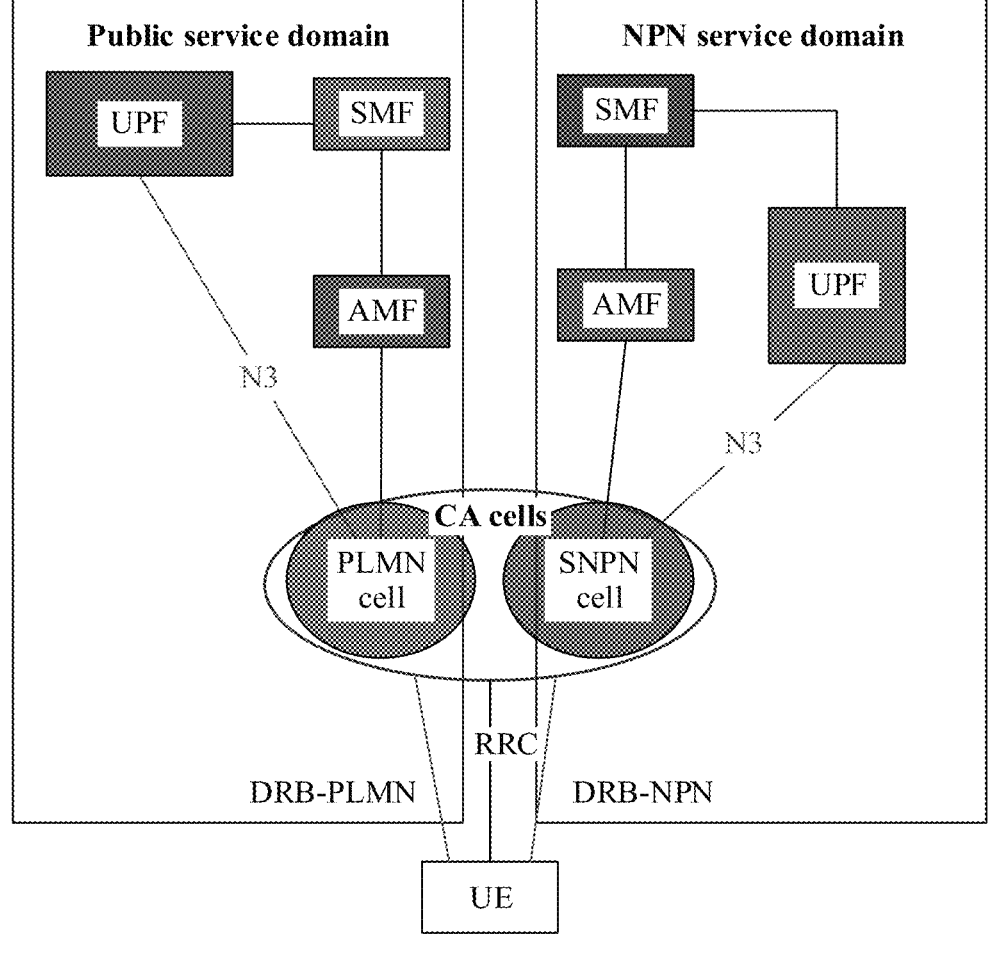

This application is mainly applicable to concurrency of services in a plurality of networks. The plurality of networks include at least two different networks. For example, concurrency of services in the at least two different networks may include:

(1) concurrency of services in a public network and a private network, as shown in FIG. 4-1 and FIG. 4-2 (where particularly, if a type of an NPN is a PNI-NPN, a PLMN network element and an NPN network element shown in the figure can be the same);

(2) concurrency of services in private networks; and (3) concurrency of services in public networks.

Specifically, FIG. 4-1 shows a cell sharing scenario. To be specific, a private network user and a public network user may access their respective networks by using a same cell (for example, a current CAG cell, where both the private network user and the public network user may perform access). In a scenario in which a mobile phone includes a plurality of SIM cards, one of the cards may access a private network, and another card may access a public network, but the same cell is used for separate access.

FIG. 4-2 shows a carrier aggregation (Carrier Aggregation, CA) resource pool sharing scenario. Generally, each frequency cell is referred to as a component carrier (component carrier, CC). Different networks may share a resource pool including different component carriers CCs. Public network/private network UE may select an independent/same primary component carrier (primary component carrier, PCC) and aggregate different secondary component carriers (secondary component carrier, SCC) in the resource pool, to increase bandwidth. In addition, a base station may dynamically add or delete a secondary carrier cell.

Specifically, in UE shown in FIG. 4-1 and FIG. 4-2, the UE is a multi-SIM multi-standby terminal, and includes at least two SIM cards (namely, a first SIM card and a second SIM card). It is clear that the UE may further include a third SIM card, a fourth SIM card, and even more SIM cards, to support multi-SIM communication. This is not limited herein. In this application, adaptive solutions are provided based on scenarios corresponding to current different connection statuses of each SIM card in the UE. The following separately describes the adaptive solutions.

1. Applied to a scenario in which the first SIM card in the UE has set up a radio resource control (radio resource control, RRC) connection to a network side.

Figure 5:
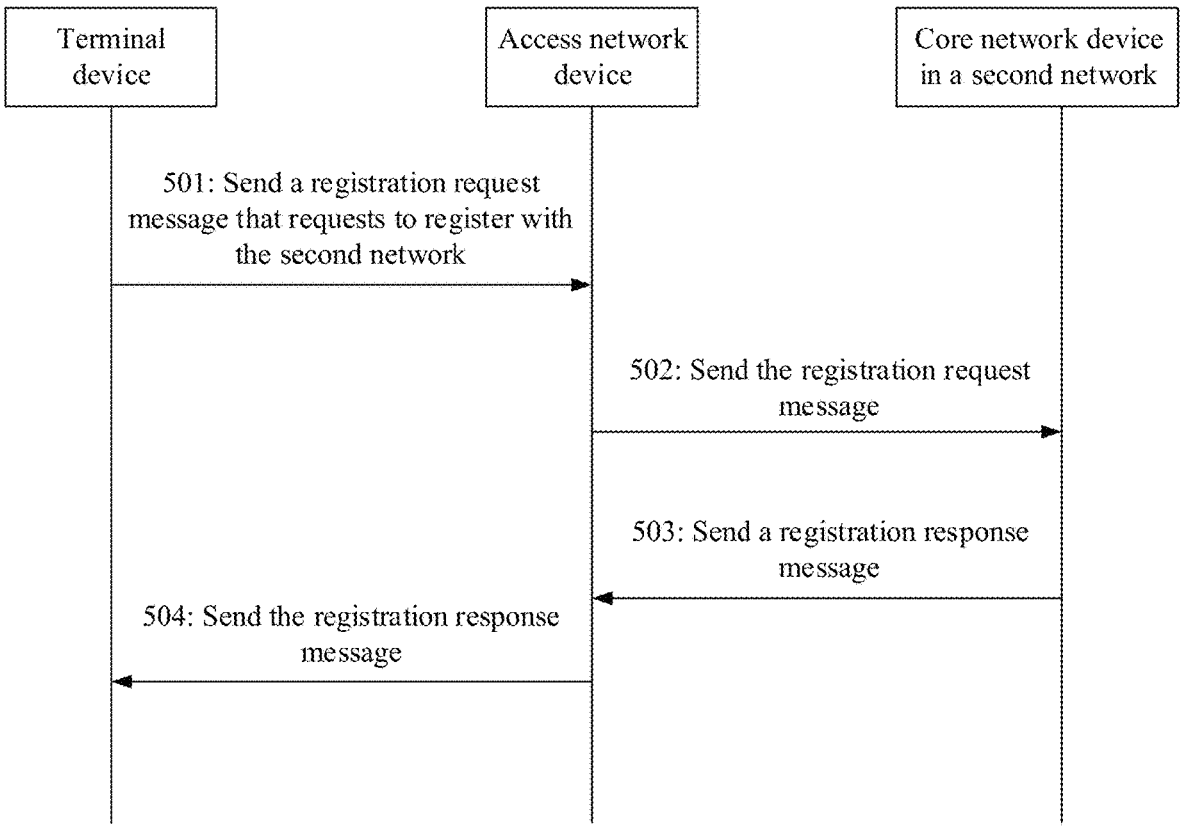
FIG. 5 is a schematic diagram of an embodiment of a communication method according to embodiments of this application.

Refer to FIG. 5. An embodiment of a communication method according to embodiments of this application includes the following steps.

501: A terminal device sends, to an access network device through an RRC connection for communication between a first network and the terminal device, a registration request message that requests to register with a second network.

In this embodiment, the terminal device sends, to the access network device through the RRC connection for the communication between the first network and the terminal device, the registration request message that requests to register with the second network. Correspondingly, in step 501, the access network device receives, from the terminal device through the RRC connection for the communication between the first network and the terminal device, the registration request message that requests to register with the second network.

In this embodiment and subsequent embodiments, for specific implementation of the terminal device and the access network device, refer to the foregoing description content of the network elements. The terminal device and the access network device may be specifically a terminal device and an access network device in an LTE system, a 5G system, or a higher-level system. This is not limited herein.

In a specific implementation, the RRC connection in step 501 may be an RRC connection that is pre-established by the access network device according to a standard procedure and that is for the communication between the first network and the terminal device. The terminal device may be a multi-SIM multi-standby terminal. In other words, the terminal device includes at least a first subscriber identity module and a second subscriber identity module. It is clear that the terminal device may further include a third subscriber identity module, a fourth subscriber identity module, or more other subscriber identity modules, to support multi-SIM multi-standby communication. For example, the subscriber identity module in the terminal device may be a SIM, a USIM, an ISIM, an eSIM, or another type of subscriber identity module. The multi-SIM multi-standby terminal may specifically include n-SIM m-active. To be specific, the multi-SIM multi-standby terminal includes n SIM cards and m radio frequency devices, where n is greater than m and m is an integer greater than 0 (for example, a three-SIM three-standby dual-active terminal or a four-SIM four-standby three-active terminal). Alternatively, the multi-SIM multi-standby terminal may specifically include n-SIM n-active, where n is an integer greater than 1. To be specific, a quantity of SIM cards in the terminal is the same as a quantity of radio frequency channels (for example, a dual-SIM dual-standby dual-active terminal, a three-SIM three-standby three-active terminal, and a four-SIM four-standby four-active terminal). This is not limited herein.

Specifically, in the terminal device, the first subscriber identity module corresponds to the first network, and the second subscriber identity module corresponds to the second network. In other words, the first subscriber identity module in the terminal device performs NET selection based on network information broadcast on a RAN side (where a PLMN ID is broadcast in a public network/a PLMN ID and a CAG ID are broadcast in a CAG-type private network/a PLMN ID and an NID are broadcast in an SNPN-type private network) and locally configured network selection priority information, to determine the first network. A process in which the second subscriber identity module in the terminal device determines the second network is similar to a process of determining the first network. Details are not described herein again. The registration request message may further carry identification information of the second network. Specifically, the identification information of the second network may include identification information such as a PLMN ID, a CAG ID, and an NID.

In addition, the first network and the second network may be a same communication network or different communication networks. The communication network may include a public land mobile network PLMN, a non-public network NPN, or any other type of network. This is not limited herein. In this case, an implementation process of step 501 may specifically include: The terminal device sends, to the access network device through the RRC connection for the communication between the first subscriber identity module and the terminal device, the registration request message that is from the second subscriber identity module and that requests to register with the second network.

In a specific implementation process of step 501, the terminal device may send identification information of the first subscriber identity module and identification information of the second subscriber identity module to the access network device through the RRC connection, so that the access network device can determine that the terminal device includes the first subscriber identity module and the second subscriber identity module. The identification information of the first subscriber identity module and the identification information of the second subscriber identity module may be carried in an RRC uplink message (for example, an RRC setup request (RRC Setup Request) message, an RRC reestablishment request (RRC Reestablishment Request) message, and an uplink data transmission (UL Information Transfer) message) sent by the terminal device to the access network device before step 501, a message in which the registration request message sent in step 501 is located, or another message sent by the terminal device to the access network device. This is not limited herein. In addition, in the RRC uplink message, the terminal device may further carry an uplink cause (cause) value for the second subscriber identity module. That is, the RRC uplink message carries a cause 2 corresponding to the second subscriber identity module.

In the specific implementation process of step 501, the terminal device may further send a first indication to the access network device through the RRC connection. The first indication indicates that the RRC connection is for communication between a plurality of networks and the terminal device. Specifically, the first indication may be carried in the UL information transfer message sent by the terminal device to the access network device before step 501, the message in which the registration request message sent in step 501 is located, or the another message sent by the terminal device to the access network device. This is not limited herein. Then, the access network device may modify, based on the first indication sent by the terminal device, a type of the RRC connection as an RRC connection shared by the plurality of networks. Further, the access network device may further send, to the terminal device, a first downlink RRC message indicating that the type of the RRC connection is the RRC connection shared by the plurality of networks. That is, the access network device may modify, based on the first indication, the type of the RRC connection as the RRC connection shared by the plurality of networks. In this way, in step 501, the access network device receives, from the terminal device through the RRC connection whose type is the RRC connection shared by the plurality of networks, the registration request message that requests to register with the second network. Specifically, the terminal device may include a plurality of (at least two) subscriber identity modules. The first indication may specifically indicate an RRC connection shared by some specified subscriber identity modules in the plurality of subscriber identity modules of the terminal device. In this case, identification may be performed by using the foregoing carried identification information of the first subscriber identity module and identification information of the second subscriber identity module. Alternatively, the first indication may specifically indicate an RRC connection shared by all user identities in the plurality of subscriber identity modules of the terminal device. In this case, identification may be performed by using the identification information of the first subscriber identity module, the identification information of the second subscriber identity module, and identification information of another subscriber identity module that may exist. This is not limited herein.

In addition, after the access network device receives the first indication from the terminal device, the access network device may determine that the RRC connection is for communication between the plurality of networks and the terminal device. Then, the access network device may associate, based on the identification information of the first subscriber identity module and the identification information of the second subscriber identity module, contexts corresponding to the two subscriber identity modules, so that the access network device can use a same signaling radio bearer (signaling radio bearer, SRB) or different SRBs in a subsequent signaling processing process for the first subscriber identity module and the second subscriber identity module.

Before step 501, the terminal device may further set a trigger condition based on a cell on which the first subscriber identity module camps and a cell on which the second subscriber identity module camps. The first subscriber identity module camps on a target cell, and a service area of the access network device includes the target cell. When the terminal device determines that the second subscriber identity module camps on the target cell, that is, when the terminal device determines that the first subscriber identity module and the second subscriber identity module camp on a same cell, the terminal device determines that the second subscriber identity module may perform communication through the RRC connection between the first subscriber identity module and the access network device. Then, the terminal device triggers performing of step 501, to be specific, triggers execution of sending, to the access network device through the RRC connection for the communication between the first network and the terminal device, the registration request message that requests to register with the second network. In this way, a success rate of registration performed by the second subscriber identity module in the terminal device by using the access network device is improved, and communication efficiency is further improved. Specifically, the terminal device may determine, by receiving information such as a cell ID broadcast in a system message (for example, a master information block (master information block, MIB), a system information block (system information block, SIB), or another information block) from the access network device, an ID of the cell on which the first subscriber identity module camps and an ID of the cell of the second subscriber identity module. If the cell IDs selected by the first subscriber identity module and the second subscriber identity module are the same, it is determined that the first subscriber identity module and the second subscriber identity module camp on a same cell;

otherwise it is determined that the first subscriber identity module and the second subscriber identity module camp on different cells.

502: The access network device sends the registration request message to a core network device in the second network.

In this embodiment, the access network device sends the registration request message to the core network device in the second network. Correspondingly, the core network device in the second network receives the registration request message from the access network device in step 502.

Specifically, the access network device determines the identification information of the second network in step 501, and sends the registration request message to the core network device in the second network based on the identification information of the second network, to be specific, sends, to the core network device, the registration request message that is from the terminal device and that requests to register with the second network.

503: The core network device sends a registration response message to the access network device.

In this embodiment, when the core network device determines that the terminal device registers with the second network, the core network device sends the registration response message to the access network device. Correspondingly, the access network device receives the registration response message from the core network device in step 503.

In a specific implementation, the terminal device may be a multi-SIM multi-standby terminal. The terminal device includes at least the first subscriber identity module and the second subscriber identity module. In addition, the first subscriber identity module corresponds to the first network, and the second subscriber identity module corresponds to the second network. After the access network device receives the identification information of the first subscriber identity module and the identification information of the second subscriber identity module from the terminal device through the RRC connection in step 501, the access network device may determine that the terminal device includes the first subscriber identity module and the second subscriber identity module. In this way, after step 503, to be specific, after the access network device receives the registration response message from the core network device, the access network device may determine that the terminal device registers with the second network, and then the access network device may associate the context corresponding to the identification information of the first subscriber identity module with the context corresponding to the identification information of the second subscriber identity module. That is, the access network device associates the RRC connection, the context corresponding to the identification information of the first subscriber identity module, and the context corresponding to the identification information of the second subscriber identity module, so that both the first subscriber identity module and the second subscriber identity module in the terminal device implement communication through the RRC connection, and service concurrency of the multi-SIM and multi-standby terminal device is implemented.

After step 503, to be specific, after the access network device sends the registration response message to the terminal device through the RRC connection, the access network device may determine that the terminal device registers with the second network. In this case, the access network device may establish an access stratum AS security configuration that is between the access network device and the terminal device and that is shared by the first subscriber identity module and the second subscriber identity module. The AS security configuration is a shared AS security configuration. This avoids a disclosure risk of the AS security configuration, and improves communication security of the terminal device. In addition, in step 501, if the access network device has established an access stratum AS security configuration between the access network device and the first subscriber identity module in the terminal device in a process in which the access network device sets up the RRC connection for the communication between the first network and the terminal device, after the access network device receives the registration response message from the core network device, the access network device may re-establish the access stratum AS security configuration that is between the access network device and the terminal device and that is shared by the first subscriber identity module and the second subscriber identity module. Specifically, conventional AS security is separately established based on different subscriber identity modules. That is, different AS security is established for different subscriber identity modules. If the second subscriber identity module performs communication by using an AS context established for the first subscriber identity module, the second subscriber identity module may obtain the AS context of the first subscriber identity module. Relatively, AS security of the first subscriber identity module is reduced. Therefore, shared AS security established herein is jointly established for a plurality of subscriber identity modules. This avoids the disclosure risk of the AS security configuration, and can improve the communication security of the terminal device to some extent.

In addition, after step 503, to be specific, after the access network device may determine that the terminal device registers with the second network, the access network device may establish a NAS security procedure between the second network and the terminal device through the RRC connection.

After step 503, to be specific, after the access network device sends the registration response message to the terminal device through the RRC connection, the access network device may determine that the terminal device registers with the second network. In this case, the access network device establishes a second non-access stratum NAS data link that is between the access network device and the core network device and that is related to the second subscriber identity module, and NAS data between the terminal device and the core network device in the second network may be subsequently transmitted through the NAS data link. Specifically, when the access network device receives a downlink NAS message from the core network device through the second NAS data link, the access network device sends the downlink NAS message to the second subscriber identity module through the RRC connection; and/or when the access network device receives an uplink NAS message from the terminal device through the RRC connection, the access network device sends the uplink NAS message to the core network device through the second NAS data link. This provides a specific implementation process of communication between the second subscriber identity module and the core network device in the second network, improves feasibility of the solution, and improves implementation flexibility of the solution. For example, the second NAS data link may include an S1 application protocol (S1 Application Protocol, S1AP) data link in an LTE scenario, may include an NG application protocol (NG application protocol, NGAP) data link in a 5G scenario, or may be implemented by using another data link. This is not limited herein.

After step 503, to be specific, after the access network device sends the registration response message to the terminal device through the RRC connection, the access network device may determine that the terminal device registers with the second network. In this case, the access network device may allocate data radio bearers DRBs to the first subscriber identity module and the second subscriber identity module; and/or the access network device may allocate carrier components CCs to the first subscriber identity module and the second subscriber identity module. Because both the first subscriber identity module and the second subscriber identity module in the terminal device communicate with the access network device through the RRC connection, and a radio resource of the access network device is limited, the access network device may allocate the data radio bearers DRBs and/or the carrier components CCs to the first subscriber identity module and the second subscriber identity module, so that the access network device can provide differentiated services for the different subscriber identity modules in the terminal device.

Specifically, if it needs to be clearly distinguished that different data radio bearers (data radio bearer, DRB) are used for service data in different networks, the access network device may distinguish, based on public and private network service types (which may be any one or a combination of a NET ID, a CAG ID, and an NID), that service data traffic comes from the different networks, and establish or modify the DRBs, so that the different DRBs are used for the service data traffic in the different networks. The following describes the allocation process by using examples.

(1) If a scheduling mechanism of a CC unit/or an enhanced CC unit further needs to be distinguished, a RAN higher layer (RRC, packet data convergence protocol (packet data convergence protocol, PDCP), or radio link control (radio link control, RLC)) in the access network device notifies a resource scheduler (logically belonging to a media access control (media access control, MAC) layer in the access network device) of public and private network types of data/services.

(2) If a CA characteristic is supported, and a plurality of CCs are involved, the resource scheduler may use specific CCs based on the public and private network types of the data/services.

(3) If only a single CC is involved, the resource scheduler may properly allocate resources on the CC additionally based on the public and private network types of the data/services (for example, ensuring a public and private network service ratio).

504: The access network device sends the registration response message to the terminal device through the RRC connection.

In this embodiment, the access network device sends the registration response message to the terminal device through the RRC connection. Correspondingly, the terminal device receives the registration response message from the access network device through the RRC connection in step 504.

In a specific implementation, the access network device may further use a second indication in step 504, where the second indication indicates that the registration response message is associated with the second subscriber identity module in the terminal device, so that the terminal device determines, based on the second indication, that the second subscriber identity module has registered with the second network. Subsequently, the second subscriber identity module in the terminal device may communicate with the core network device in the second network through the RRC connection, to implement service concurrency of the terminal device. The second indication may be an explicit indication manner, or may be an implicit indication manner. Details are as follows:

When the second indication is the explicit indication manner, the access network device sends the second indication to the terminal device through the RRC connection. During specific implementation, the second indication may be implemented by using a newly added special field in an RRC downlink message (for example, an RRC setting (RRC setup) message, an RRC resetting (RRC Reestablishment Request) message, or an RRC reestablishment (RRC Reestablishment) message) sent by the access network device to the terminal device, may be implemented by using newly added type information in an RRC downlink message (for example, an RRC setting message, an RRC resetting message, or an RRC reestablishment message) sent by the access network device to the terminal device, or may be implemented in another manner. This is not limited herein.

When the second indication is the implicit indication manner, the access network device sends the second indication to the terminal device through the RRC connection. During specific implementation, the second indication may be a new message re-established by the access network device. The new message is different from a common RRC downlink message, and indicates that the registration response message is associated with a specified subscriber identity module (the second subscriber identity module) in the terminal device.

In this embodiment, after the access network device sets up the RRC connection for the communication between the first network and the terminal device, the access network device receives, from the terminal device through the RRC connection for the communication between the first network and the terminal device, the registration request message that requests to register with the second network, and sends the registration request message to the core network device in the corresponding second network. Then, after the access network device receives the registration response message from the core network device, the access network device sends the registration response message to the terminal device, to complete a process in which the terminal device registers with the second network. That is, the access network device manages an air interface resource of the terminal device through the established RRC connection to the terminal device, to implement service concurrency of the terminal device by reusing the RRC connection, and improve communication efficiency.

2. Applied to a scenario in which the first SIM card in the UE has not set up an RRC connection to a network side.

Figure 6:
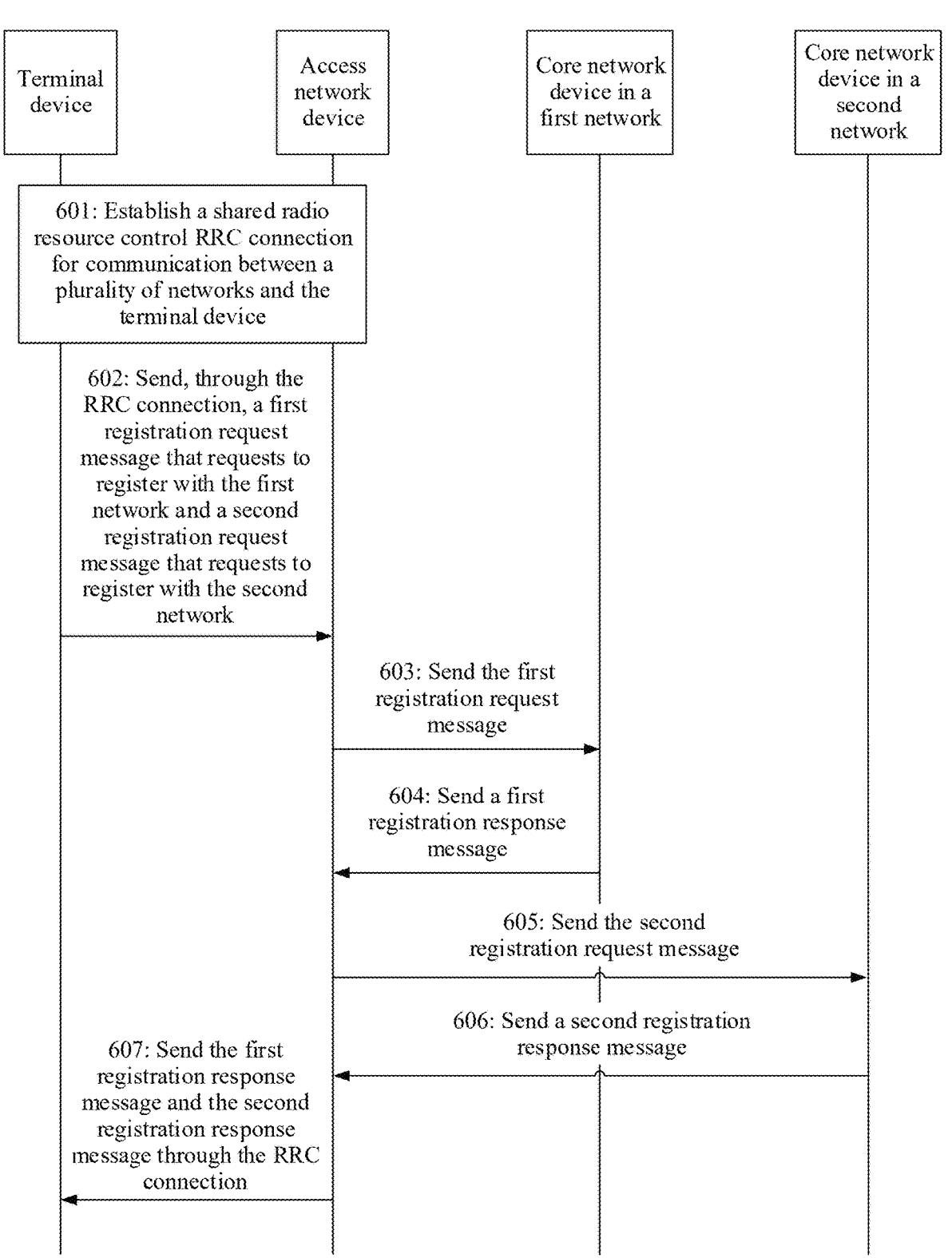
FIG. 6 is another schematic diagram of an embodiment of a communication method according to embodiments of this application.

Refer to FIG. 6. Another embodiment of a communication method according to embodiments of this application includes the following steps.

601: An access network device sets up a shared radio resource control RRC connection for communication between a plurality of networks and a terminal device.

In this embodiment, the access network device may set up, based on an RRC request message of the terminal device, the shared radio resource control RRC connection for the communication between the plurality of networks and the terminal device.

In a specific implementation, the terminal device may be a multi-SIM multi-standby terminal. The terminal device includes at least a first subscriber identity module and a second subscriber identity module. In addition, the first subscriber identity module corresponds to a first network, and the second subscriber identity module corresponds to a second network. For example, the subscriber identity module in the terminal device may be a SIM, a USIM, an ISIM, an eSIM, or another type of subscriber identity module. The multi-SIM multi-standby terminal may specifically include n-SIM m-active. To be specific, the multi-SIM multi-standby terminal includes n SIM cards and m radio frequency devices, where n is greater than m and m is an integer greater than 0 (for example, a three-SIM three-standby dual-active terminal or a four-SIM four-standby three-active terminal). Alternatively, the multi-SIM multi-standby terminal may specifically include n-SIM n-active, where n is an integer greater than 1. To be specific, a quantity of SIM cards in the terminal is the same as a quantity of radio frequency channels (for example, a dual-SIM dual-standby dual-active terminal, a three-SIM three-standby three-active terminal, and a four-SIM four-standby four-active terminal). This is not limited herein.

In step 601, a process in which the access network device sets up the RRC connection may specifically include: The access network device receives identification information of the first subscriber identity module and identification information of the second subscriber identity module from the terminal device, so that the access network device can determine that the terminal device includes the first subscriber identity module and the second subscriber identity module. After the access network device sets up the RRC connection shared with the first subscriber identity module and the second subscriber identity module in the terminal device, both the first subscriber identity module and the second subscriber identity module in the terminal device implement communication through the RRC connection, and service concurrency of the multi-SIM multi-standby terminal device is implemented. The identification information of the first subscriber identity module and the identification information of the second subscriber identity module may be carried in an RRC uplink message (for example, an RRC setup request (RRC Setup Request) message, an RRC reestablishment request (RRC Reestablishment Request) message, or an uplink data transmission (UL Information Transfer) message) sent by the terminal device to the access network device. In addition, in the RRC uplink message, the terminal device may further carry different uplink cause (cause) values for different subscriber identity modules. To be specific, the RRC uplink message carries a cause 1 corresponding to the first subscriber identity module and a cause 2 corresponding to the second subscriber identity module.

Further, in an implementation process of step 601, in the process in which the access network device sets up the RRC connection, the access network device may send basic configuration information (for example, radio bearer configuration (RadioBearerConfig) or master cell group (MasterCellGroup) information) to the terminal device. After receiving the configuration information, the terminal device may configure a same SRB or different SRBs for the first subscriber identity module and the second subscriber identity module, and may simultaneously send registration request messages of the first subscriber identity module and the second subscriber identity module through the common RRC connection subsequently.

In addition, before the terminal device sends the RRC uplink message to the access network device, the terminal device may further set a trigger condition based on a cell on which the first subscriber identity module camps and a cell on which the second subscriber identity module camps. A service area of the access network device includes a target cell. When the terminal device determines that both the cell on which the second subscriber identity module camps and the cell on which the first subscriber identity module camps are the target cell, the terminal device determines that the second subscriber identity module may perform communication through the RRC connection between the first subscriber identity module and the access network device. In this case, the terminal device triggers execution of sending of the RRC uplink message to the access network device, so that a success rate of registration performed by the first subscriber identity module and the second subscriber identity module in the terminal device by using the access network device subsequently is improved, and communication efficiency is further improved.

602: The access network device receives, from the terminal device through the RRC connection, a first registration request message that requests to register with the first network and a second registration request message that requests to register with the second network.

In this embodiment, the access network device receives, from the terminal device through the RRC connection, the first registration request message that requests to register with the first network and the second registration request message that requests to register with the second network. Correspondingly, in step 602, the terminal device sends, to the access network device through the RRC connection, the first registration request message that requests to register with the first network and the second registration request message that requests to register with the second network.

Specifically, in the terminal device, the first subscriber identity module corresponds to the first network, and the second subscriber identity module corresponds to the second network. In other words, the first subscriber identity module in the terminal device performs NET selection based on network information broadcast on a RAN side (where a PLMN ID is broadcast in a public network/a PLMN ID and a CAG ID are broadcast in a CAG-type private network/a PLMN ID and an NID are broadcast in an SNPN-type private network) and locally configured network selection priority information, to determine the first network. A process in which the second subscriber identity module in the terminal device determines the second network is similar to a process of determining the first network. Details are not described herein again. The registration request message may further carry identification information of the second network. Specifically, the identification information of the second network may include identification information such as a PLMN ID, a CAG ID, and an NID. In addition, the first network and the second network may be a same communication network or different communication networks. The communication network may include a public land mobile network PLMN, a non-public network NPN, or any other type of network. This is not limited herein. In this case, an implementation process of step 501 may specifically include: The terminal device sends, to the access network device through the RRC connection for the communication between the first subscriber identity module and the terminal device, the registration request message that is from the second subscriber identity module and that requests to register with the second network. The first registration request message and the second registration request message may further respectively carry identification information of the first network and the identification information of the second network. Specifically, the identification information of the first network and the identification information of the second network each may include identification information such as a PLMN ID, a CAG ID, and an NID.

603: The access network device sends a first request message to a core network device in the first network.

In this embodiment, the access network device sends the first request message to the core network device in the first network. Correspondingly, in step 603, the core network device in the first network receives the first request message from the access network device.

Specifically, the access network device determines the identification information of the first network in step 602, and sends the first registration request message to the core network device in the first network based on the identification information of the first network, to be specific, sends, to the core network device in the first network, the first registration request message that is from the terminal device and that requests to register with the first network.

604: The access network device receives a first registration response message from the core network device in the first network.

In this embodiment, the access network device receives the first registration response message from the core network device in the first network. Correspondingly, in step 604, the core network device determines that the terminal device registers with the first network. In this case, the core network device in the first network sends the first registration response message to the access network device.

After step 604, to be specific, after the access network device receives the first registration response message from the core network device in the first network, the access network device may further establish a first non-access stratum NAS data link that is between the access network device and the core network device in the first network and that is related to the first subscriber identity module, and NAS data between the terminal device and the core network device in the first network may be transmitted through the first NAS data link subsequently. Specifically, when the access network device receives a first downlink NAS message from the core network device in the first network through the first NAS data link, the access network device sends the first downlink NAS message to the terminal device through the RRC connection, where the first downlink NAS message carries the identification information of the first subscriber identity module; and/or when the access network device receives a second NAS message from the terminal device through the RRC connection, the access network device sends the first uplink NAS message to the core network device in the first network through the first NAS data link, where the first uplink NAS message carries the identification information of the first subscriber identity module. This provides a specific implementation process of communication between the first subscriber identity module and the core network device in the first network, improves feasibility of the solution, and improves implementation flexibility of the solution. For example, the first NAS data link may include an S1AP data link in an LTE scenario, may include an NGAP data link in a 5G scenario, or may be implemented by using another data link. This is not limited herein.

In addition, after step 604, to be specific, after the access network device may determine that the terminal device registers with the first network, the access network device may establish a NAS security procedure between the first network and the terminal device through the RRC connection.

605: The access network device sends a second request message to a core network device in the second network.

In this embodiment, the access network device sends the second request message to the core network device in the second network. Correspondingly, the core network device in the second network receives the second request message from the access network device in step 603.

Specifically, the access network device determines the identification information of the second network in step 602, and sends the second registration request message to the core network device in the second network based on the identification information of the second network, to be specific, sends, to the core network device in the second network, the second registration request message that is from the terminal device and that requests to register with the second network.

606: The access network device receives a second registration response message from the core network device in the second network.

In this embodiment, the access network device receives the second registration response message from the core network device in the second network. Correspondingly, in step 606, the core network device determines that the terminal device registers with the second network. In this case, the core network device in the second network sends the second registration response message to the access network device.

After step 606, to be specific, after the access network device receives the second registration response message from the core network device in the second network, the access network device may establish a second NAS data link that is between the access network device and the core network device in the second network and that is related to the second subscriber identity module, and NAS data between the terminal device and the core network device in the second network may be transmitted through the NAS data link subsequently. Specifically, when the access network device receives a second downlink NAS message from the core network device in the second network through the second NAS data link, the access network device sends the second downlink NAS message to the terminal device through the RRC connection, where the second downlink NAS message carries the identification information of the second subscriber identity module; and/or when the access network device receives a second uplink NAS message from the terminal device through the RRC connection, the access network device sends the second uplink NAS message to the core network device in the second network through the second NAS data link, where the second uplink NAS message carries the identification information of the second subscriber identity module. This provides a specific implementation process of communication between the second subscriber identity module and the core network device in the second network, improves feasibility of the solution, and improves implementation flexibility of the solution. Similarly, the second NAS data link may include an S1AP data link in an LTE scenario, may include an NGAP data link in a 5G scenario, or may be implemented by using another data link. This is not limited herein.

In addition, after step 606, to be specific, after the access network device may determine that the terminal device registers with the second network, the access network device may establish a NAS security procedure between the second network and the terminal device through the RRC connection.

It should be noted that, in this embodiment, step 603 is performed before step 604, and step 605 is performed before step 606. However, a sequence of performing step 603 and step 605 is not limited in this application.

After step 604 and step 606, to be specific, after the access network device receives the first registration response message from the core network device in the first network, and receives the second registration response message from the core network device in the second network, the access network device may further establish an access stratum AS security configuration that is between the access network device and the terminal device and that is shared by the first subscriber identity module and the second subscriber identity module. That is, the AS security configuration is a shared AS security configuration. Specifically, conventional AS security is separately established based on different subscriber identity modules. That is, different AS security is established for different subscriber identity modules. Shared AS security established herein is jointly established for a plurality of subscriber identity modules. This avoids a disclosure risk of the AS security configuration, and can improve communication security of the terminal device to some extent.

After step 604 and step 606, to be specific, after the access network device receives the first registration response message from the core network device in the first network, and receives the second registration response message from the core network device in the second network, the access network device may further allocate data radio bearers DRBs to the first subscriber identity module and the second subscriber identity module; and/or the access network device allocates carrier components CCs to the first subscriber identity module and the second subscriber identity module. Because both the first subscriber identity module and the second subscriber identity module in the terminal device communicate with the access network device through the RRC connection, and a radio resource of the access network device is limited, the access network device may allocate the data radio bearers DRBs and/or the carrier components CCs to the first subscriber identity module and the second subscriber identity module, so that the access network device can provide differentiated services for the different subscriber identity modules in the terminal device. For a specific process in which the access network device allocates the DRBs and the CCs, refer to the content of the embodiment shown in FIG. 5. Details are not described herein again.

In a specific implementation, the terminal device may be a multi-SIM multi-standby terminal. The terminal device includes at least the first subscriber identity module and the second subscriber identity module. In addition, the first subscriber identity module corresponds to the first network, and the second subscriber identity module corresponds to the second network. After the access network device receives the identification information of the first subscriber identity module and the identification information of the second subscriber identity module from the terminal device through the RRC connection in step 601, the access network device may determine that the terminal device includes the first subscriber identity module and the second subscriber identity module. In this way, after step 604 and step 606, to be specific, after the access network device receives the first registration response message from the core network device in the first network, and receives the second registration response message from the core network device in the second network, the access network device may determine that the terminal device separately registers with the first network and the second network, and then the access network device may associate a context corresponding to the identification information of the first subscriber identity module with a context corresponding to the identification information of the second subscriber identity module. That is, the access network device associates the RRC connection, the context corresponding to the identification information of the first subscriber identity module, and the context corresponding to the identification information of the second subscriber identity module, so that both the first subscriber identity module and the second subscriber identity module in the terminal device implement communication through the RRC connection, and service concurrency of the multi-SIM and multi-standby terminal device is implemented.

607: The access network device sends the first registration response message and the second registration response message to the terminal device through the RRC connection.

In this embodiment, the access network device sends the first registration response message and the second registration response message to the terminal device through the RRC connection. Correspondingly, in step 607, the terminal device receives the first registration response message and the second registration response message from the access network device through the RRC connection.

In a specific implementation, in an implementation process of step 607, the access network device may further send a third indication and a fourth indication to the terminal device, where the third indication indicates that the first registration response message is associated with the first subscriber identity module in the terminal device, and the fourth indication indicates that the second registration response message is associated with the second subscriber identity module in the terminal device. Specifically, an implementation process of the third indication and the fourth indication may be an explicit indication manner, or may be an implicit indication manner. For the implementation process, refer to the embodiment shown in FIG. 5. Details are not described herein again.

In this embodiment, the access network device sets up the shared radio resource control RRC connection for the communication between the plurality of networks and the terminal device, and receives, from the terminal device through the RRC connection, the first registration request message that requests to register with the first network and the second registration request message that requests to register with the second network. After receiving the first registration response message from the core network device in the first network and receiving the second registration response message from the core network device in the second network, the access network device sends the first registration response message and the second registration response message to the terminal device through the RRC connection, to complete a process in which the terminal device registers with the first network and the second network. That is, the access network device manages an air interface resource of the terminal device through the shared RRC connection for the communication between the plurality of networks and the terminal device, to implement service concurrency of the terminal device by reusing the RRC connection, and improve communication efficiency.

Refer to FIG. 7. Another embodiment of a communication method according to embodiments of this application includes the following steps.

701: An access network device obtains identification information of a first network with which a first subscriber identity module registers and identification information of a second network with which a second subscriber identity module registers.

In this embodiment, the access network device obtains the identification information of the first network with which the first subscriber identity module registers and the identification information of the second network with which the second subscriber identity module registers, where the first subscriber identity module and the second subscriber identity module are included in a same terminal device.

In a specific implementation, the terminal device may be a multi-SIM multi-standby terminal. The terminal device includes at least the first subscriber identity module and the second subscriber identity module. In addition, the first subscriber identity module registers with the first network, and the second subscriber identity module registers with the second network. For example, the subscriber identity module in the terminal device may be a SIM, a USIM, an ISIM, an eSIM, or another type of subscriber identity module. The multi-SIM multi-standby terminal may specifically include n-SIM m-active. To be specific, the multi-SIM multi-standby terminal includes n SIM cards and m radio frequency devices, where n is greater than m and m is an integer greater than 0 (for example, a three-SIM three-standby dual-active terminal or a four-SIM four-standby three-active terminal). Alternatively, the multi-SIM multi-standby terminal may specifically include n-SIM n-active, where n is an integer greater than 1. To be specific, a quantity of SIM cards in the terminal is the same as a quantity of radio frequency channels (for example, a dual-SIM dual-standby dual-active terminal, a three-SIM three-standby three-active terminal, and a four-SIM four-standby four-active terminal). This is not limited herein.

In addition, the first network and the second network may be a same communication network or different communication networks. The communication network may include a public land mobile network PLMN, a non-public network NPN, or any other type of network. This is not limited herein. For a specific implementation of the first network and the second network, refer to the descriptions in FIG. 5 and FIG. 6. Details are not described herein again.

702: The access network device allocates radio data resources to the first subscriber identity module and the second subscriber identity module respectively based on the identification information of the first network and the identification information of the second network.

In this embodiment, the access network device allocates the radio data resources to the first subscriber identity module and the second subscriber identity module respectively based on the identification information of the first network and the identification information of the second network, where the radio data resources include data radio bearers DRBs and/or carrier components CCs.

In a specific implementation, an execution process of step 702 may include: The access network device determines type information of the first network based on the identification information of the first network, and determines type information of the second network based on the identification information of the second network. Further, the access network device allocates the radio data resources to the first subscriber identity module and the second subscriber identity module respectively based on the type information of the first network and the type information of the second network. In other words, the access network device may specifically distinguish, based on the type information of the first network and the type information of the second network, a type of the first network with which the first subscriber identity module registers and a type of the second network with which the second subscriber identity module registers, and further allocate the radio data resources to the first subscriber identity module and the second subscriber identity module respectively based on the type information.

This provides a specific implementation process of allocation of the radio data resources in the access network device, improves feasibility of the solution, and further improves implementation flexibility of the solution.

In this embodiment, when the access network device determines that both the first subscriber identity module and the second subscriber identity module in the terminal device perform communication by using the access network device, the access network device obtains the identification information of the first network with which the first subscriber identity module registers and the identification information of the second network with which the second subscriber identity module registers. The access network device may allocate the data radio bearers DRBs and/or the carrier components CCs to the first subscriber identity module and the second subscriber identity module, so that the access network device can provide differentiated services for the different subscriber identity modules in the terminal device, and an allocation process of the radio data resources in the access network device is optimized.

The foregoing describes embodiments of this application by using FIG. 5 to FIG. 7. The following further describes this application by using FIG. 8A to FIG. 11B with reference to specific application scenarios. It can be learned from the foregoing implementation processes that a subscriber identity module in a terminal device (UE) may be a USIM, an ISIM, an eSIM, or another type of subscriber identity module, and application scenarios may be LTE, 5G, 6G, and another communication system. In embodiments shown in FIG. 8A to FIG. 11B, descriptions are provided by using an example in which a subscriber identity module in a terminal device is a USIM, a network device is a shared access network (shared-RAN), and an application scenario is 5G.

Embodiment 1

Figure 8A:
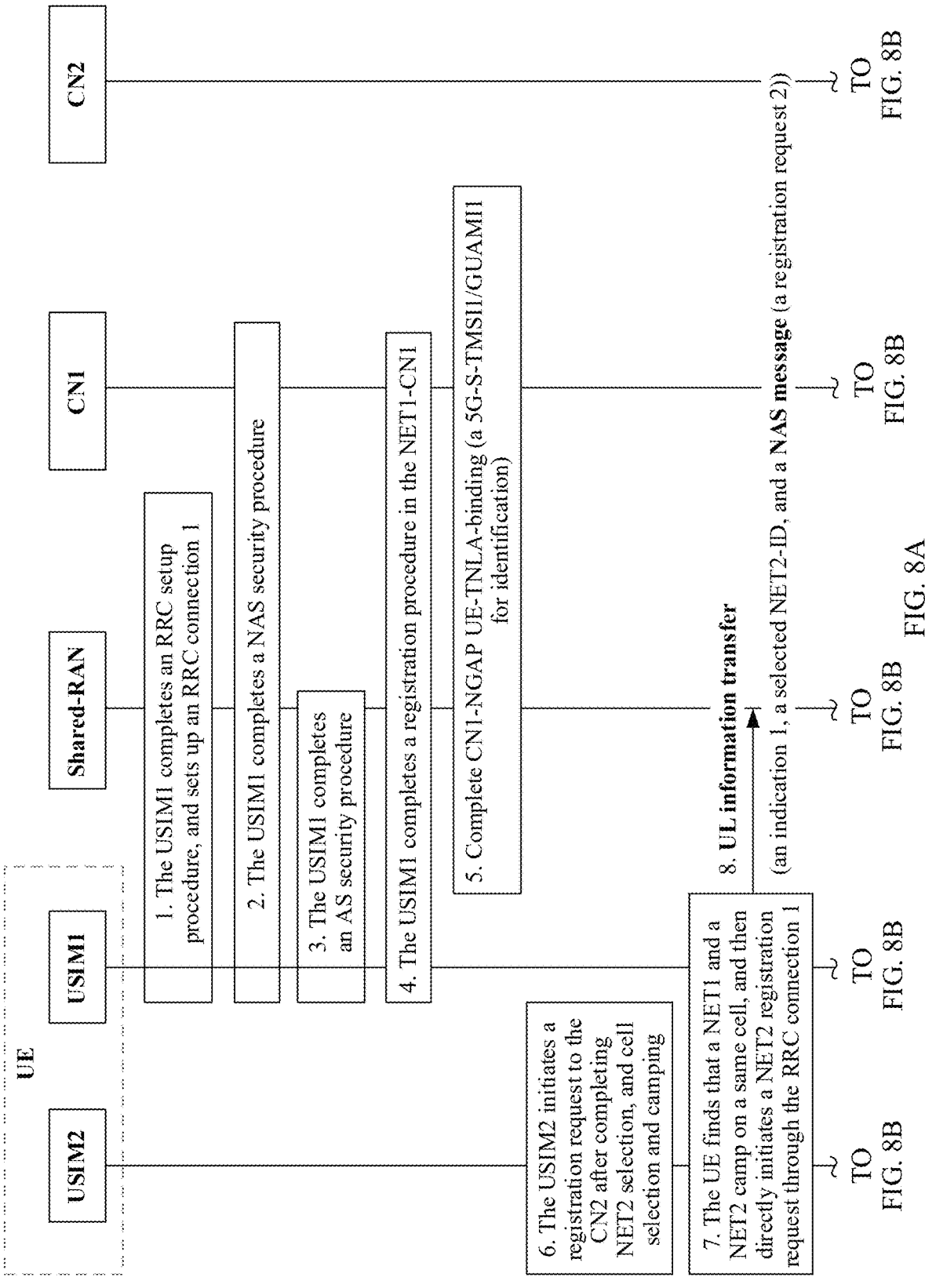
FIG. 8A and FIG. 8B are another schematic diagram of an embodiment of a communication method according to embodiments of this application.
Figure 8B:
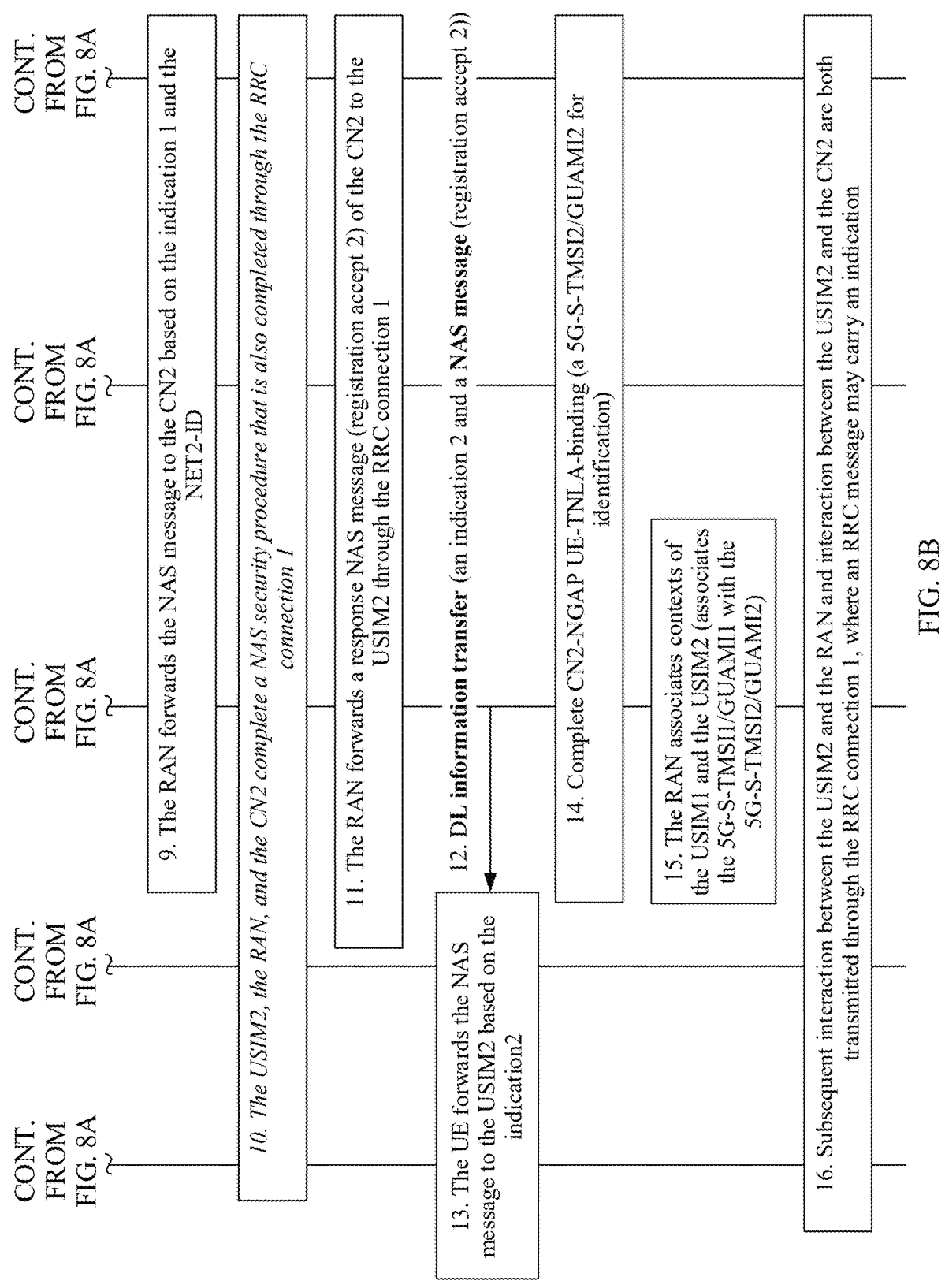

Refer to FIG. 8A and FIG. 8B. Another embodiment of a communication method according to embodiments of this application includes the following steps.

Step 1: UE communicates with a shared-RAN, and a USIM1 in the UE completes an RRC setup procedure, and sets up an RRC connection 1.

Step 2: The UE communicates with the shared-RAN, and the USIM1 in the UE completes a NAS security procedure.

Step 3: The UE communicates with the shared-RAN, and the USIM1 in the UE completes an AS security procedure.

Step 4: The UE, the shared-RAN, and a CN1 communicate with each other, and the USIM1 in the UE completes a registration procedure in the NET1-CN1.

Step 5: The shared-RAN communicates with the CN1, and completes CN1-NGAP UE-TNLA-binding (a 5G-S-TMSI1/GUAMI1 for identification).

In step 1 to step 5, the USIM1 in the UE independently completes RRC setup, NAS security, AS security, and CN1 registration procedures, and completes CN1-NGAP tunnel establishment. To be specific, an NGAP tunnel has been established between the RAN and the CN1, and is uniquely identified by using a UE identifier: the 5G-system architecture evolution temporary mobile station identifier (5G-System architecture evolution temporary mobile station identifier, 5G-S-TMSI)1 or the globally unique AMF identifier (globally unique AMF identifier, GUAMI)1. A subsequent NAS message may be transmitted to a CN1 side through the tunnel.

Step 6: A USIM2 in the UE initiates a registration request to a CN2 after completing NET2 selection, and cell selection and camping.

Step 7: The UE finds that a NET1 and a NET2 camp on a same cell, and then directly initiates a NET2 registration request through the RRC connection 1.

In step 7, the UE finds that the NET1 and the NET2 camp on the same cell and the USIM1 has set up the RRC connection 1, and then directly initiates the NET2 registration request through the RRC connection 1 to trigger step 8.

Specifically, the UE may determine, based on information such as a cell ID broadcast in a system message, namely, a MIB/SIB, whether camped cells are the same. If cell IDs selected by the USIM1 and the USIM2 are the same, it is determined that the USIM1 and the USIM2 camp on the same cell.

Step 8: The UE sends a UL information transfer message (an indication 1, a selected NET2-ID, and a NAS message [a registration request (Registration Request) message 2]) to the shared-RAN.

In step 8, the UE sends registration information of the USIM2 through the RRC connection 1, and further sends information such as a special indication, namely, the indication 1, and the selected NET2-ID.

Registration information: The registration information of the USIM2 is included in a NAS message, and is forwarded by the RAN to a corresponding core network through an NGAP message.

Selected NET2-ID: The USIM2 in the UE performs NET selection based on network information broadcast on a RAN side (where a PLMN ID is broadcast in a public network/a PLMN ID and a CAG ID are broadcast in a CAG-type private network/a PLMN ID and an NID are broadcast in an SNPN-type private network) and locally configured network selection priority information, and then sends the selected NET2-ID (the PLMN ID, the PLMN ID and the CAG ID, or the PLMN ID and the NID) and the registration information to the RAN side.

Special indication, namely, indication 1: An RRC message further needs to carry the special indication, namely, the indication 1, to notify the RAN that the message is from the USIM2. After receiving the RRC message, the RAN side needs to forward, based on information about the selected NET2-ID, the carried NAS message to a CN corresponding to NET2-ID. It should be noted that, if a type of the RRC message has a function of the special indication, the special indication herein is considered as an implicit indication.

Step 9: The RAN forwards the NAS message to the CN2 based on the indication 1 and the NET2-ID.

Step 10: The UE, the shared-RAN, and the CN1 communicate with each other, and the USIM2 in the UE, the RAN, and the CN2 complete a NAS security procedure that is also completed through the RRC connection 1.

Step 11: The RAN forwards a response NAS message (a registration request 2) of the CN2 to the USIM2 through the RRC connection 1.

Step 12: The shared-RAN sends a downlink data transmission (DL Information Transfer) message (carrying an indication 2 and a NAS message (registration accept 2)).

Step 13: The UE forwards the NAS message to the USIM2 based on the indication 2.

In step 11 to step 13, the registration accept NAS message returned by the CN2 is also sent to the UE through the RRC connection 1, and the RAN side needs to additionally carry the special indication, namely, the indication 2, in an RRC message, to indicate the UE to forward the NAS message carried in the RRC message to the USIM2 for processing.

Step 14: The shared-RAN communicates with the CN2, so that the USIM2 in the UE completes CN2-NGAP UE-TNLA-binding (a 5G-S-TMSI2/GUAMI2 for identification).

In step 14, the RAN completes CN2-NGAP tunnel establishment. To be specific, an NGAP tunnel has been established between the RAN and the CN2, and is uniquely identified by using a UE identifier: the 5G-S-TMSI2 or the GUAMI2. A subsequent NAS message may be transmitted to a CN2 side through the tunnel.

Step 15: The RAN associates contexts of the USIM1 and the USIM2 (associates the 5G-S-TMSI1/GUAMI1 with the 5G-S-TMSI2/GUAMI2).

Step 16: Subsequent interaction between the USIM2 and the RAN and interaction between the USIM2 and the CN2 are both transmitted through the RRC connection 1, where an RRC message may carry an indication.

In step 15 and step 16, the RAN associates the contexts of the USIM1 and the USIM2, that is, associates the RRC connection 1, the CN1-NGAP tunnel, and the CN2-NGAP tunnel. A subsequent exchange of CN1-NAS and CN2-NAS messages are both transmitted through the RRC connection 1, where the RRC message may carry the indication indicating the RAN side to forward the NAS messages to the corresponding CNs.

In the embodiment corresponding to FIG. 8A and FIG. 8B, a process of performing related steps by an access network device (the RAN) and a terminal device (the UE) may alternatively be implemented by using the process corresponding to the embodiment in FIG. 5. Details are not described herein again.

In Embodiment 1, the USIM2 in the UE reuses the existing RRC connection of the USIM1, the access network device (the RAN) manages an air interface resource of the terminal device through the established RRC connection to the terminal device (the UE), to implement service concurrency of the terminal device by reusing the RRC connection, and improve communication efficiency.

Embodiment 2

Figure 9A:
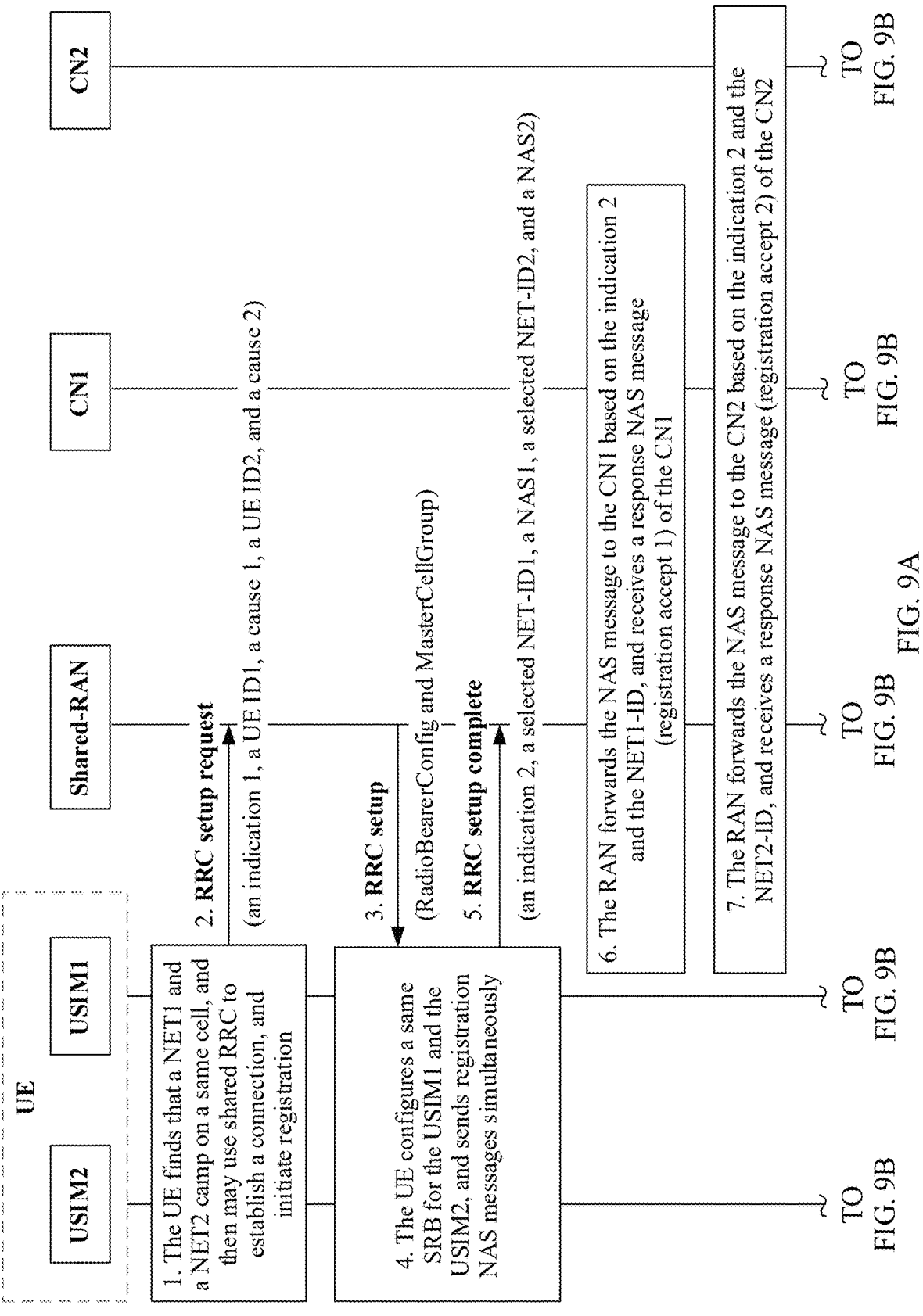
FIG. 9A and FIG. 9B are another schematic diagram of an embodiment of a communication method according to embodiments of this application.
Figure 9B:
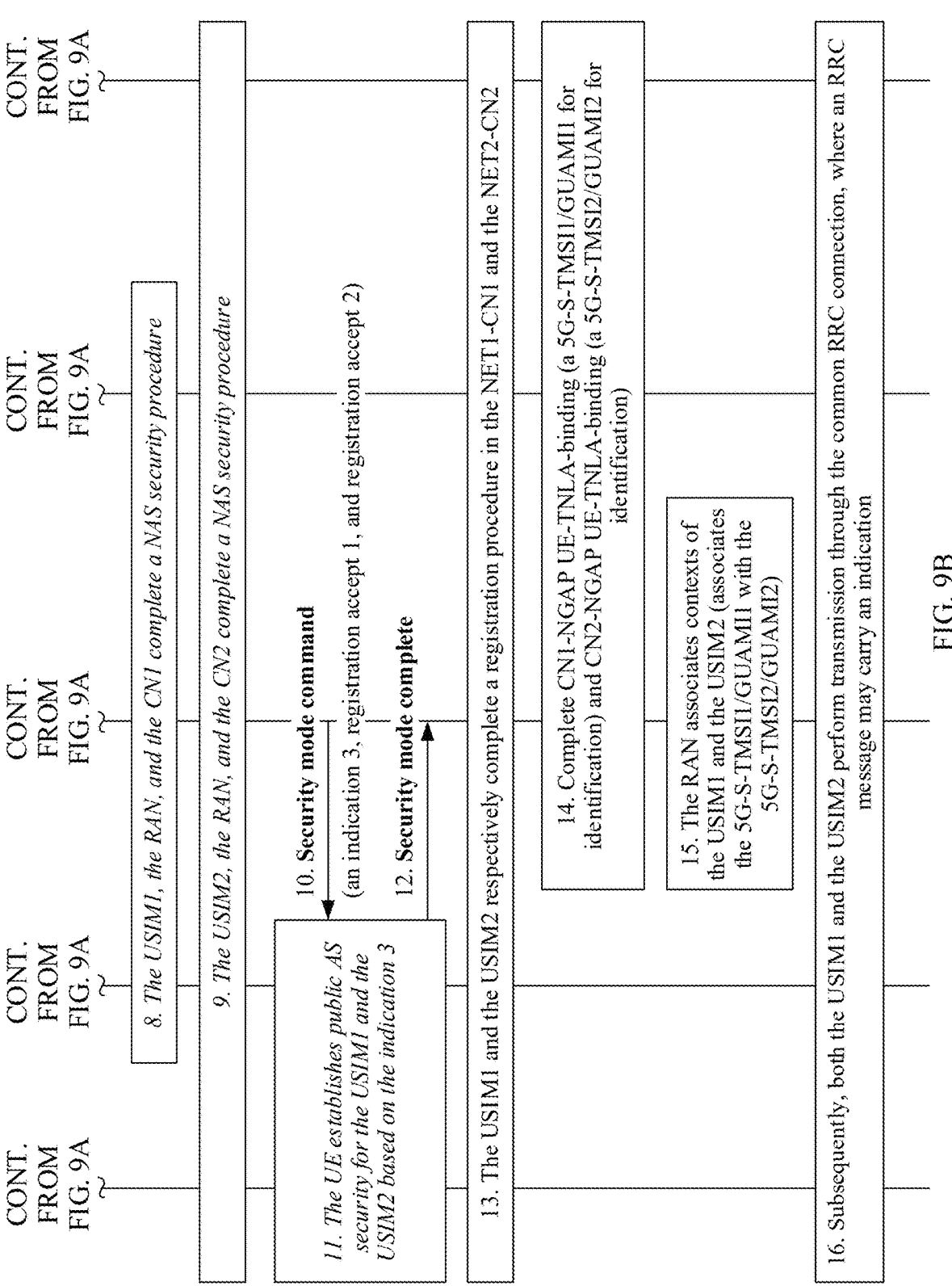

Refer to FIG. 9A and FIG. 9B. Another embodiment of a communication method according to embodiments of this application includes the following steps.

Step 1: UE finds that a NET1 and a NET2 camp on a same cell, and then may use shared RRC to set up a connection, and initiate registration.

In step 1, the UE finds that the NET1 and the NET2 camp on the same cell, and then initiates a shared RRC connection setup procedure, to trigger step 2.

Specifically, the UE may determine, based on information such as a cell ID broadcast in a system message, namely, a MIB/SIB, whether camped cells are the same. If cell IDs selected by a USIM1 and a USIM2 are the same, it is determined that the USIM1 and the USIM2 camp on the same cell.

Step 2: The UE sends an RRC setup request message (an indication 1, a UE ID1, a cause 1, a UE ID2, and a cause 2) to a shared-RAN.

In the information carried in step 2:

The indication 1 indicates a RAN side to set up the common RRC connection based on information about two cards that is carried in an RRC message.

The UE ID2 and the cause 1 respectively represent a low-layer UE identifier (which may alternatively be an initial random value) such as a C-RNTI1 and a cause value of setting up a USIM1 RRC connection.

The UE ID2 and the cause 2 respectively represent a low-layer UE identifier (which may alternatively be an initial random value) such as a C-RNTI2 and a cause value of setting up a USIM2 RRC connection.

Step 3: The shared-RAN sends an RRC setup message (RadioBearerConfig and MasterCellGroup) to the UE.

Step 4: The UE configures a same SRB for the USIM1 and the USIM2, and sends registration NAS messages simultaneously. That is, the UE performs step 5, and sends an RRC setup complete message to the shared-RAN.

In step 3 and step 4, after receiving the RRC setup request message, the RAN sends basic configuration information (for example, the RadioBearerConfig/MasterCellGroup information) to a UE side by using the RRC setup message. After receiving the basic configuration information, the UE side simultaneously sends the registration NAS messages of the USIM1 and the USIM2 through the common RRC connection (that is, the same SRB).

Step 5: The UE sends the RRC setup complete message (an indication 2, a selected NET1-ID, a NAS1, a selected NET2-ID, and a NAS2) to the shared-RAN. Then, after step 5, the UE may configure the same SRB or different SRBs for the USIM1 and the USIM2.

In the information carried in step 5:

The indication 2 notifies the RAN side that the messages are from the USIM1 and the USIM2. After receiving the messages, the RAN side needs to forward, based on information about the selected NET-IDs, the carried NAS messages to the CNs corresponding to the NET-IDs.

The selected NET-ID1, the NAS1, and the USIM1 in the UE performs NET selection based on network information broadcast on the RAN side (where a PLMN ID is broadcast in a public network/a PLMN ID and a CAG ID are broadcast in a CAG-type private network/a PLMN ID and an NID are broadcast in an SNPN-type private network) and locally configured network selection priority information, and then sends the selected NET1-ID (the PLMN ID, the PLMN ID and the CAG ID, or the PLMN ID and the NID) and registration information (included in the NAS1) to the RAN side.

The selected NET-ID2, the NAS2, and the USIM2 in the UE performs NET selection based on network information broadcast on the RAN side (where a PLMN ID is broadcast in a public network/a PLMN ID and a CAG ID are broadcast in a CAG-type private network/a PLMN ID and an NID are broadcast in an SNPN-type private network) and locally configured network selection priority information, and then sends the selected NET2-ID (the PLMN ID, the PLMN ID and the CAG ID, or the PLMN ID and the NID) and registration information (included in the NAS2) to the RAN side.

Step 6: The RAN forwards the NAS message to a CN1 based on the indication 1, and receives a response NAS message (registration accept 1) of the CN1.

Step 7: The RAN forwards the NAS message to a CN2 based on the indication 2, and receives a response NAS message (registration accept 2) of the CN2.

Step 8: The UE, the shared-RAN, and the CN1 communicate with each other, and the USIM1 in the UE, the RAN, and the CN1 complete an NA security procedure.

Step 9: The UE, the shared-RAN, and the CN2 communicate with each other, and the USIM2 in the UE, the RAN, and the CN2 complete an NA security procedure.

Step 10: The shared-RAN sends a security mode command (an indication 3, registration accept 1, and registration accept 2) to the UE.

Step 11: The UE establishes public AS security for the USIM1 and the USIM2 based on the indication 3.

Step 12: The UE sends a security mode complete message to the shared-RAN.

Step 10 to step 12 are mainly for establishing AS security between the UE and the RAN. Conventionally, AS security is established based on a granularity of the USIM1. However, in a process of setting up the public RRC connection, the RAN side needs to carry a special indication indicating the UE to establish the public AS security for the USIM1 and the USIM2.

Step 13: The USIM1 and the USIM2 respectively complete a registration procedure in the NET1-CN1 and the NET2-CN2.

Step 14: The shared-RAN communicates with the CN1 and the CN2, and completes CN1-NGAP UE-TNLA-binding (a 5G-S-TMSI1/GUAMI1 for identification) and CN2-NGAP UE-TNLA-binding (a 5G-S-TMSI2/GUAMI2 for identification).

In step 14, the RAN completes CN1-NGAP tunnel establishment. To be specific, an NGAP tunnel has been established between the RAN and the CN1, and is uniquely identified by using a UE identifier: the 5G-S-TMSI1 or the GUAMI1. The NAS message may be transmitted to the CN1 side through the tunnel subsequently. Similarly, the RAN side also completes CN2-NGAP tunnel establishment. To be specific, an NGAP tunnel has been established between the RAN and the CN2, and is uniquely identified by using a UE identifier: the 5G-S-TMSI2 or the GUAMI2. The NAS message may be transmitted to the CN2 side through the tunnel subsequently.

Step 15: The RAN associates contexts of the USIM1 and the USIM2 (associates the 5G-S-TMSI1/GUAMI1 with the 5G-S-TMSI2/GUAMI2).

Step 16: Subsequently, both the USIM1 and the USIM2 perform transmission through the common RRC connection, where an RRC message may carry an indication.

In step 15 and step 16, the RAN associates the contexts of the USIM1 and the context of the USIM2, that is, associates the common RRC connection of the USIM1 and the USIM2, the CN1-NGAP tunnel, and the CN2-NGAP tunnel. A subsequent exchange of CN1-NAS and CN2-NAS messages are both transmitted through the common RRC connection, where the RRC message may carry the indication indicating the RAN side to forward the NAS messages to the corresponding CNs.

In the embodiment corresponding to FIG. 9A and FIG. 9B, a process of performing related steps by an access network device (the RAN) and a terminal device (the UE) may alternatively be implemented by using the process corresponding to the embodiment in FIG. 6. Details are not described herein again.

In Embodiment 2, the USIM1 and the USIM2 in the UE reuse one RRC connection, and need to establish the shared AS security. In comparison, the conventional AS security is established separately based on a different USIM. That is, different AS security is established for different USIMs. If the USIM2 performs communication by using the AS context established for the USIM1, the USIM2 may obtain the AS context of the USIM1, and AS security of the USIM1 is reduced. Therefore, the shared AS security established herein is jointly established for a plurality of USIMs, to avoid a disclosure risk of an AS security configuration, and improve communication security of the terminal device to some extent. In addition, the access network device (the RAN) manages an air interface resource of the terminal device through the shared RRC connection for the communication between the plurality of networks (CNs) and the terminal device (UE), to implement service concurrency of the terminal device by reusing the RRC connection, and improve communication efficiency.

Embodiment 3

Figures 10A, 10B:
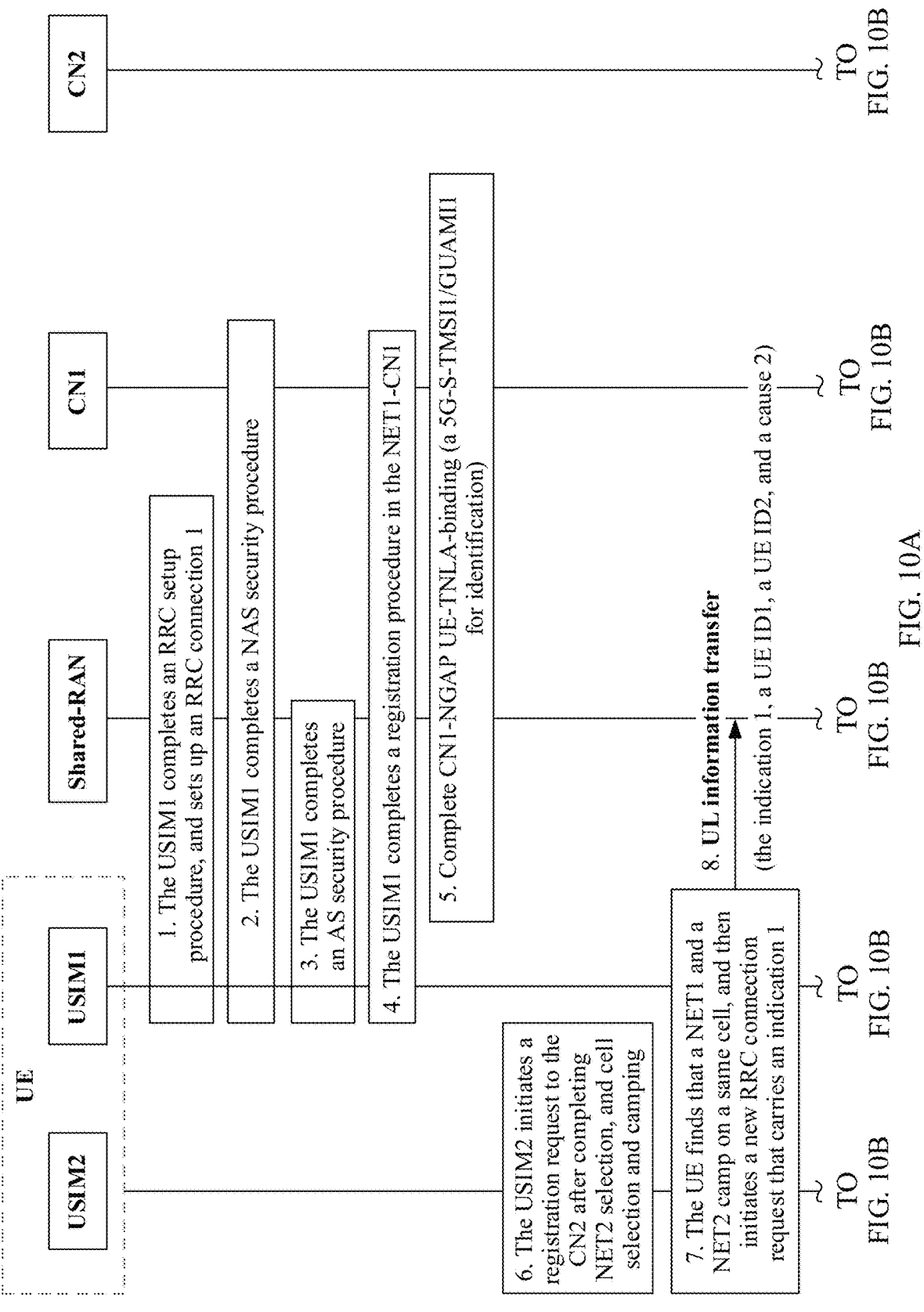
FIG. 10A and FIG. 10B are another schematic diagram of an embodiment of a communication method according to embodiments of this application.
Figure 10B:
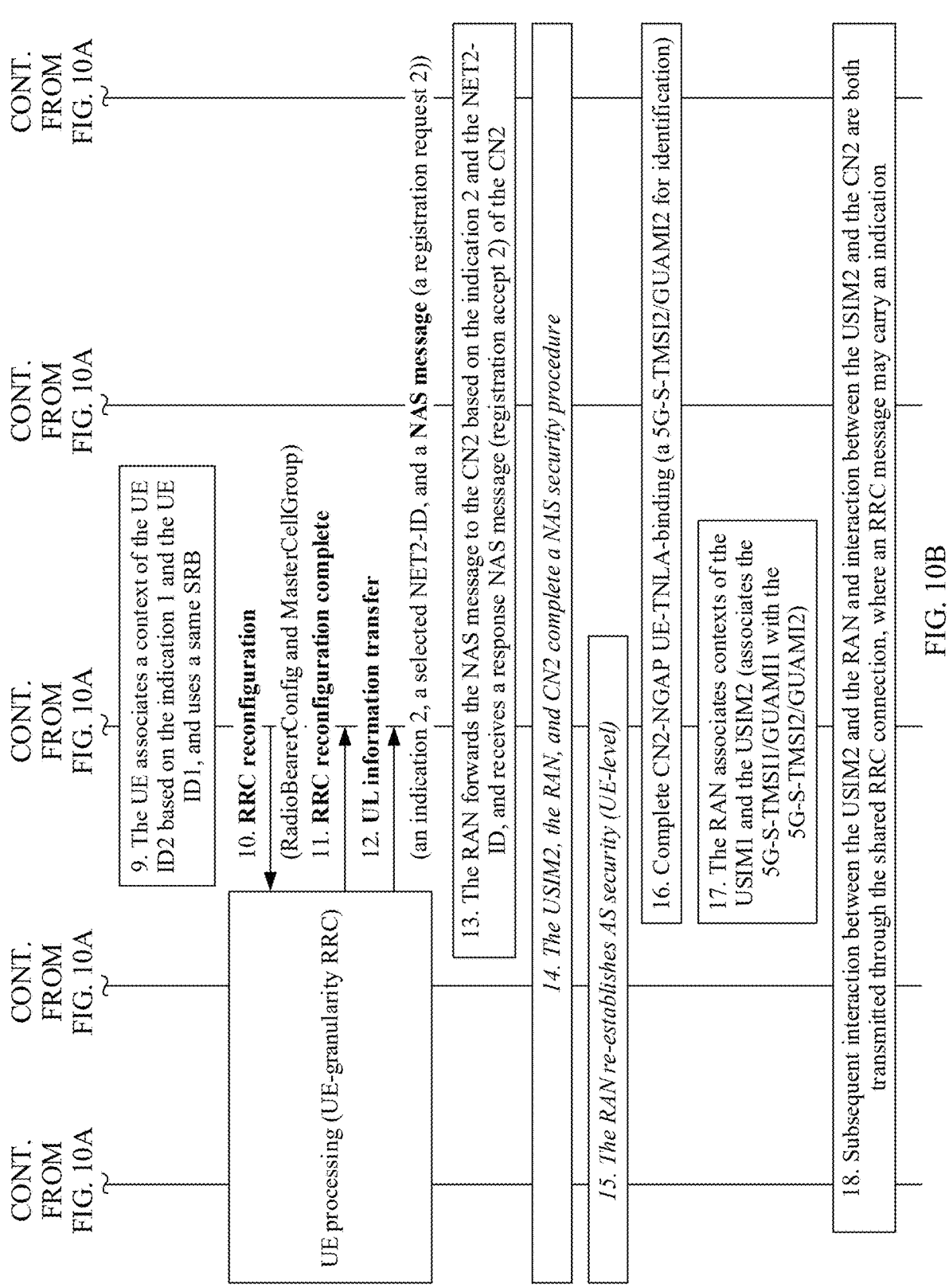

Refer to FIG. 10A and FIG. 10B. Another embodiment of a communication method according to embodiments of this application includes the following steps.

Step 1: UE communicates with a shared-RAN, and a USIM1 in the UE completes an RRC setup procedure, and sets up an RRC connection 1.

Step 2: The UE, the shared-RAN, and a CN1 communicate with each other, and the USIM1 in the UE completes a NAS security procedure.

Step 3: The UE communicates with the shared-RAN, and the USIM1 in the UE completes an AS security procedure.

Step 4: The UE, the shared-RAN, and a CN1 communicate with each other, and the USIM1 in the UE completes a registration procedure in the NET1-CN1.

Step 5: The shared-RAN communicates with the CN1, and the USIM1 in the UE completes CN1-NGAP UE-TNLA-binding (a 5G-S-TMSI1/GUAMI1 for identification).

In step 1 to step 5, the USIM1 in the UE independently completes RRC setup, NAS security, AS security, and CN1 registration procedures, and completes CN1-NGAP tunnel establishment. To be specific, an NGAP tunnel has been established between the RAN and the CN1, and is uniquely identified by using a UE identifier: the 5G-S-TMSI1 or the GUAMI1. A subsequent NAS message may be transmitted to a CN1 side through the tunnel.

Step 6: A USIM2 in the UE initiates a registration request to a CN2 after completing NET2 selection, and cell selection and camping.

Step 7: The UE finds that a NET1 and a NET2 camp on a same cell, and then initiates a new RRC connection request that carries an indication 1.

In step 7, the UE finds that the NET1 and the NET2 camp on the same cell and the USIM1 has set up the RRC connection 1, and then directly initiates a registration request of the NET2 through the RRC connection 1. Specifically, the UE may determine, based on information such as a cell ID broadcast in a system message, namely, a MIB/SIB, whether camped cells are the same. If cell IDs selected by the USIM1 and the USIM2 are the same, it is determined that the NET1 and the NET2 camp on the same cell.

Step 8: The UE sends a UL information transfer message (the indication 1, a UE ID1, a UE ID2, a cause 1) to the shared-RAN.

In step 8, the UE includes the indication 1, the UE ID1, the UE ID2 and the cause 1 in RRC connection 1, where the indication 1 indicates a RAN side to modify a type of the RRC connection as a shared RRC connection and associate contexts of the USIM1 and the USIM2; the UE ID1 indicates a low-layer UE identifier such as a C-RNTI1 allocated by the RAN side to the USIM1; the UE ID2 indicates a low-layer UE identifier such as a C-RNTI2 allocated by the RAN side to the USIM2; and the cause 1 indicates a cause value of uplink RRC message transmission.

In addition, in step 8, the UE may further include the indication 1, the UE ID1, the UE ID2, and the cause 1 in another message such as an RRC setup request (RRC Setup Request) message or an RRC reestablishment request (RRC Reestablishment Request) message. This is not limited herein.

Step 9: The RAN associates a context of the UE ID2 based on the indication 1 and the UE ID1.

In step 9, after receiving the indication 1, the RAN side associates the corresponding context based on the UE ID1 and the UE ID2. For signaling of the USIM1 and the USIM2, a same SRB or different SRBs may be subsequently used.

Step 10: The shared-RAN sends an RRC reconfiguration (RRC Reconfiguration) message (carrying RadioBearer-Config and MasterCellGroup) to the UE.

In step 10, the RAN may further carry RadioBearerConfig, MasterCellGroup, and the like in another message, for example, an RRC setting (RRC setup) message, an RRC resetting (RRC Reestablishment Request) message, or an RRC reestablishment (RRC Reestablishment) message. This is not limited herein.

Step 11: The UE sends an RRC reconfiguration complete message to the shared-RAN.

Step 12: The UE sends a UL information transfer message (an indication 2, a selected NET2-ID, and a NAS message (a second registration request message, namely, a registration request 2)) to the shared-RAN.

In step 12, the UE may further carry the indication 2, the selected NET2-ID, the NAS message (the registration request 2), and the like in another message such as an RRC reestablishment complete (RRC Reestablishment Complete) message.

In step 10 to step 12, the RAN side modifies the RRC connection 1 as the shared RRC connection. After the modification is complete, the UE sends information such as a special indication, namely, the indication 2, and the selected NET2-ID.

Registration information: Registration information of the USIM2 is included in a NAS message, and is forwarded by the RAN to a corresponding core network through an NGAP message.

Selected NET2-ID: The USIM2 in the UE performs NET selection based on network information broadcast on the RAN side (where a PLMN ID is broadcast in a public network/a PLMN ID and a CAG ID are broadcast in a CAG-type private network/a PLMN ID and an NID are broadcast in an SNPN-type private network) and locally configured network selection priority information, and then sends the selected NET2-ID (the PLMN ID, the PLMN ID and the CAG ID, or the PLMN ID and the NID) and the registration information to the RAN side.

Special indication, namely, indication 2: An RRC message further needs to carry the special indication, namely, the indication 2, to notify the RAN that the message is from the USIM2. After receiving the RRC message, the RAN side needs to forward, based on information about the selected NET2-ID, the carried NAS message to a CN corresponding to NET2-ID. It should be noted that, if a type of the RRC message has a function of the special indication, the special indication herein is considered as an implicit indication.

Step 13: The RAN forwards the NAS message to the CN2 based on the indication 2 and the NET2-ID, and receives a response NAS message (a second registration response message, namely, registration accept 2) of the CN2.

Step 14: The UE, the shared-RAN, and the CN2 communicate with each other, so that the USIM2 in the UE, the RAN, and the CN2 complete a NAS security procedure.

Step 15: The RAN re-establishes AS security (UE-level).

Step 16: The USIM2 in the UE completes CN2-NGAP UE-TNLA-binding (a 5G-S-TMSI2/GUAMI2 for identification).

In step 16, the RAN side completes CN2-NGAP tunnel establishment. To be specific, an NGAP tunnel has been established between the RAN and the CN2, and is uniquely identified by using a UE identifier: the 5G-S-TMSI2 or the GUAMI2. A subsequent NAS message may be transmitted to a CN2 side through the tunnel.

Step 17: The RAN associates contexts of the USIM1 and the USIM2 (associates the 5G-S-TMSI1/GUAMI1 with the 5G-S-TMSI2/GUAMI2).

Step 18: Subsequent interaction between the USIM2 and the RAN and interaction between the USIM2 and the CN2 are both transmitted through the shared RRC connection, where an RRC message may carry an indication.

In step 17 and step 18, the RAN associates the contexts of the USIM1 and the USIM2, that is, associates the RRC connection 1, the CN1-NGAP tunnel, and the CN2-NGAP tunnel. A subsequent exchange of CN1-NAS and CN2-NAS messages are both transmitted through the RRC connection 1, where the RRC message may carry the indication indicating the RAN side to forward the NAS messages to the corresponding CNs.

In the embodiment corresponding to FIG. 10A and FIG. 10B, a process of performing related steps by an access network device (the RAN) and a terminal device (the UE) may alternatively be implemented by using the process corresponding to the embodiment in FIG. 5. Details are not described herein again.

In Embodiment 3, similar to Embodiment 1, the USIM2 in the UE reuses the existing RRC connection of the USIM1. Different from Embodiment 1, in Embodiment 3, the original RRC connection for communication of a single USIM is modified as the RRC connection shared by the plurality of networks, and the shared AS security is further re-established. In comparison, conventional AS security is established separately based on a different USIM. That is, different AS security is established for different USIMs. If the USIM2 performs communication by using the AS context established for the USIM1, the USIM2 may obtain the AS context of the USIM1, and AS security of the USIM1 is reduced. Therefore, the shared AS security established herein is jointly established for a plurality of USIMs, to avoid a disclosure risk of an AS security configuration, and improve communication security of the terminal device to some extent. In addition, the access network device (the RAN) manages an air interface resource of the terminal device (the UE) through the established RRC connection to the terminal device (the UE). Service concurrency of the terminal device (the UE) is implemented by reusing the RRC connection, and communication efficiency is improved. In addition, the disclosure risk of the AS security configuration is avoided, and communication security of the terminal device (the UE) is improved.

Embodiment 4

Figure 11A:
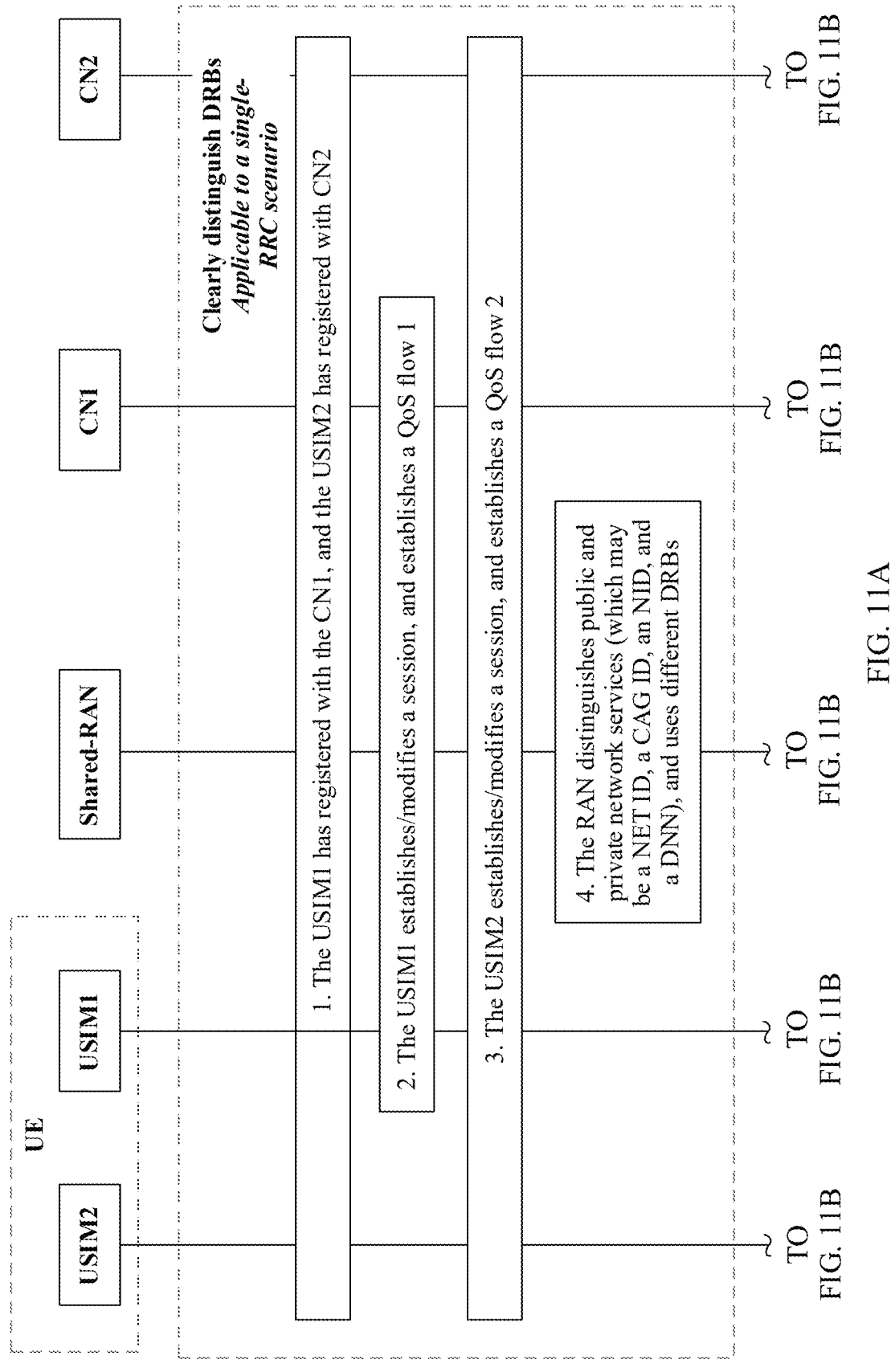
FIG. 11A and FIG. 11B are another schematic diagram of an embodiment of a communication method according to embodiments of this application.
Figure 11B:
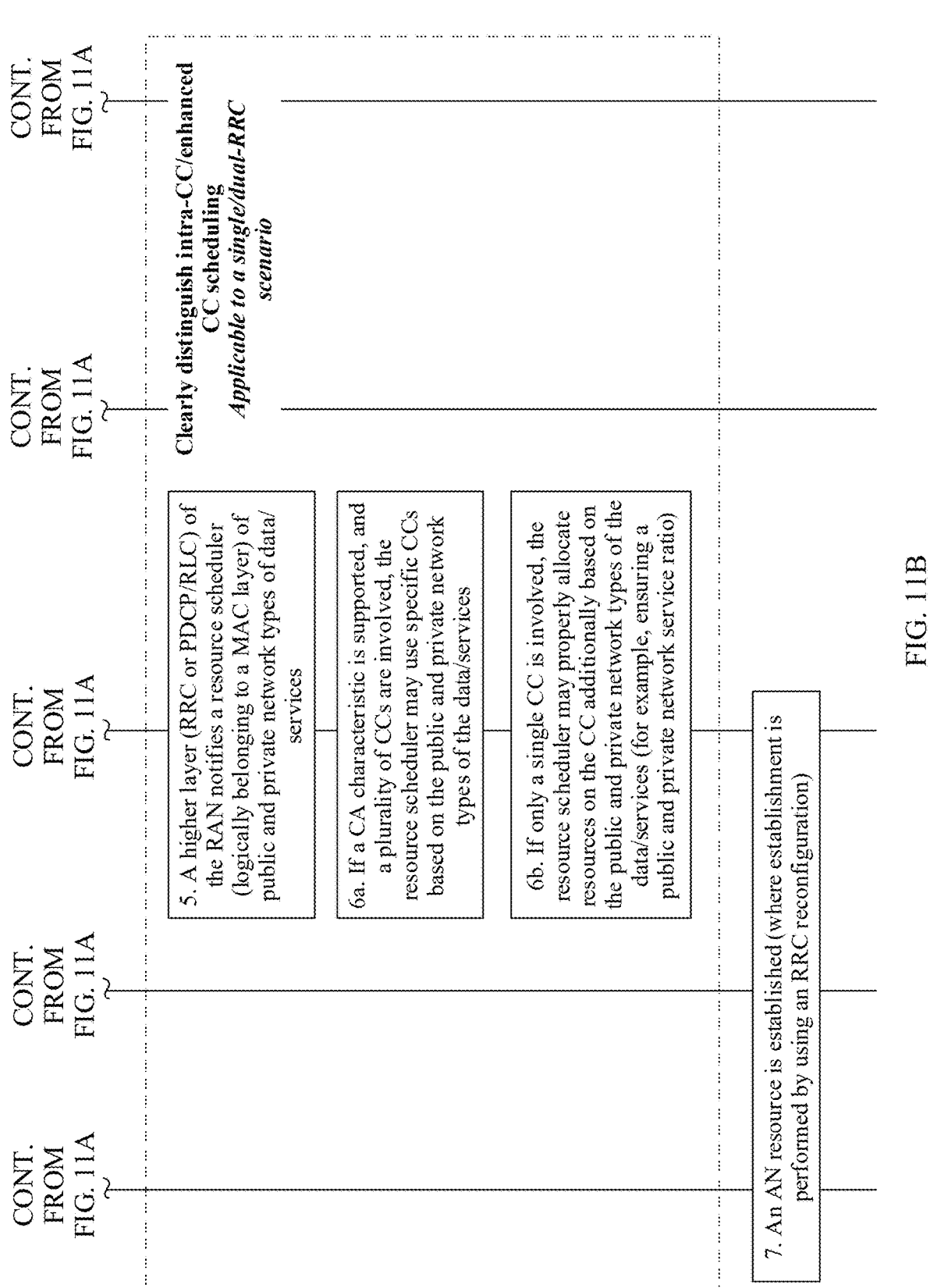

Refer to FIG. 11A and FIG. 11B. Another embodiment of a communication method according to embodiments of this application includes the following steps.

When DRBs are clearly distinguished, and in a scenario in which single RRC:

Step 1: UE and a shared-RAN communicate with a CN1 and a CN2, so that a USIM1 in the UE has registered with the CN1, and a USIM2 in the UE has registered with the CN2.

Step 2: The UE, the shared-RAN, and the CN1 communicate with each other, and the USIM1 in the UE establishes/modifies a session, and establishes a QoS flow 1.

Step 3: The UE, the shared-RAN, and the CN2 communicate with each other, and the USIM2 in the UE establishes/modifies a session, and establishes a QoS flow 2.

In step 1 to step 3, the USIM1 and the USIM2 have completed registration procedures, and share an RRC connection by using any solution in Embodiment 1 to Embodiment 3. To further ensure resource isolation and fairness in a scenario in which the RRC connection is shared, the USIM1 or the USIM2 may establish or modify the session.

When the DRBs are clearly distinguished, and a single-RRC scenario is applicable:

Step 4: The shared-RAN distinguishes public and private network services (which may be a NET ID, a CAG ID, an NID, and a DNN), and uses different DRBs.

In step 4, if it needs to be clearly distinguished that different DRBs are used for service data in different networks, a RAN side may distinguish, based on public and private network service types (which may be any one or a combination of the NET ID, the CAG ID, the NID, and the DNN), that service data traffic comes from the different networks, and establish or modify the DRBs, so that the different DRBs are used for the service data traffic in the different networks.

When intra-CC/enhanced CC scheduling is clearly distinguished, and a single/dual-RRC scenario is applicable:

Step 5: A higher layer (RRC or PDCP/RLC) of the shared-RAN notifies a resource scheduler (logically belonging to a MAC layer) of public and private network types of data/services.

Step 6*a*: If a CA characteristic is supported, and a plurality of CCs are involved, the resource scheduler may use specific CCs based on the public and private network types of the data/services.

Step 6*b*: If only a single CC is involved, the resource scheduler may properly allocate resources on the CC additionally based on the public and private network types of the data/services (for example, ensuring a public and private network service ratio).

It is obvious that step 5 and step 6 are not only applicable to the single-RRC scenario, but also applicable to the dual-RRC scenario.

Step 7: The UE communicates with the shared-RAN, and a (radio) access network [(Radio) Access Network, (R) AN] resource is established (where establishment may be performed by using an RRC reconfiguration).

In step 7, the resource on an AN side is established or adjusted. That is, a DRB is established/adjusted, or a CC is configured.

In the embodiment corresponding to FIG. 11A and FIG. 11B, a process of performing related steps by an access network device (the RAN) and a terminal device (the UE) may alternatively be implemented by using the process corresponding to the embodiment in FIG. 7. Details are not described herein again.

In Embodiment 4, in a RAN resource sharing scenario in a conventional technology, when the access network device (the RAN) cannot distinguish the service data in the different networks, the access network device (the RAN) may provide differentiated services for different subscriber identity modules (the USIM1 and the USIM2) in the terminal device (the UE), to optimize a radio data resource allocation process in the access network device (the RAN).

The foregoing describes embodiments of this application from a perspective of methods. The following describes the access network device and the terminal device in embodiments of this application from a perspective of specific apparatus implementation.

Figure 12:
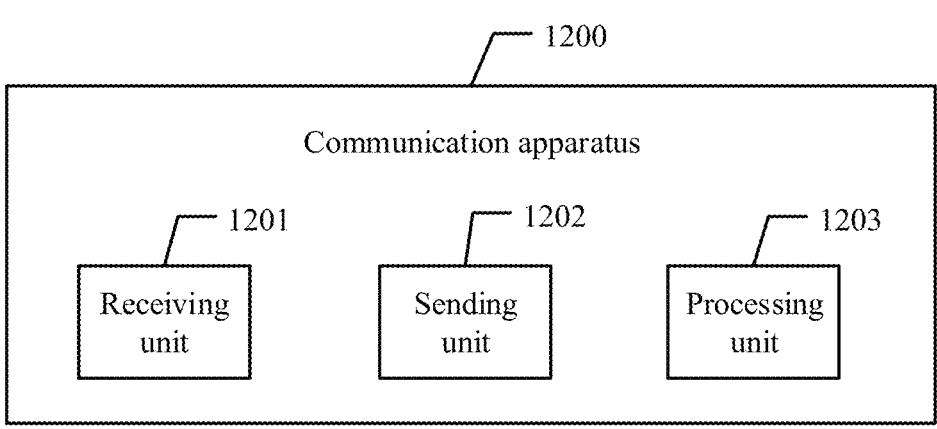
FIG. 12 is a schematic diagram of an embodiment of a communication apparatus according to embodiments of this application.

FIG. 12 shows a communication apparatus 1200 according to an embodiment of this application. Specifically, the communication apparatus 1200 may be an access network device. The communication apparatus 1200 includes a receiving unit 1201, a sending unit 1202, and a processing unit 1203.

The receiving unit 1201 is configured to receive, from a terminal device through an RRC connection for communication between a first network and the terminal device, a registration request message that requests to register with a second network.

The sending unit 1202 is configured to send the registration request message to a core network device in the second network.

The receiving unit 1201 is further configured to receive a registration response message from the core network device.

The sending unit 1202 is further configured to send the registration response message to the terminal device through the RRC connection.

In a possible implementation, the receiving unit 1201 is further configured to receive identification information of a first subscriber identity module and identification information of a second subscriber identity module from the terminal device through the RRC connection, where the terminal device includes the first subscriber identity module and the second subscriber identity module, the first subscriber identity module corresponds to the first network, and the second subscriber identity module corresponds to the second network; and the processing unit 1203 is configured to associate a context corresponding to the identification information of the first subscriber identity module with a context corresponding to the identification information of the second subscriber identity module.

In a possible implementation, the receiving unit 1201 is specifically configured to:

receive, from the second subscriber identity module through the RRC connection for the communication between the first network and the first subscriber identity module, the registration request message that requests to register with the second network.

In a possible implementation, the processing unit 1203 is further configured to:

establish an access stratum AS security configuration that is between the access network device and the terminal device and that is shared by the first subscriber identity module and the second subscriber identity module.

In a possible implementation, the receiving unit 1201 is further configured to receive a first indication from the terminal device through the RRC connection, where the first indication indicates that the RRC connection is for communication between a plurality of networks and the terminal device;

the processing unit 1203 is further configured to modify, based on the first indication, a type of the RRC connection as an RRC connection shared by the plurality of networks; and the sending unit 1202 is further configured to send a first downlink RRC message to the terminal device, where the first downlink RRC message indicates that the type of the RRC connection is the RRC connection shared by the plurality of networks.

In a possible implementation, the processing unit 1203 is further configured to establish a second non-access stratum NAS data link that is between the access network device and the core network device and that is related to the second subscriber identity module; and the sending unit 1202 is further configured to send a downlink NAS message to the second subscriber identity module through the RRC connection; and/or the sending unit 1202 is further configured to send an uplink NAS message to the core network device through the second NAS data link.

In a possible implementation, the processing unit 1203 is further configured to: allocate data radio bearers DRBs to the first subscriber identity module and the second subscriber identity module; and/or allocate carrier components CCs to the first subscriber identity module and the second subscriber identity module.

In a possible implementation, the sending unit 1202 is further configured to send a second indication to the terminal device through the RRC connection, where the second indication indicates that the registration response message is associated with the second subscriber identity module.

It should be noted that, for content such as an information execution process of the units in the communication apparatus 1200, refer to the descriptions in the foregoing method embodiments of this application. Details are not described herein again.

Figure 13:
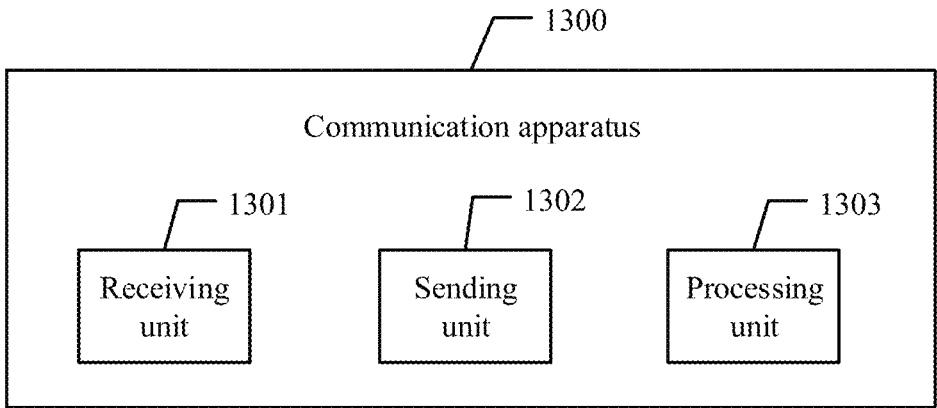
FIG. 13 is another schematic diagram of an embodiment of a communication apparatus according to embodiments of this application.

FIG. 13 shows a communication apparatus 1300 according to an embodiment of this application. Specifically, the communication apparatus 1300 may be a terminal device. The communication apparatus 1300 includes a receiving unit 1301, a sending unit 1302, and a processing unit 1303.

The sending unit 1302 is configured to send, to an access network device through an RRC connection for communication between a first network and the terminal device, a registration request message that requests to register with a second network.

The receiving unit 1301 is configured to receive a registration response message from the access network device through the RRC connection.

In a possible implementation, the terminal device includes a first subscriber identity module and a second subscriber identity module, the first subscriber identity module corresponds to the first network, and the second subscriber identity module corresponds to the second network; and the sending unit 1302 is further configured to send identification information of the first subscriber identity module and identification information of the second subscriber identity module to the access network device through the RRC connection.

In a possible implementation, the sending unit 1302 is specifically configured to:

send, to the access network device through the RRC connection for the communication between the first subscriber identity module and the terminal device, the registration request message that is from the second subscriber identity module and that requests to register with the second network.

In a possible implementation, the first subscriber identity module camps on a target cell, and a service area of the access network device includes the target cell; and the processing unit 1303 is configured to: when the second subscriber identity module camps on the target cell, trigger execution of sending, to the access network device through the RRC connection for the communication between the first network and the terminal device, the registration request message that requests to register with the second network.

In a possible implementation, the processing unit 1303 is further configured to: after the terminal device receives the registration response message from the access network device through the RRC connection, establish an access stratum AS security configuration that is between the terminal device and the access network device and that is shared by the first subscriber identity module and the second subscriber identity module.

In a possible implementation, the sending unit 1302 is further configured to send a first indication to the access network device through the RRC connection, where the first indication indicates that the RRC connection is for communication between a plurality of networks and the terminal device; and the receiving unit 1301 is further configured to receive a first downlink RRC message from the access network device through the RRC connection, where the first downlink RRC message indicates that a type of the RRC connection is an RRC connection shared by the plurality of networks.

In a possible implementation, the receiving unit 1301 is further configured to receive a second indication from the access network device through the RRC connection, where the second indication indicates that the registration response message is associated with the second subscriber identity module.

It should be noted that, for content such as an information execution process of the units in the communication apparatus 1300, refer to the descriptions in the foregoing method embodiments of this application. Details are not described herein again.

Figure 14:
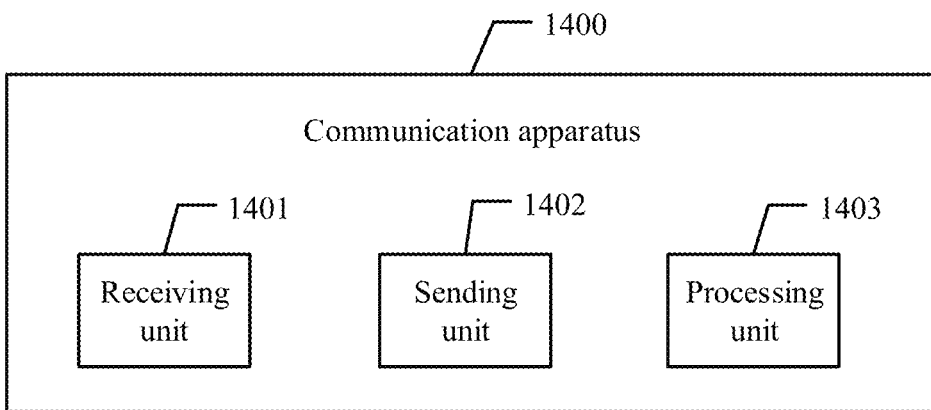
FIG. 14 is another schematic diagram of an embodiment of a communication apparatus according to embodiments of this application.

FIG. 14 shows a communication apparatus 1400 according to an embodiment of this application. Specifically, the communication apparatus 1400 may be an access network device. The communication apparatus 1400 includes a receiving unit 1401, a sending unit 1402, and a processing unit 1403.

The processing unit 1403 is configured to set up a shared radio resource control RRC connection for communication between a plurality of networks and a terminal device.

The receiving unit 1401 is configured to receive, from the terminal device through the RRC connection, a first registration request message that requests to register with a first network and a second registration request message that requests to register with a second network.

The sending unit 1402 is configured to send the first request message to a core network device in the first network, and send the second request message to a core network device in the second network.

The receiving unit 1401 is further configured to receive a first registration response message from the core network device in the first network, and receive a second registration response message from the core network device in the second network.

The sending unit 1401 is further configured to send the first registration response message and the second registration response message to the terminal device through the RRC connection.

In a possible implementation, the processing unit 1403 is specifically configured to:

receive identification information of a first subscriber identity module and identification information of a second subscriber identity module from the terminal device, where the terminal device includes the first subscriber identity module and the second subscriber identity module; and set up the RRC connection shared with the first subscriber identity module and the second subscriber identity module in the terminal device.

In a possible implementation, the processing unit 1403 is specifically configured to: establish an access stratum AS security configuration that is between the access network device and the terminal device and that is shared by the first subscriber identity module and the second subscriber identity module.

In a possible implementation, the processing unit 1403 is specifically configured to:

establish a first non-access stratum NAS data link that is between the access network device and the core network device in the first network and that is related to the first subscriber identity module.

The sending unit 1402 is further configured to: send a first downlink NAS message to the terminal device through the RRC connection, where the first downlink NAS message carries the identification information of the first subscriber identity module; and/or send a first uplink NAS message to the core network device in the first network through the first NAS data link, where the first uplink NAS message carries the identification information of the first subscriber identity module.

In a possible implementation, the processing unit 1403 is further configured to:

establish a second NAS data link that is between the access network device and the core network device in the second network and that is related to the second subscriber identity module; and the sending unit 1402 is further configured to: send a second downlink NAS message to the terminal device through the RRC connection, where the second downlink NAS message carries the identification information of the second subscriber identity module; and/or send a second uplink NAS message to the core network device in the second network through the second NAS data link, where the second uplink NAS message carries the identification information of the second subscriber identity module.

In a possible implementation, the processing unit 1403 is specifically configured to:

allocate data radio bearers DRBs to the first subscriber identity module and the second subscriber identity module; and/or allocate carrier components CCs to the first subscriber identity module and the second subscriber identity module.

It should be noted that, for content such as an information execution process of the units in the communication apparatus 1400, refer to the descriptions in the foregoing method embodiments of this application. Details are not described herein again.

Figures 15, 16:
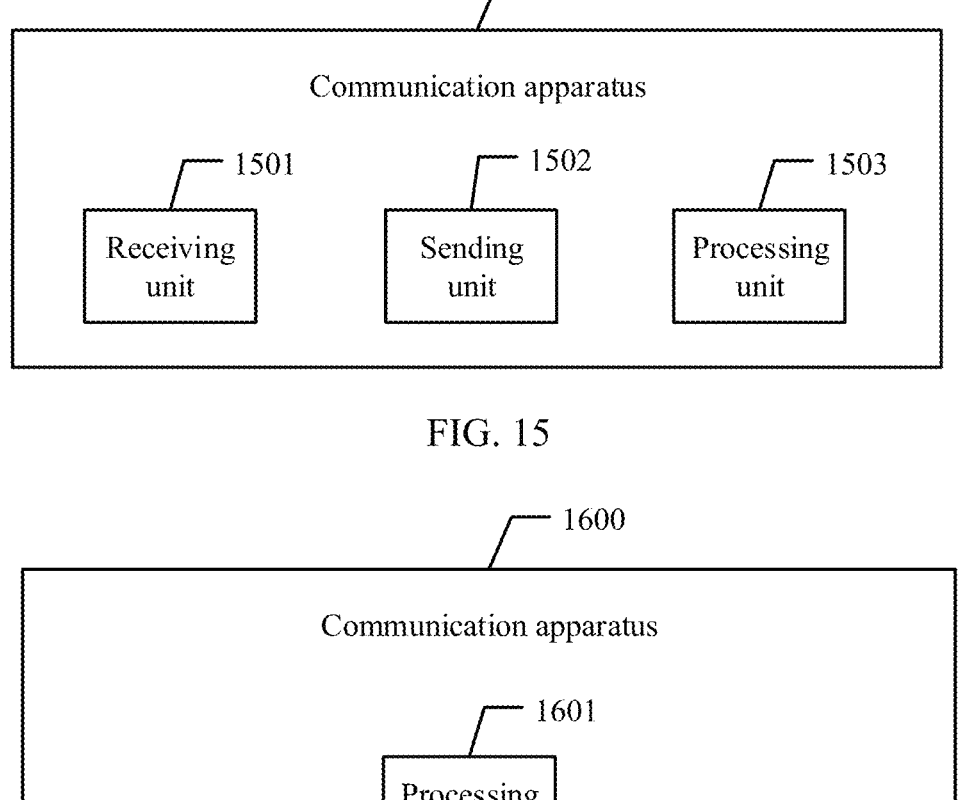
FIG. 15 is another schematic diagram of an embodiment of a communication apparatus according to embodiments of this application.
FIG. 16 is another schematic diagram of an embodiment of a communication apparatus according to embodiments of this application.

FIG. 15 shows a communication apparatus 1500 according to an embodiment of this application. Specifically, the communication apparatus 1500 may be a terminal device. The communication apparatus 1500 includes a receiving unit 1501, a sending unit 1502, and a processing unit 1503.

The sending unit 1502 is configured to send, to an access network device through a shared radio resource control RRC connection for communication between a plurality of networks and the terminal device, a first registration request message that requests to register with a first network and a second registration request message that requests to register with a second network.

The receiving unit 1501 is configured to receive a first registration response message and a second registration response message from the access network device through the RRC connection.

In a possible implementation, the sending unit is further configured to:

send identification information of a first subscriber identity module and identification information of a second subscriber identity module to the access network device.

In a possible implementation, the first subscriber identity module camps on a target cell, and a service area of the access network device includes the target cell; and when the second subscriber identity module camps on the target cell, the processing unit 1503 triggers execution of sending, to the access network device through the RRC connection, the first registration request message that requests to register with the first network and the second registration request message that requests to register with the second network.

In a possible implementation, the processing unit is further configured to:

establish an access stratum AS security configuration that is between the terminal device and the access network device and that is shared by the first subscriber identity module and the second subscriber identity module.

It should be noted that, for content such as an information execution process of the units in the communication apparatus 1500, refer to the descriptions in the foregoing method embodiments of this application. Details are not described herein again.

FIG. 16 shows a communication apparatus 1600 according to an embodiment of this application. Specifically, the communication apparatus 1600 may be an access network device. The communication apparatus 1600 includes a processing unit 1601.

The processing unit 1601 is configured to obtain identification information of a first network with which a first subscriber identity module registers and identification information of a second network with which a second subscriber identity module registers, where the first subscriber identity module and the second subscriber identity module are included in a same terminal device.

The processing unit 1601 is further configured to allocate radio data resources to the first subscriber identity module and the second subscriber identity module respectively based on the identification information of the first network and the identification information of the second network, where the radio data resources include data radio bearers DRBs and/or carrier components CCs.

In a possible implementation, the processing unit 1601 is specifically configured to:

determine type information of the first network based on the identification information of the first network, and determine type information of the second network based on the identification information of the second network; and allocate the radio data resources to the first subscriber identity module and the second subscriber identity module respectively based on the type information of the first network and the type information of the second network.

It should be noted that, for content such as an information execution process of the units in the communication apparatus 1600, refer to the descriptions in the foregoing method embodiments of this application. Details are not described herein again.

Figure 17:
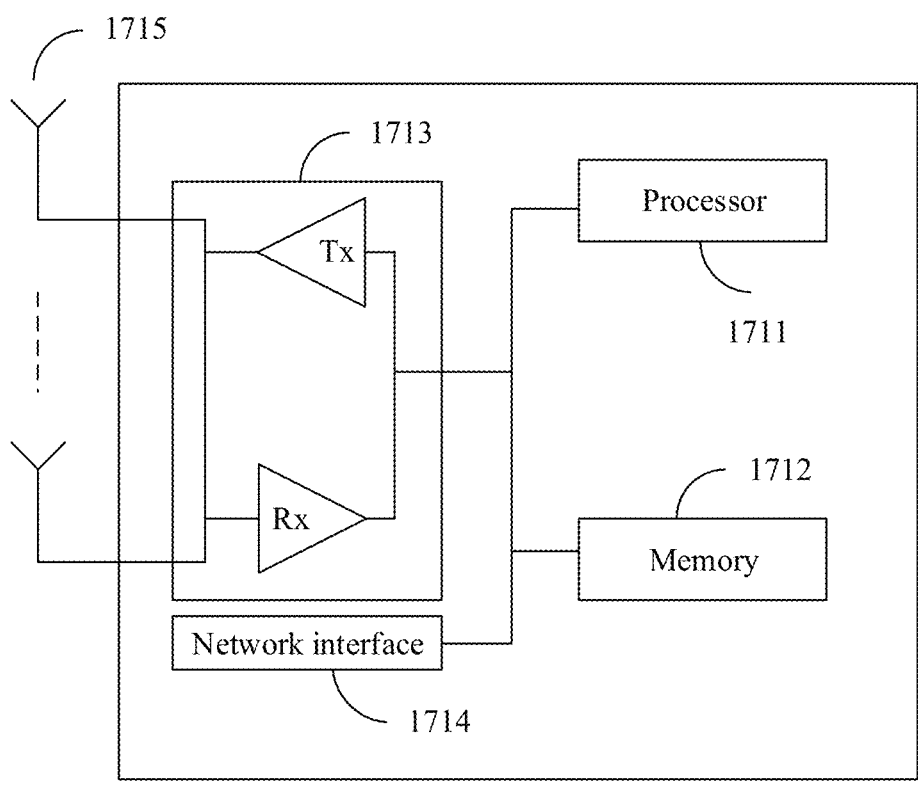
FIG. 17 is another schematic diagram of an embodiment of a communication apparatus according to embodiments of this application.

FIG. 17 is a schematic diagram of a structure of a communication apparatus in the foregoing embodiments according to an embodiment of this application. The communication apparatus may be specifically the access network device in the foregoing embodiments. For the structure of the communication apparatus, refer to the structure shown in FIG. 17.

The communication apparatus includes at least one processor 1711, at least one memory 1712, at least one transceiver 1713, at least one network interface 1714, and one or more antennas 1715. The processor 1711, the memory 1712, the transceiver 1713, and the network interface 1714 are connected to each other, for example, through a bus. In this embodiment of this application, the connection may include various types of interfaces, transmission lines, buses, or the like. This is not limited in this embodiment. The antenna 1715 is connected to the transceiver 1713. The network interface 1714 is configured to enable the communication apparatus to connect to another communication device through a communication link. For example, the network interface 1714 may include a network interface between the communication apparatus and a core network device, for example, an S1 interface. The network interface may include a network interface between the communication apparatus and another network device (for example, another access network device or core network device), for example, an X2 or Xn interface.

The processor 1711 is mainly configured to: process a communication protocol and communication data; control an entire communication apparatus; execute a software program; and process data of the software program. For example, the processor 1711 is configured to support the communication apparatus in performing the actions in embodiments. The communication apparatus may include a baseband processor and a central processing unit. The baseband processor is mainly configured to process the communication protocol and the communication data. The central processing unit is mainly configured to: control an entire terminal device, execute the software program, and process the data of the software program. Functions of the baseband processor and the central processing unit may be integrated into the processor 1711 in FIG. 17. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to enhance processing capabilities of the terminal device, and components of the terminal device may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be embedded in the processor, or may be stored in the memory in a form of the software program. The processor executes the software program to implement a baseband processing function.

The memory is mainly configured to store the software program and the data. The memory 1712 may exist independently, and is connected to the processor 1711. Optionally, the memory 1712 may be integrated with the processor 1711, for example, integrated into one chip. The memory 1712 can store program code for executing the technical solutions in embodiments of this application, and the processor 1711 controls the execution. Various types of executed computer program code may also be considered as drivers of the processor 1711.

FIG. 17 shows only one memory and one processor. In an actual terminal device, there may be a plurality of processors and a plurality of memories. The memory may also be referred to as a storage medium, a storage device, or the like. The memory may be a storage element located on a same chip as the processor, namely, an on-chip storage element, or may be an independent storage element. This is not limited in this embodiment of this application.

The transceiver 1713 may be configured to support receiving or sending of a radio frequency signal between the communication apparatus and a terminal, and the transceiver 1713 may be connected to the antenna 1715. The transceiver 1713 includes a transmitter Tx and a receiver Rx. Specifically, the one or more antennas 1715 may receive a radio frequency signal. The receiver Rx in the transceiver 1713 is configured to: receive the radio frequency signal from the antenna, convert the radio frequency signal into a digital baseband signal or a digital intermediate frequency signal, and provide the digital baseband signal or the digital intermediate frequency signal for the processor 1711, so that the processor 1711 further processes the digital baseband signal or the digital intermediate frequency signal, for example, performs demodulation processing and decoding processing. In addition, the transmitter Tx in transceiver 1713 is further configured to: receive a modulated digital baseband signal or digital intermediate frequency signal from the processor 1711, convert the modulated digital baseband signal or digital intermediate frequency signal into a radio frequency signal, and send the radio frequency signal through the one or more antennas 1715. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal.

The transceiver may also be referred to as a transceiver unit, a transceiver, a transceiver apparatus, or the like. Optionally, a component that is configured to implement a receiving function and that is in the transceiver unit may be considered as a receiving unit, and a component that is configured to implement a sending function and that is in the transceiver unit may be considered as a sending unit. That is, the transceiver unit includes the receiving unit and the sending unit. The receiving unit may also be referred to as a receiver, an input port, a receiving circuit, or the like. The sending unit may be referred to as a transmitter, a transmitter, a transmitting circuit, or the like.

It should be noted that the communication apparatus shown in FIG. 17 may be specifically configured to implement the steps implemented by the access network device in the method embodiments corresponding to FIG. 5 to FIG. 11B, and implement the technical effects corresponding to the access network device. For specific implementations of the communication apparatus shown in FIG. 17, refer to the descriptions in the method embodiments corresponding to FIG. 5 to FIG. 11B. Details are not described one by one herein again.

Figure 18:
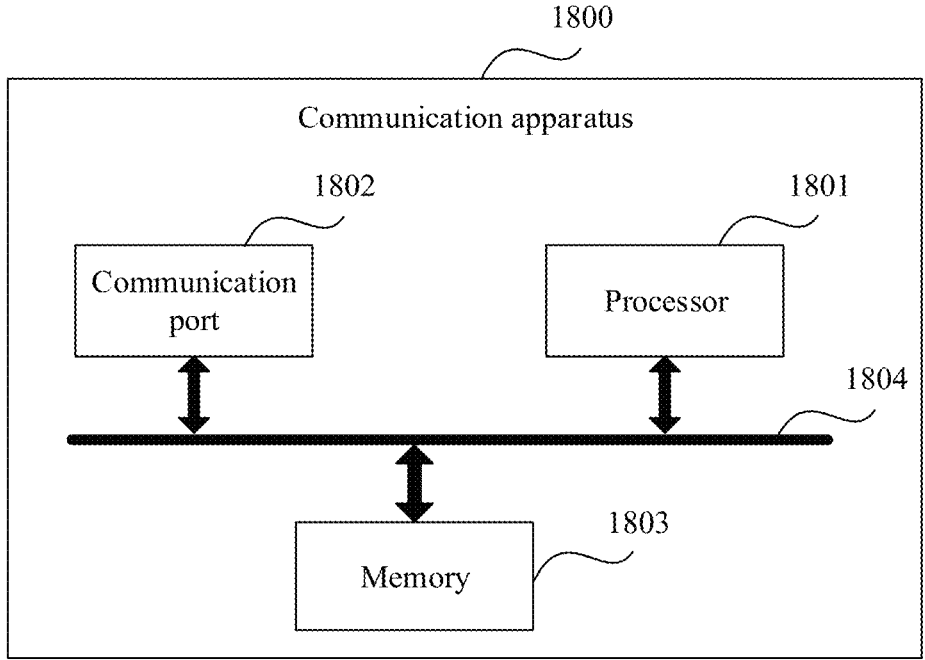
FIG. 18 is another schematic diagram of an embodiment of a communication apparatus according to embodiments of this application.

FIG. 18 is a schematic diagram of a possible logical structure of a communication apparatus 1800 in the foregoing embodiments according to an embodiment of this application. The communication apparatus may be specifically the terminal device in the foregoing embodiments. The communication apparatus 1800 may include but is not limited to a processor 1801, a communication port 1802, a memory 1803, and a bus 1804. In this embodiment of this application, the processor 1801 is configured to control and process the actions of the communication apparatus 1800.

In addition, the processor 1801 may be a central processing unit, a general purpose processor, a digital signal processor, an application-specific integrated circuit, a field programmable gate array or another programmable logic device, a transistor logic device, a hardware component, or any combination thereof. The processor 1801 may implement or execute various example logical blocks, modules, and circuits described with reference to content disclosed in this application. Alternatively, the processor may be a combination of processors implementing a computing function, for example, a combination of one or more microprocessors or a combination of a digital signal processor and a microprocessor. It may be clearly understood by a person skilled in the art that, for the purpose of convenient and brief description, for a detailed working process of the foregoing system, apparatus, and unit, refer to a corresponding process in the foregoing method embodiments. Details are not described herein again.

It should be noted that the communication apparatus shown in FIG. 18 may be specifically configured to implement the steps implemented by the terminal device in the method embodiments corresponding to FIG. 5 to FIG. 11B, and implement the technical effects corresponding to the terminal device. For specific implementations of the communication apparatus shown in FIG. 18, refer to the descriptions in the method embodiments corresponding to FIG. 5 to FIG. 11B. Details are not described one by one herein again.

An embodiment of this application further provides a computer-readable storage medium storing one or more computer-executable instructions. When the computer-executable instructions are executed by a processor, the processor performs the methods according to the possible implementations of the communication apparatus in the foregoing embodiments. The communication apparatus may be specifically the access network device in the foregoing embodiments, namely, the access network device in the method embodiments corresponding to FIG. 5 to FIG. 11B.

An embodiment of this application further provides a computer-readable storage medium storing one or more computer-executable instructions. When the computer-executable instructions are executed by a processor, the processor performs the methods according to the possible implementations of the communication apparatus in the foregoing embodiments. The communication apparatus may be specifically the terminal device in the foregoing embodiments, namely, the terminal device in the method embodiments corresponding to FIG. 5 to FIG. 11B.

An embodiment of this application further provides a computer program product (or referred to as a computer program) storing one or more computers. When the computer program product is executed by a processor, the processor performs the methods in the possible implementations of the foregoing communication apparatus. The communication apparatus may be specifically the access network device in the foregoing embodiments, namely, access network device in the method embodiments corresponding to FIG. 5 to FIG. 11B.

An embodiment of this application further provides a computer program product storing one or more computers. When the computer program product is executed by a processor, the processor performs the methods in the possible implementations of the foregoing communication apparatus. The communication apparatus may be specifically the terminal device in the foregoing embodiments, namely, the terminal device in the method embodiments corresponding to FIG. 5 to FIG. 11B.

An embodiment of this application further provides a chip system. The chip system includes a processor, configured to support a communication apparatus in implementing the functions in the possible implementations of the foregoing communication apparatus. In a possible design, the chip system may further include a memory. The memory is configured to store program instructions and data that are necessary for the communication apparatus. The chip system may include a chip, or may include the chip and another discrete device. The communication apparatus may be specifically the access network device in the foregoing embodiments, namely, the access network device in the method embodiments corresponding to FIG. 5 to FIG. 11B.

An embodiment of this application further provides a chip system. The chip system includes a processor, configured to support a communication apparatus in implementing the functions in the possible implementations of the foregoing communication apparatus. In a possible design, the chip system may further include a memory. The memory is configured to store program instructions and data that are necessary for the communication apparatus. The chip system may include a chip, or may include the chip and another discrete device. The communication apparatus may be specifically the terminal device in the foregoing embodiments, namely, the terminal device in the method embodiments corresponding to FIG. 5 to FIG. 11B.

An embodiment of this application further provides a network system architecture. The network system architecture includes the foregoing communication apparatuses. The communication apparatuses may be specifically the access network device and the terminal device in the foregoing embodiments, namely, the terminal device and the access network device in the method embodiments corresponding to FIG. 5 to FIG. 11B.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions in this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods in embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. A communication method, applied to an access network device and comprising:
  receiving, by the access network device from a terminal device through a radio resource control (RRC) connection that has been established for communication between a first network and the terminal device, a registration request message that requests to register with a second network;
  sending, by the access network device, the registration request message to a core network device in the second network;
  receiving, by the access network device, a registration response message from the core network device; and
  sending, by the access network device, the registration response message to the terminal device through the RRC connection, wherein:
  before the sending, by the access network device, the registration request message to a core network device in the second network, the method comprises:
  receiving, by the access network device, identification information of a first subscriber identity module and identification information of a second subscriber identity module from the terminal device through the RRC connection, wherein the terminal device comprises the first subscriber identity module and the second subscriber identity module, the first subscriber identity module corresponds to the first network, and the second subscriber identity module corresponds to the second network; and
  after the receiving, by the access network device, a registration response message from the core network device, associating, by the access network device, a context corresponding to the identification information of the first subscriber identity module with a context corresponding to the identification information of the second subscriber identity module.

2. The method according to claim 1, wherein the receiving, by the access network device from a terminal device through an RRC connection for communication between a first network and the terminal device, a registration request message that requests to register with a second network comprises:
  receiving, by the access network device from the second subscriber identity module through the RRC connection for the communication between the first network and the first subscriber identity module, the registration request message that requests to register with the second network.

3. The method according to claim 1, wherein after the receiving, by the access network device, a registration response message from the core network device, the method comprises:
  establishing, by the access network device, an access stratum (AS) security configuration that is between the access network device and the terminal device and that is shared by the first subscriber identity module and the second subscriber identity module.

4. The method according to claim 1, wherein before the receiving, by the access network device from a terminal device through an RRC connection that has been established for communication between a first network and the terminal device, a registration request message that requests to register with a second network, the method comprises:
  receiving, by the access network device, a first indication from the terminal device through the RRC connection, wherein the first indication indicates that the RRC connection is for communication between a plurality of networks and the terminal device;
  modifying, by the access network device based on the first indication, a type of the RRC connection as an RRC connection shared by the plurality of networks; and
  sending, by the access network device, a first downlink RRC message to the terminal device, wherein the first downlink RRC message indicates that the type of the RRC connection is the RRC connection shared by the plurality of networks.

5. The method according to claim 1, wherein after the receiving, by the access network device, a registration response message from the core network device, the method comprises:
  establishing, by the access network device, a second non-access stratum (NAS) data link that is between the access network device and the core network device and that is related to the second subscriber identity module; and at least one of:
  when the access network device receives a downlink NAS message from the core network device through the second NAS data link, sending, by the access network device, the downlink NAS message to the second subscriber identity module through the RRC connection; or
  when the access network device receives an uplink NAS message from the terminal device through the RRC connection, sending, by the access network device, the uplink NAS message to the core network device through the second NAS data link.

6. The method according to claim 1, wherein after the receiving, by the access network device, a registration response message from the core network device, the method comprises:
  allocating, by the access network device, data radio bearers (DRBs) to the first subscriber identity module and the second subscriber identity module; and/or allocating, by the access network device, carrier components (CCs) to the first subscriber identity module and the second subscriber identity module.

7. The method according to claim 1, wherein the method comprises:

sending, by the access network device, a second indication to the terminal device through the RRC connection, wherein the second indication indicates that the registration response message is associated with the second subscriber identity module.

8. An access network device comprising:

one or more non-transitory memory storages comprising instructions; and one or more processors in communication with the one or more non-transitory memory storages, wherein the instructions, when executed by the one or more processors, cause the access network device to perform operations comprising:

receiving, from a terminal device through a radio resource control (RRC) connection that has been established for communication between a first network and the terminal device, a registration request message that requests to register with a second network;

sending the registration request message to a core network device in the second network;

receiving a registration response message from the core network device; and sending the registration response message to the terminal device through the RRC connection, wherein:

before the sending the registration request message to a core network device in the second network, the operations comprise:

receiving identification information of a first subscriber identity module and identification information of a second subscriber identity module from the terminal device through the RRC connection, wherein the terminal device comprises the first subscriber identity module and the second subscriber identity module, the first subscriber identity module corresponds to the first network, and the second subscriber identity module corresponds to the second network; and after the receiving a registration response message from the core network device, associating a context corresponding to the identification information of the first subscriber identity module with a context corresponding to the identification information of the second subscriber identity module.

9. The access network device according to claim 8, wherein the receiving, from a terminal device through an RRC connection for communication between a first network and the terminal device, a registration request message that requests to register with a second network comprises:

receiving, from the second subscriber identity module through the RRC connection for the communication between the first network and the first subscriber identity module, the registration request message that requests to register with the second network.

10. The access network device according to claim 8, wherein after the receiving a registration response message from the core network device, the operations comprise:

establishing an access stratum (AS) security configuration that is between the access network device and the terminal device and that is shared by the first subscriber identity module and the second subscriber identity module.

11. The access network device according to claim 8, wherein before the receiving, from a terminal device through an RRC connection that has been established for communication between a first network and the terminal device, a registration request message that requests to register with a second network, the operations comprise:

receiving a first indication from the terminal device through the RRC connection, wherein the first indication indicates that the RRC connection is for communication between a plurality of networks and the terminal device;

modifying, based on the first indication, a type of the RRC connection as an RRC connection shared by the plurality of networks; and sending a first downlink RRC message to the terminal device, wherein the first downlink RRC message indicates that the type of the RRC connection is the RRC connection shared by the plurality of networks.

12. The access network device according to claim 8, wherein after the receiving a registration response message from the core network device, the operations comprise:

establishing a second non-access stratum (NAS) data link that is between the access network device and the core network device and that is related to the second subscriber identity module; and at least one of:

when the access network device receives a downlink NAS message from the core network device through the second NAS data link, sending the downlink NAS message to the second subscriber identity module through the RRC connection; or when the access network device receives an uplink NAS message from the terminal device through the RRC connection, sending the uplink NAS message to the core network device through the second NAS data link.

13. The access network device according to claim 8, wherein after the receiving a registration response message from the core network device, the operations comprise:

allocating data radio bearers (DRBs) to the first subscriber identity module and the second subscriber identity module; and/or allocating carrier components (CCs) to the first subscriber identity module and the second subscriber identity module.

14. The access network device according to claim 8, wherein the operations comprise:

sending a second indication to the terminal device through the RRC connection, wherein the second indication indicates that the registration response message is associated with the second subscriber identity module.

15. A non-transitory computer-readable storage medium storing a computer program comprising instructions which, upon execution, cause one or more processors to perform operations comprising:

receiving, from a terminal device through a radio resource control (RRC) connection that has been established for communication between a first network and the terminal device, a registration request message that requests to register with a second network;

sending the registration request message to a core network device in the second network;

receiving a registration response message from the core network device; and sending the registration response message to the terminal device through the RRC connection, wherein:

before the sending the registration request message to a core network device in the second network, the operations comprise:

receiving identification information of a first subscriber identity module and identification information of a second subscriber identity module from the terminal device through the RRC connection, wherein the terminal device comprises the first subscriber identity module and the second subscriber identity module, the first subscriber identity module corresponds to the first network, and the second subscriber identity module corresponds to the second network; and after the receiving a registration response message from the core network device, associating a context corresponding to the identification information of the first subscriber identity module with a context corresponding to the identification information of the second subscriber identity module.

16. The non-transitory computer-readable storage medium according to claim 15, wherein the receiving, from a terminal device through an RRC connection for communication between a first network and the terminal device, a registration request message that requests to register with a second network comprises:

receiving, from the second subscriber identity module through the RRC connection for the communication between the first network and the first subscriber identity module, the registration request message that requests to register with the second network.

17. The non-transitory computer-readable storage medium according to claim 15, wherein after the receiving a registration response message from the core network device, the operations comprise:

establishing an access stratum (AS) security configuration that is between an access network device and the terminal device and that is shared by the first subscriber identity module and the second subscriber identity module.

18. The non-transitory computer-readable storage medium according to claim 15, wherein after the receiving a registration response message from the core network device, the operations comprise:

establishing a second non-access stratum (NAS) data link that is between an access network device and the core network device and that is related to the second subscriber identity module; and at least one of:

when the access network device receives a downlink NAS message from the core network device through the second NAS data link, sending the downlink NAS message to the second subscriber identity module through the RRC connection; or when the access network device receives an uplink NAS message from the terminal device through the RRC connection, sending the uplink NAS message to the core network device through the second NAS data link.

19. The non-transitory computer-readable storage medium according to claim 15, wherein after the receiving a registration response message from the core network device, the operations comprise:

allocating data radio bearers (DRBs) to the first subscriber identity module and the second subscriber identity module; and/or allocating carrier components (CCs) to the first subscriber identity module and the second subscriber identity module.

20. The non-transitory computer-readable storage medium according to claim 15, wherein the operations comprise:

sending a second indication to the terminal device through the RRC connection, wherein the second indication indicates that the registration response message is associated with the second subscriber identity module.

* * * * *